(12) United States Patent
Moon

(10) Patent No.: US 12,356,079 B2
(45) Date of Patent: Jul. 8, 2025

(54) METHOD OF OPERATING MULTI-CAMERA SYSTEM AND MULTI-CAMERA SYSTEM PERFORMING THE SAME

(71) Applicant: SAMSUNG ELECTRONICS CO., LTD., Suwon-si (KR)

(72) Inventor: Kyounghwan Moon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 255 days.

(21) Appl. No.: 17/973,159

(22) Filed: Oct. 25, 2022

(65) Prior Publication Data

US 2023/0319420 A1    Oct. 5, 2023

(30) Foreign Application Priority Data

Apr. 4, 2022    (KR) .................. 10-2022-0041556

(51) Int. Cl.
*H04N 23/72* (2023.01)
*H04N 23/45* (2023.01)
*H04N 23/90* (2023.01)

(52) U.S. Cl.
CPC ............. *H04N 23/72* (2023.01); *H04N 23/45* (2023.01); *H04N 23/90* (2023.01)

(58) Field of Classification Search
CPC ........ H04N 23/72; H04N 23/45; H04N 23/90; H04N 5/265; H04N 1/6027; H04N 1/6052; H04N 1/6077; H04N 5/2624; H04N 23/667; H04N 23/71; H04N 23/88; H04N 9/73; H04N 23/73; H04N 5/06; H04N 23/13; H04N 23/76

See application file for complete search history.

(56) References Cited

U.S. PATENT DOCUMENTS

| | | | |
|---|---|---|---|
| 8,174,577 B2 | 5/2012 | Chou | |
| 8,330,821 B2 | 12/2012 | Lee | |
| 9,741,117 B2 | 8/2017 | Richards et al. | |
| 10,616,484 B2 | 4/2020 | Cohen et al. | |
| 11,022,858 B2 | 6/2021 | Richards et al. | |
| 2007/0285282 A1* | 12/2007 | Nakayama | H04N 7/181 348/E7.086 |
| 2017/0166126 A1* | 6/2017 | Sypitkowski | H04N 23/698 |
| 2018/0352160 A1* | 12/2018 | Lu | G02F 1/0147 |
| 2019/0174054 A1* | 6/2019 | Srivastava | H04N 23/63 |
| 2020/0021741 A1* | 1/2020 | Hada | H04N 23/67 |
| 2021/0099628 A1 | 4/2021 | Nakamura | |
| 2021/0409667 A1* | 12/2021 | Hurley | H04N 23/60 |
| 2023/0007201 A1* | 1/2023 | Lim | H04N 25/75 |

\* cited by examiner

*Primary Examiner* — Hung H Lam
(74) *Attorney, Agent, or Firm* — Fish & Richardson P.C.

(57) ABSTRACT

In a method of operating a multi-camera system, a first auto exposure (AE) is performed on a first master camera among a plurality of first cameras controlled by a first image signal processor. A first auto white balance (AWB) is performed on the first master camera. Operations of all of the plurality of first cameras are controlled by the first image signal processor based on results of the first auto exposure and the first auto white balance.

19 Claims, 48 Drawing Sheets

METHOD OF OPERATING MULTI-CAMERA SYSTEM AND MULTI-CAMERA SYSTEM PERFORMING THE SAME

CROSS-REFERENCE TO RELATED APPLICATION

This application claims priority under 35 USC § 119 to Korean Patent Application No. 10-2022-0041556 filed on Apr. 4, 2022 in the Korean Intellectual Property Office (KIPO), the contents of which are herein incorporated by reference in their entirety.

BACKGROUND

1. Technical Field

Exemplary embodiments relate generally to semiconductor integrated circuits, and more particularly to methods of operating multi-camera systems, and multi-camera systems performing the methods.

2. Description of the Related Art

Image recording devices have been adopted in various electronic systems and mobile systems such as, for example, computers, mobile phones, tablets, Virtual Reality (VR) equipment, and robotic systems. An image that is recorded by the image recording device can be processed in various ways.

Recently, owing to the convergence of information communication technologies and the car industry, cars have rapidly become increasingly smarter. Accordingly, cars have evolved from simple mechanisms controlled entirely by a driver to smart cars. Smart cars may be controlled by a driver with the assistance of advanced driver assistance systems (ADAS) and can sometimes be controlled entirely by autonomous driving systems. ADAS and autonomous driving systems are particularly highlighted as core technologies for smart cars. For ADAS and autonomous driving systems, various technologies such as a technology for recognizing the driving environment (e.g., car lanes, ambient vehicles, pedestrians, etc.), a technology for determining the driving conditions, and control technology such as steering, acceleration/deceleration, etc., are required. In addition, for such various technologies, it is necessary to precisely and efficiently recognize and/or detect objects around vehicles, and thus the ADAS and autonomous driving systems may include a plurality of cameras.

SUMMARY

At least one exemplary embodiment of the present disclosure provides a method of operating a multi-camera system including a plurality of cameras and capable of efficiently driving the plurality of cameras with low power consumption and low cost.

At least one exemplary embodiment of the present disclosure provides a multi-camera system performing the method of operating the multi-camera system.

According to exemplary embodiments, in a method of operating a multi-camera system, a first auto exposure (AE) is performed on a first master camera among a plurality of first cameras controlled by a first image signal processor. A first auto white balance (AWB) is performed on the first master camera. Operations of all of the plurality of first cameras are controlled by the first image signal processor based on results of the first auto exposure and the first auto white balance.

According to exemplary embodiments, a multi-camera system includes a first image signal processor and a plurality of first cameras controlled by the first image signal processor. A first auto exposure (AE) is performed on a first master camera among the plurality of first cameras. A first auto white balance (AWB) is performed on the first master camera. The first image signal processor controls operations of all of the plurality of first cameras based on results of the first auto exposure and the first auto white balance.

According to exemplary embodiments, in a method of operating a multi-camera system, a first sensor gain of a first master camera is obtained by performing a first auto exposure (AE) on the first master camera among a plurality of first cameras controlled by a first image signal processor. A first RGB gain of the first master camera is obtained by performing a first auto white balance (AWB) on the first master camera. Operations of all of the plurality of first cameras are controlled by the first image signal processor by applying the first sensor gain and the first RGB gain obtained as results of performing the first auto exposure and the first auto white balance to all of the plurality of first cameras. Outputs of the plurality of first cameras are synchronized. The multi-camera system operates in a first operation mode, a second operation mode and a third operation mode. In the first operation mode, both the first auto exposure and the first auto white balance are performed every frame. In second first operation mode, only one the first auto exposure and the first auto white balance is performed every frame. In third first operation mode, only one the first auto exposure and the first auto white balance is performed in a first frame, both the first auto exposure and the first auto white balance are not performed in a second frame subsequent to the first frame, and the first frame and the second frame are two consecutive frames. An operation mode of the multi-camera system is changed by increasing a first number of times of performing the first auto exposure and a second number of times of performing the first auto white balance in response to determining that a change in an illumination environment is detected, and by decreasing the first number of times and the second number of times in response to determining that the illumination environment is stabilized. Based on at least one of the first sensor gain, the first RGB gain and an external control signal, it is determined that the change in the illumination environment is detected or the illumination environment is stabilized.

In the method of operating the multi-camera system and the multi-camera system according to exemplary embodiments, the auto exposure and the auto white balance may be performed on only one camera among the plurality of cameras controlled by one image signal processor, the results of the auto exposure and the auto white balance performed on one camera may be applied to the other cameras, and the operation of the plurality of cameras controlled by one image signal processor may be processed in the same manner based on the same results of the auto exposure and the auto white balance performed on one camera. In addition, outputs of the plurality of cameras may be synchronized. Accordingly, the plurality of cameras may be efficiently driven with low power consumption and low cost.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION OF THE PREFERRED EMBODIMENTS

Figure 1:
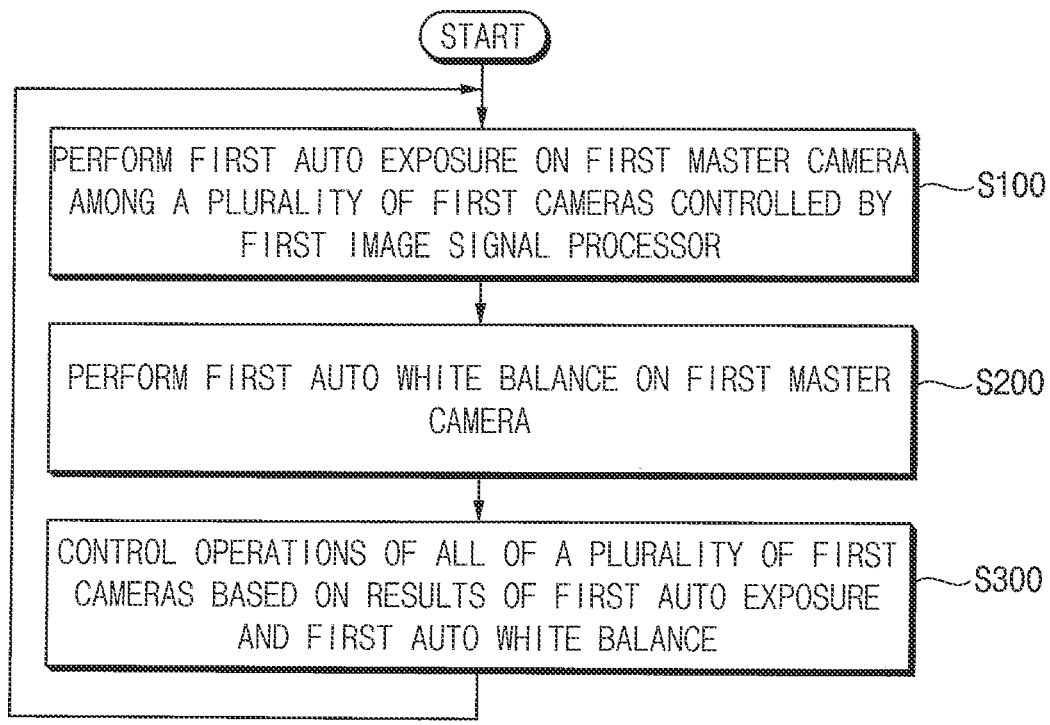
FIG. 1 is a flowchart illustrating a method of operating a multi-camera system according to exemplary embodiments.

Various exemplary embodiments will be described more fully with reference to the accompanying drawings, in which such exemplary embodiments are shown. The present disclosure may, however, be embodied in many different forms and should not be construed as limited to the exemplary embodiments set forth herein. Like reference numerals refer to like elements throughout this application.

FIG. 1 is a flowchart illustrating a method of operating a multi-camera system according to exemplary embodiments.

Referring to FIG. 1, a method of operating a multi-camera system according to an exemplary embodiment is performed by a multi-camera system that includes at least one image signal processor (ISP) and a plurality of cameras (or camera modules). In the multi-camera system, two or more cameras may be controlled by one image signal processor. A configuration of the multi-camera system will be described with reference to FIG. 2.

In the method of operating the multi-camera system according to an exemplary embodiment, a first auto exposure (or automatic exposure adjustment (or control)) (AE) is performed on a first master camera among a plurality of first cameras controlled by a first image signal processor (step S100). A first auto white balance (or automatic white balance adjustment (or control)) (AWB) is performed on the first master camera (step S200). For example, one of the plurality of first cameras may be set or determined as the first master camera.

Operations of all of the plurality of first cameras are controlled by the first image signal processor based on results of the first auto exposure and the first auto white balance (step S300). For example, the results of the first auto exposure and the first auto white balance may be applied or employed to all of the plurality of first cameras.

Steps S100, S200 and S300 may be repeatedly performed while the multi-camera system is operating or driving, which will be described with reference to FIG. 10 and the like.

Various sensors are equipped or installed on vehicles for driving convenience and safety, and the types of sensors equipped on vehicles are gradually increasing. A camera is also a sensor or sensing element, and the number of cameras included in one vehicle is increasing. When driving a vehicle, navigation and/or various other services should be executed simultaneously while a plurality of cameras are operating, and thus operations of a image signal processor for the plurality of cameras should be performed in the background or with low power consumption and low load.

In the method of operating the multi-camera system according to an exemplary embodiment, the auto exposure and the auto white balance may be performed on only one camera among the plurality of cameras controlled by one image signal processor, the results of the auto exposure and the auto white balance performed on one camera may be applied to the other cameras, and the operation of the plurality of cameras controlled by one image signal processor may be processed in the same manner based on the same results of the auto exposure and the auto white balance performed on one camera. In addition, outputs of the plurality of cameras may be synchronized. Accordingly, the plurality of cameras may be efficiently driven with lower power consumption and lower cost.

Figure 2:
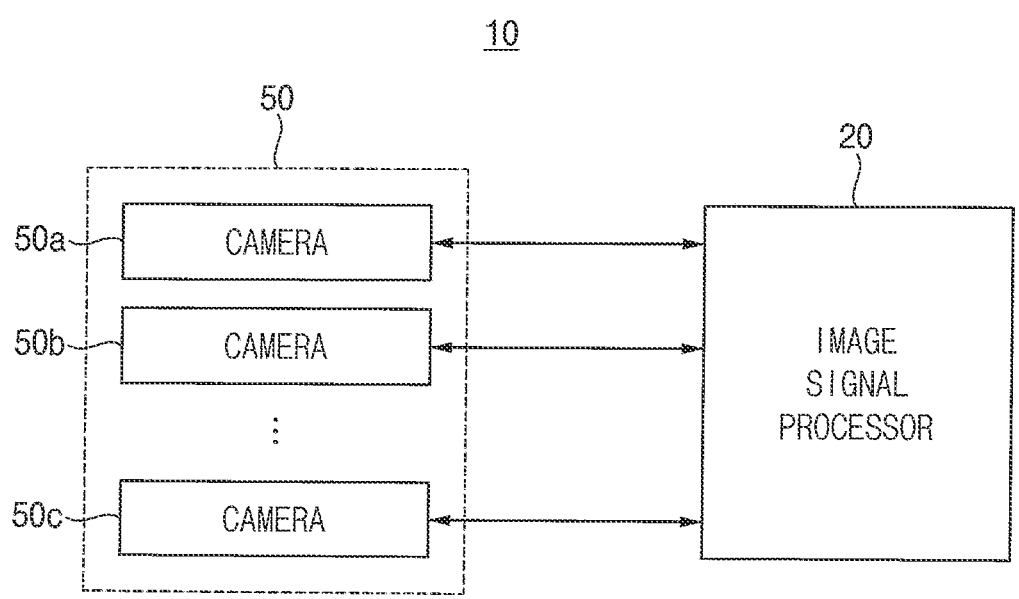
FIG. 2 is a block diagram illustrating a multi-camera system according to exemplary embodiments.

FIG. 2 is a block diagram illustrating a multi-camera system according to exemplary embodiments.

Referring to FIG. 2, a multi-camera system 10 may include a first image signal processor 20 and a plurality of first cameras 50 controlled by the first image signal processor 20.

The plurality of first cameras 50 may include X cameras 50a, 50b and 50c, where X is a natural number greater than or equal to two. For example, the camera 50a may be set or determined as a first master camera. Among the plurality of first cameras 50, the remaining cameras 50b and 50c other than the first master camera 50a may be referred to as first slave cameras.

In some exemplary embodiments, all of the plurality of first cameras 50 may be disposed, arranged and/or installed to face a first direction. In other words, all of the plurality of first cameras 50 may be disposed to face the same direction. In some exemplary embodiments, all of the plurality of first cameras 50 may have a first frame rate. In other words, all of the plurality of first cameras 50 may have the same frame rate. The term "frame rate" may represent or correspond to the number of frame images that are obtained and/or captured by the camera during a unit time interval.

In some exemplary embodiments, the criteria or conditions for setting the first master camera 50a may include at least one of an angle of view, a position and a resolution of the plurality of first cameras 50. For example, among the plurality of first cameras 50, a camera having the widest angle of view or a camera disposed at the front (or rear) side may be determined as the first master camera 50a. However, exemplary embodiments are not limited thereto, and the first master camera 50a may be set based on various other criteria.

In some exemplary embodiments, the first master camera 50a may be predetermined at an initial operation time of the multi-camera system 10 (e.g., during a manufacturing process of the multi-camera system 10). In other exemplary embodiments, the first master camera 50a may be changed in real time (or during runtime) while the multi-camera system 10 is operating.

Figure 3:
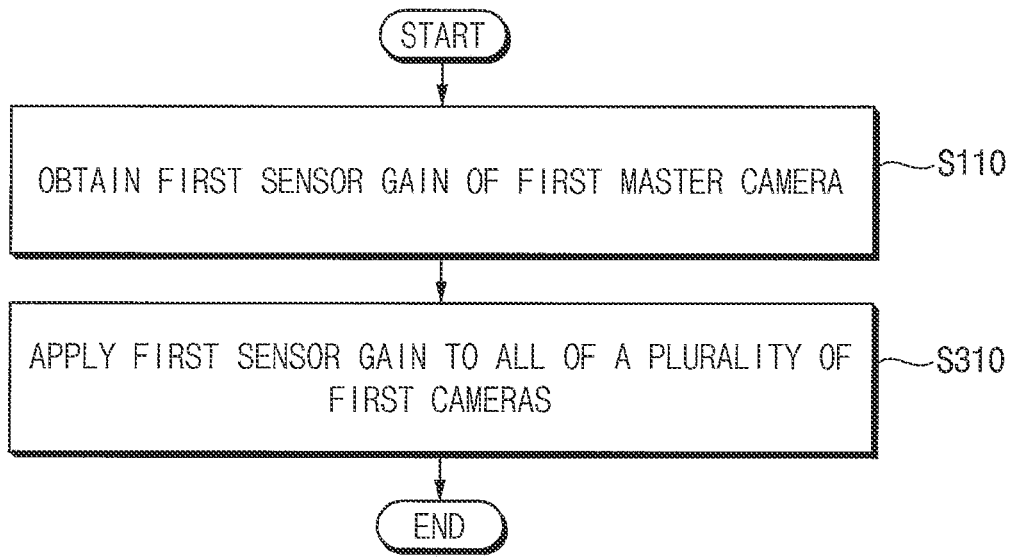
FIGS. 3 and 4 are flowcharts illustrating examples of performing a first auto exposure, performing a first auto white balance, and controlling operations of all of a plurality of first cameras in FIG. 1.
Figure 4:
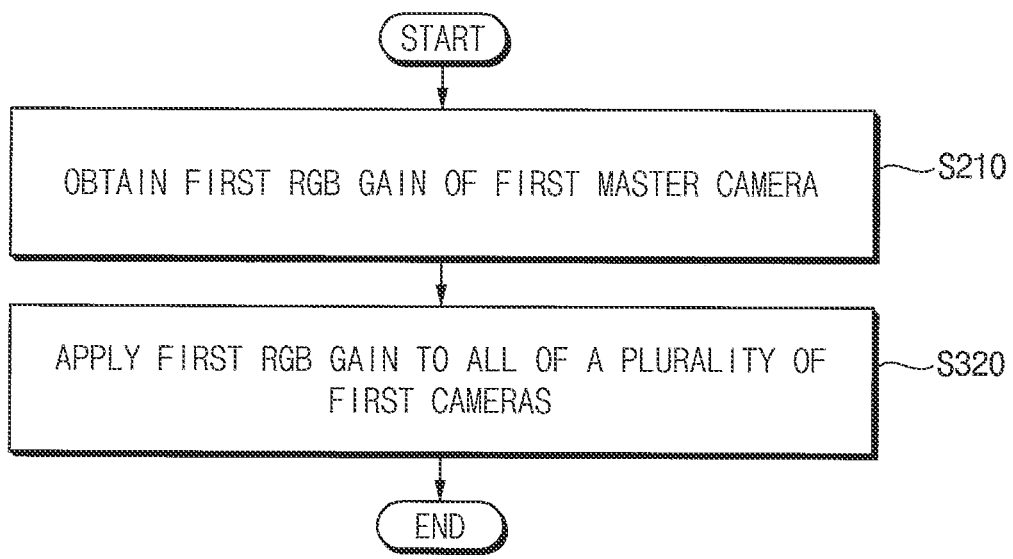

FIGS. 3 and 4 are flowcharts illustrating examples of performing a first auto exposure, performing a first auto white balance, and controlling operations of all of a plurality of first cameras in FIG. 1.

Referring to FIGS. 1 and 3, when performing the first auto exposure on the first master camera (step S100), a first sensor gain of the first master camera may be obtained (step S110). For example, the first auto exposure may be performed based on an exposure index (EI). For example, while the first auto exposure is performed, a switching time of a shutter included in the first master camera (e.g., a time point of opening or closing the shutter) and/or an exposure time of the shutter included in the first master camera (e.g., an integration period of the shutter) may be controlled or adjusted.

When controlling, by the first image signal processor, the operations of all of the plurality of first cameras (step S300), the first sensor gain may be applied or employed to all of the plurality of first cameras (step S310). For example, an auto exposure algorithm for evaluating the brightness or luminance of the plurality of first cameras may not be performed for each camera, but may be performed only for the first master camera. For example, the first sensor gain obtained by the first auto exposure may also be used for the remaining cameras other than the first master camera among the plurality of first cameras, and all of the plurality of first cameras may operate in the same manner using the first sensor gain.

Referring to FIGS. 1 and 4, when performing the first auto white balance on the first master camera (step S200), a first RGB (red, green and blue) gain of the first master camera may be obtained (step S210). An RGB gain may be referred to as a color gain. For example, the first auto white balance may be performed based on a correlated color temperature (CCT).

When controlling, by the first image signal processor, the operations of all of the plurality of first cameras (step S300), the first RGB gain may be applied or employed to all of the plurality of first cameras (step S320). For example, an auto white balance algorithm for evaluating the light source of the plurality of first cameras may not be performed for each camera, but may be performed only for the first master camera. For example, the first RGB gain obtained by the first auto white balance may also be used for the remaining cameras other than the first master camera among the plurality of first cameras, and all of the plurality of first cameras may operate in the same manner using the first RGB gain.

In some exemplary embodiments, at least one of the first auto exposure and the first auto white balance may be performed by setting a region of interest (ROI) in an image obtained by the first master camera and may be performed based on the region of interest. It is well known that certain spatial and temporal regions or objects in pictures are of more interest/importance to a user than other areas. For example, in video conferencing applications, the viewer may pay more attention to face regions when compared to other regions. In security applications, areas of potential activity (e.g., doors, windows, etc.) may be more important. These more important regions or the regions where the viewer pays more attention to may be referred to as regions of interest. For example, the region of interest may be manually set based on a user's operation. In another example, the region of interest may be automatically set based on predetermined rules or criteria. The region of interest may be referred to as a statistics region.

Figure 5:
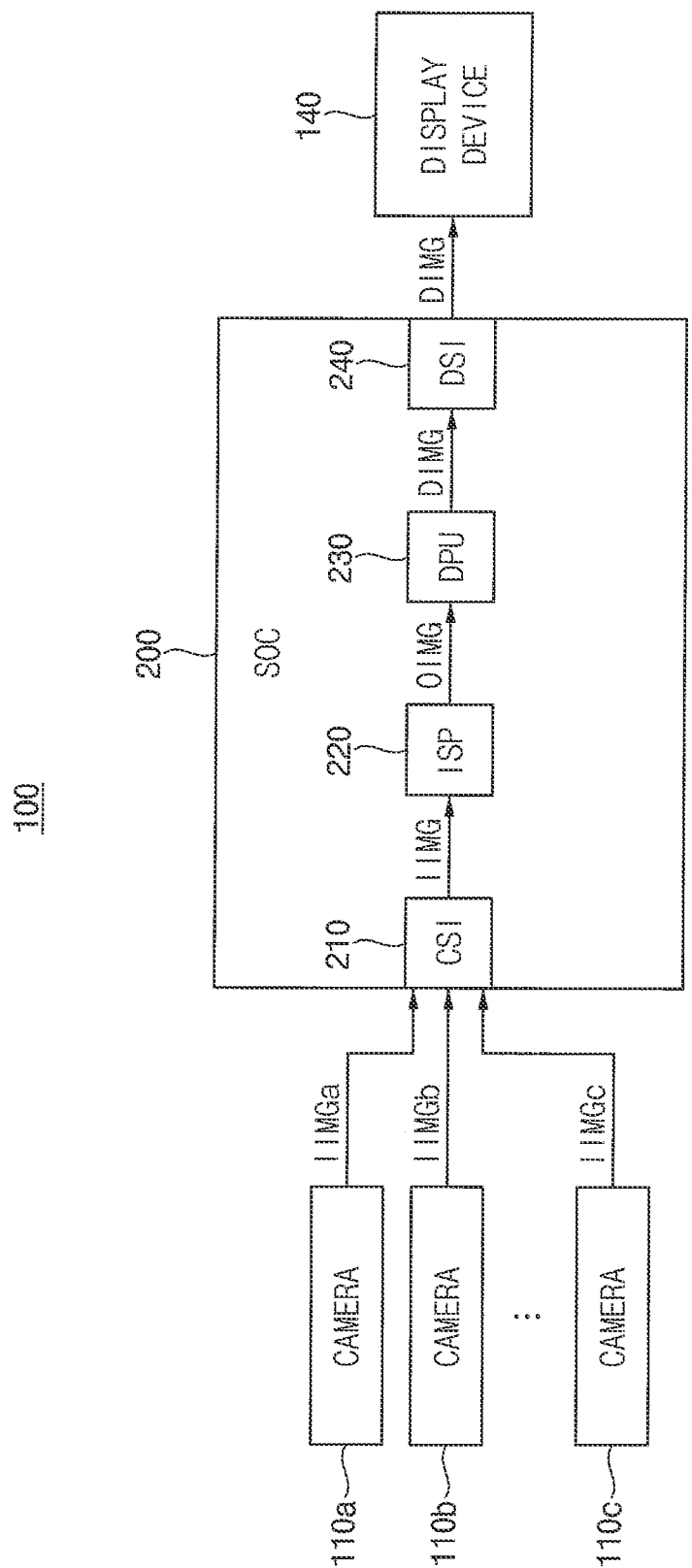
FIG. 5 is a block diagram illustrating an example of a multi-camera system of FIG. 2.

FIG. 5 is a block diagram illustrating an example of a multi-camera system of FIG. 2.

Referring to FIG. 5, a multi-camera system 100 may include a system-on-chip (SOC) 200, a plurality of first cameras 110a, 110b and 110c, and a first display device 140.

The plurality of first cameras 110a, 110b and 110c may correspond to the plurality of first cameras 50 in FIG. 2. For example, the camera 110a may be set as the first master camera.

The plurality of first cameras 110a, 110b and 110c may obtain and/or generate a plurality of first input images IIMGa, IIMGb and IIMGc associated with or related to objects (or subjects), and may provide the plurality of first input images IIMGa, IIMGb and IIMGc to the system-onchip 200. For example, each of the plurality of first input images IIMGa, IIMGb and IIMGc may include frame images.

The system-on-chip 200 may generate a first display image DIMG based on the plurality of first input images IIMGa, IIMGb and IIMGc, and may provide the first display image DIMG to the first display device 140.

The system-on-chip 200 may include a first camera serial interface (CSI) 210, a first image signal processor 220, a first display processing unit (DPU) 230 and a first display serial interface (DSI) 240.

The first camera serial interface 210 may receive the plurality of first input images IIMGa, IIMGb and IIMGc from the plurality of first cameras 110a, 110b and 110c, and may provide a first input image IIMG corresponding to the plurality of first input images IIMGa, IIMGb and IIMGc to the first image signal processor 220. For example, the first camera serial interface 210 may be implemented based on a mobile industry processor interface (MIPI) standard.

The first image signal processor 220 may correspond to the first image signal processor 20 in FIG. 2. The first image signal processor 220 may generate a first output image OIMG by performing an image processing on the first input image IIMG, and may provide the first output image OIMG to the first display processing unit 230.

The first image signal processor 220 may perform the method of operating the multi-camera system according to exemplary embodiments described with reference to FIG. 1. For example, the first image signal processor 220 may perform a first auto exposure and a first auto white balance on the first master camera 110a, and may control operations of all of the plurality of first cameras 110a, 110b and 110c based on results of the first auto exposure and the first auto white balance.

The first display processing unit 230 may generate the first display image DIMG by performing an image processing on the first output image OIMG, and may provide the first display image DIMG to the first display serial interface 240.

The first display serial interface 240 may receive the first display image DIMG from the first display processing unit 230, and may provide the first display image DIMG to the first display device 140. For example, as with the first camera serial interface 210, the first display serial interface 240 may be implemented based on the MIPI standard. However, exemplary embodiments are not limited thereto, and the first display serial interface 240 may be implemented based on one of various display interface standards, e.g., one of a high definition multimedia interface (HDMI), a display port (DP), a low power display port (LPDP) and an advanced low power display port (ALPDP).

The first display device 140 may display an image based on the first display image DIMG.

In some exemplary embodiments, the system-on-chip 200 may be implemented in the form of an application processor (AP). The system-on-chip 200 may be referred to as a host processor.

Although not illustrated in FIG. 5, the system-on-chip 200 may further include a system bus, a memory device, a storage device, a plurality of functional modules and a power management integrated circuit (PMIC), and/or the like. The system bus may correspond to a signal transmission path between the components in the system-on-chip 200. The memory device and the storage device may store instructions and data required for operations of the system-on-chip 200. The plurality of functional modules may perform various functions of the system-on-chip 200. The power management integrated circuit may provide operating voltages to the components in the system-on-chip 200.

Figure 6:
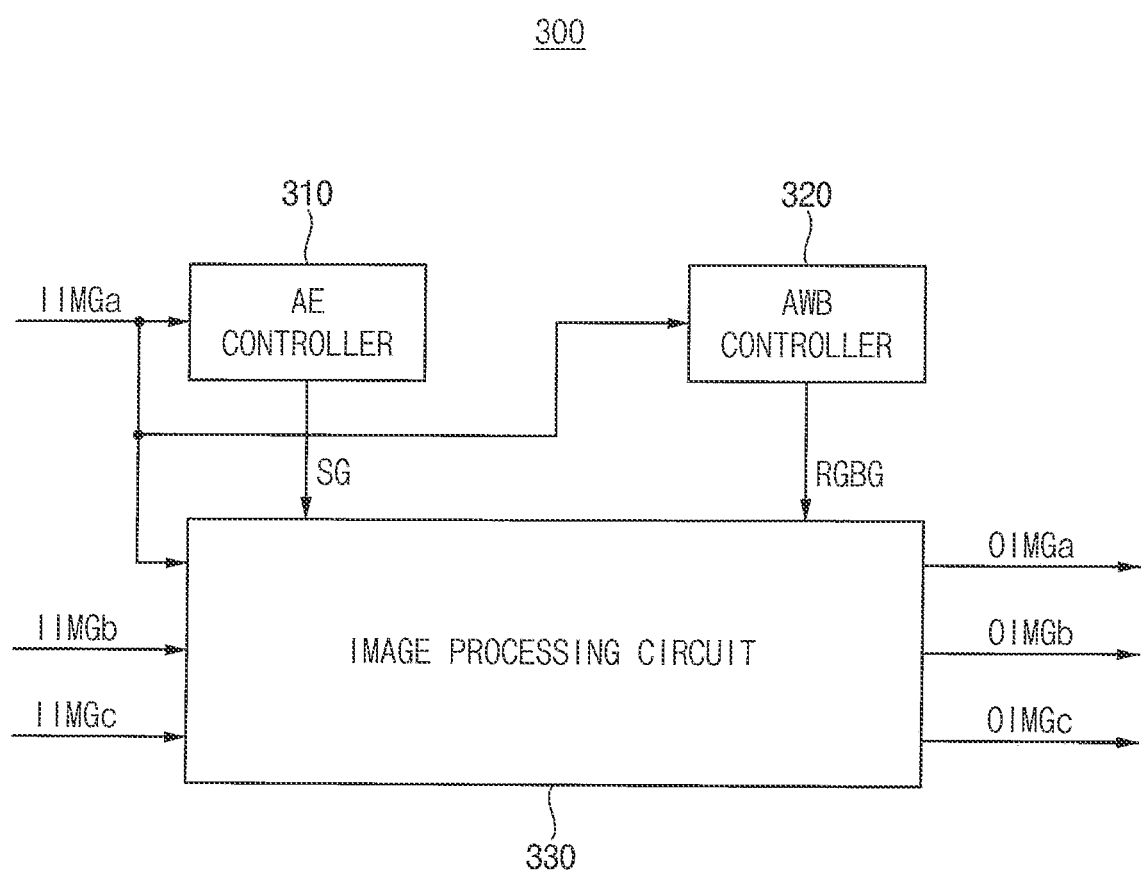
FIG. 6 is a block diagram illustrating an example of a first image signal processor included in a multi-camera system of FIG. 5.

FIG. 6 is a block diagram illustrating an example of a first image signal processor included in a multi-camera system of FIG. 5.

Referring to FIG. 6, a first image signal processor 300 may include a first auto exposure controller 310, a first auto white balance controller 320 and a first image processing circuit 330.

The first auto exposure controller 310 may perform the first auto exposure on the first master camera 110a based on the first input image IIMGa received from the first master camera 110a, and may generate a first sensor gain SG as a result of performing the first auto exposure. For example, the first auto exposure controller 310 may perform step S110 in FIG. 3.

The first auto white balance controller 320 may perform the first auto white balance on the first master camera 110a based on the first input image IIMGa received from the first master camera 110a, and may generate a first RGB gain RGBG as a result of performing the first auto white balance. For example, the first auto white balance controller 320 may perform step S210 in FIG. 4.

The first image processing circuit 330 may apply the first sensor gain SG and the first RGB gain RGBG to all of the plurality of first cameras 110a, 110b and 110c based on the plurality of first input images IIMGa, IIMGb and IIMGc received from the plurality of first cameras 110a, 110b and 110c. For example, the first image processing circuit 330 may perform step S310 in FIG. 3 and step S320 in FIG. 4.

In addition, the first image processing circuit 330 may generate a plurality of first output images OIMGa, OIMGb and OIMGc by performing image processing on the plurality of first input images IIMGa, IIMGb and IIMGc. The plurality of first output images OIMGa, OIMGb and OIMGc may correspond to the first output image OIMG in FIG. 5. For example, the first image processing circuit 330 may perform at least one of various image processing, e.g., demosaic, denoise, sharpen, color correction, color conversion, gamma correction, and/or the like.

Although not illustrated in detail, the first display processing unit 230 in FIG. 5 may generate the first display image DIMG by performing at least one of blending and/or various display quality enhancement (or improvement) algorithms on the plurality of first output images OIMGa, OIMGb and OIMGc. The term "blending" may represent or correspond to an operation of calculating a pixel value that is actually displayed among several layers (e.g., images) constituting one screen. The blending may be referred to as mixing and/or composition. For example, the display quality enhancement algorithms may include a detail enhancement (DE), a scaling (or scaler), an adaptive tone map control (ATC), a hue saturation control (HSC), a gamma and a de-gamma, an Android open source project (AOSP), a color gamut control (CGC), a dithering (or dither), a round corner display (RCD), a sub-pixel rendering (SPR), and/or the like.

Figure 7:
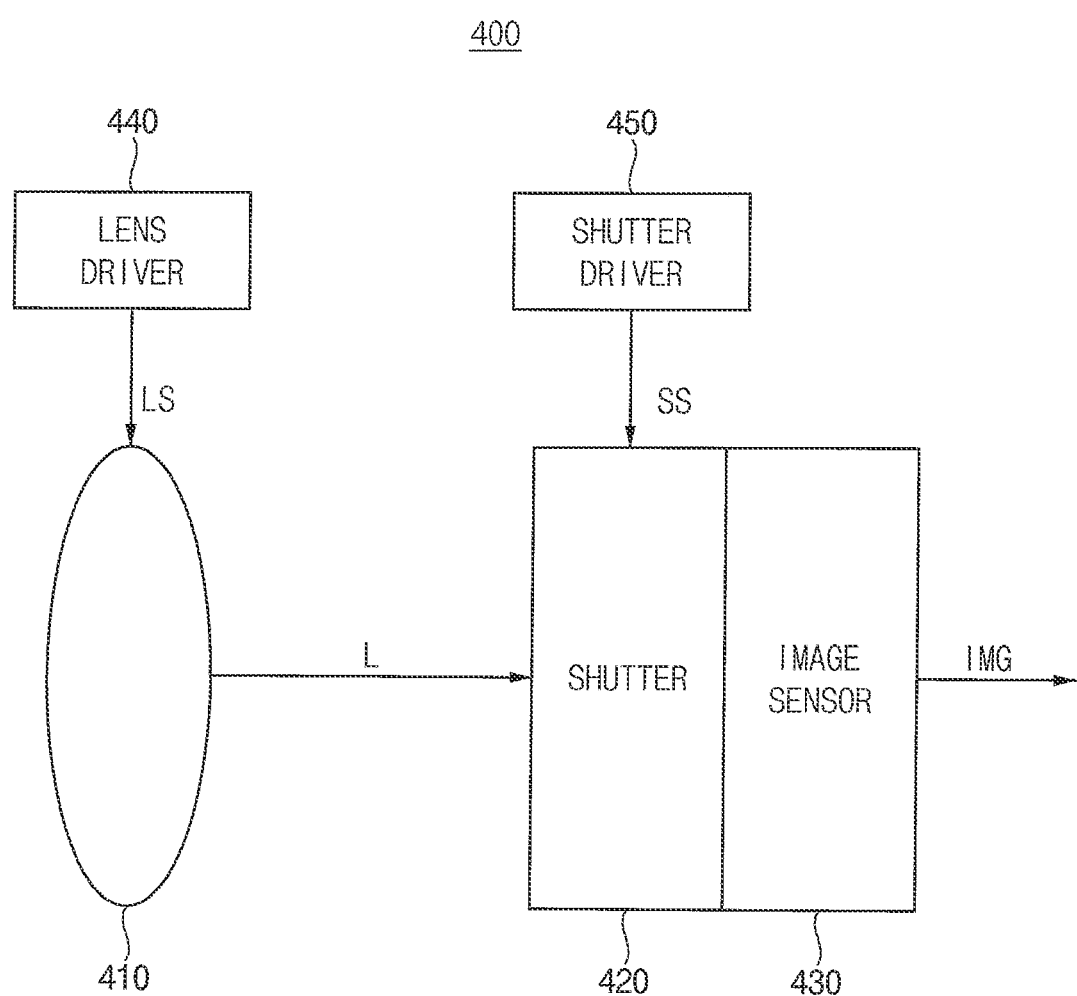
FIG. 7 is a block diagram illustrating an example of one of a plurality of first camera included in a multi-camera system of FIG. 5.

FIG. 7 is a block diagram illustrating an example of one of a plurality of first camera included in a multi-camera system of FIG. 5.

Referring to FIG. 7, a first camera 400 may include a first lens 410, a first shutter 420, a first sensor 430, a first lens driver 440 and a first shutter driver 450.

The first lens 410 may concentrate a first light signal L received from the outside on the first sensor 430. For example, the first light signal L may include a visible light signal, an infrared light signal and/or a near-infrared light signal. Although FIG. 7 shows that the first camera 400 includes a single lens 410, a camera may include two lenses or more than two lenses according to other exemplary embodiments.

The first sensor 430 may obtain a first image IMG based on the first light signal L. In some exemplary embodiments, the first sensor 430 may include a complementary metal oxide semiconductor (CMOS) image sensor. For example, the first sensor 430 may include an RGB sensor. In other exemplary embodiments, the first sensor 430 may include one of various types of image sensors, such as a charged coupled device (CCD) image sensor.

The first shutter 420 may selectively provide the first light signal L to the first sensor 430. For example, the first shutter 420 may include one of an electrical shutter, an optical shutter, a mechanical shutter, and/or the like. In some exemplary embodiments, the first shutter 420 may be integrated with the first sensor 430. In other exemplary embodiments, the first shutter 420 may be separate from the first sensor 430.

The first lens driver 440 may generate a first lens control signal LS for controlling a position of the first lens 410. For example, the first lens driver 440 may include one of various types of motors, such as a voice coil motor (VCM). The first shutter driver 450 may generate a first shutter control signal SS for controlling a switching time of the first shutter 420 (e.g., a time point of opening or closing the first shutter 420) and/or an exposure time of the first shutter 420 (e.g., an integration period of the first shutter 420).

Figure 8:
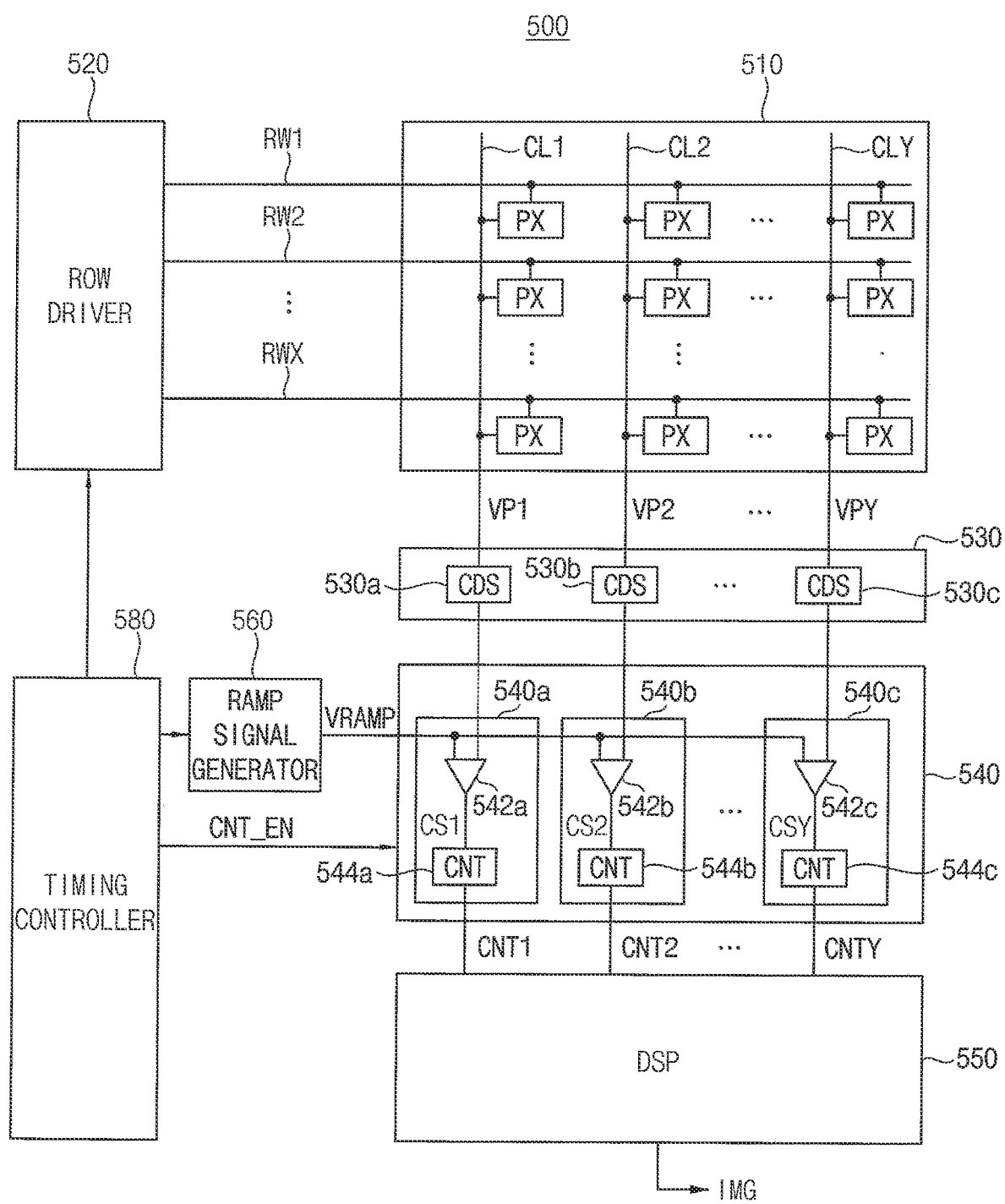
FIG. 8 is a block diagram illustrating an example of a first sensor included in a first camera of FIG. 7.

FIG. 8 is a block diagram illustrating an example of a first sensor included in a first camera of FIG. 7.

Referring to FIG. 8, a first sensor 500 may include a pixel array 510 and an image sensor driver integrated circuit. The image sensor driver integrated circuit may include a row driver 520, a correlated double sampling (CDS) block 530, an analog-to-digital converting (ADC) block 540, a digital signal processor (DSP) 550, a ramp signal generator 560 and a timing controller 580.

The pixel array 510 may include a plurality of pixels (or unit pixels) PX that are arranged in a matrix formation. Each of the plurality of pixels PX may be connected to a respective one of a plurality of rows RW1, RW2, . . . , RWX and a respective one of a plurality of columns CL1, CL2, . . . , CLY, where each of X and Y is a natural number greater than or equal to two. The pixel array 510 may generate a plurality of analog pixel signals VP1, VP2, . . . , VPY based on incident light. Pixels implemented in hardware, such as the pixels PX may be referred herein as sensor pixels.

The row driver 520 may be connected to the plurality of rows RW1 to RWX of the pixel array 510. The row driver 520 may generate driving signals to drive the plurality of rows RW1 to RWX. For example, the row driver 520 may drive the plurality of pixels PX included in the pixel array 510 row by row.

The correlated double sampling block 530 may include a plurality of correlated double sampling circuits (CDSs) 530a, 530b, . . . , 530c. The plurality of correlated double sampling circuits 530a to 530c may be connected to the plurality of columns CL1 to CLY of the pixel array 510. The plurality of correlated double sampling circuits 530a to 530c may perform a correlated double sampling operation on the plurality of analog pixel signals VP1 to VPY output from the pixel array 510.

The analog-to-digital converting block 540 may include a plurality of analog-to-digital converters 540a, 540b, . . . , 540c. The plurality of analog-to-digital converters 540a to 540c may be connected to the plurality of columns CL1 to CLY of the pixel array 510 via the plurality of correlated double sampling circuits 530a to 530c. The plurality of analog-to-digital converters 540a to 540c may perform a column analog-to-digital converting operation that converts the plurality of analog pixel signals VP1 to VPY (e.g., a plurality of correlated double sampled analog pixel signals output from the plurality of correlated double sampling circuits 530a to 530c) into a plurality of digital signals CNT1, CNT2, . . . , CNTY in parallel (e.g., simultaneously or concurrently).

Each of the plurality of analog-to-digital converters 540a to 540c may include a respective one of a plurality of comparators 542a, 542b, . . . , 542c and a respective one of a plurality of counters (CNTs) 544a, 544b, . . . , 544c. For example, the first analog-to-digital converter 540a may include the first comparator 542a and the first counter 544a. The first comparator 542a may compare the first analog pixel signal VP1 (e.g., the correlated double sampled first analog pixel signal output from the first correlated double sampling circuit 530a) with a ramp signal VRAMP to generate a first comparison signal CS1. The first counter 544a may count a level transition timing of the first comparison signal CS1 to generate the first digital signal CNT1.

Operations of the correlated double sampling block 530 and the analog-to-digital converting block 540 may be performed on the plurality of pixels PX included in the pixel array 510 row by row.

The plurality of correlated double sampling circuits 530a to 530c and the plurality of analog-to-digital converters 540a to 540c may form a plurality of column driving circuits. For example, the first correlated double sampling circuit 530a and the first analog-to-digital converter 540a may form a first column driving circuit.

The digital signal processor 550 may perform a digital signal processing based on the plurality of digital signals CNT1 to CNTY. The digital signal processor 550 may output the first image IMG that is generated by the digital signal processing.

The ramp signal generator 560 may generate the ramp signal VRAMP. The timing controller 580 may control overall operation timings of the first sensor 500, and may generate control signals including a count enable signal CNT_EN, a clock signal (not illustrated), etc.

Figure 9A:
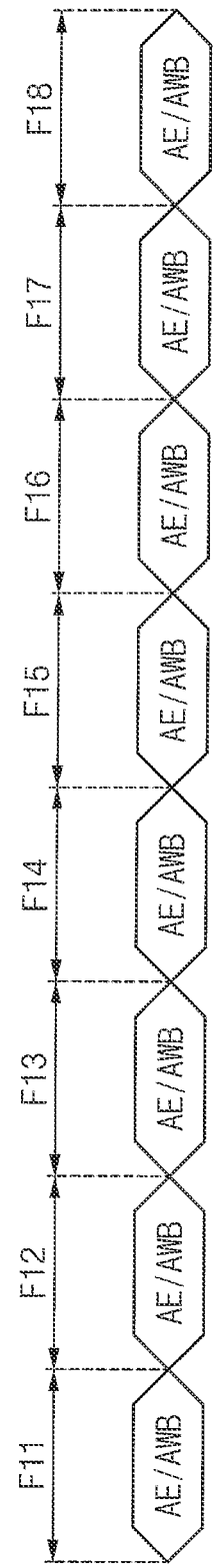
FIGS. 9A, 9B and 9C are diagrams for describing operations of a multi-camera system according to exemplary embodiments.
Figure 9B:
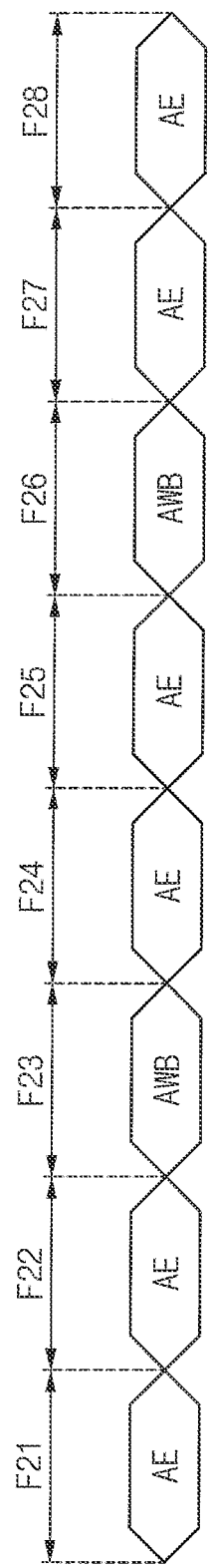
Figure 9C:
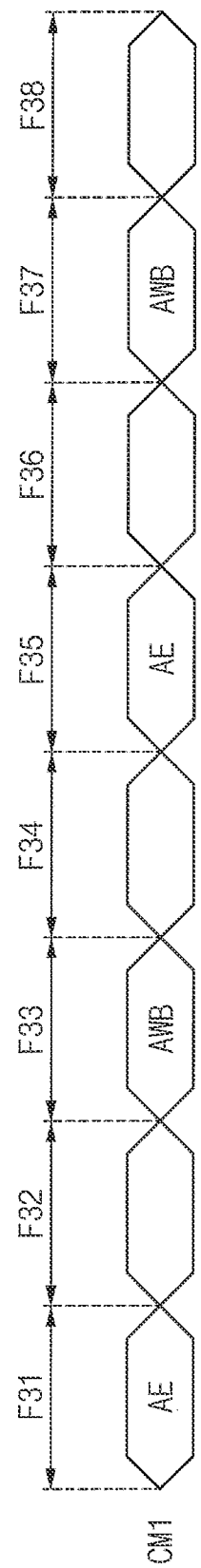

FIGS. 9A, 9B and 9C are diagrams for describing operations of a multi-camera system according to exemplary embodiments.

Referring to FIG. 9A, an example where a first master camera CM1 performs both the first auto exposure and the first auto white balance for every frame is illustrated. For example, each of a plurality of frame intervals F11, F12, F13, F14, F15, F16, F17 and F18 may represent a time interval in which the first master camera CM1 outputs one frame image, and both the first auto exposure and the first auto white balance may be performed in each of frame intervals F11 to F18. In other words, all of steps S110, S210, S310 and S320 may be performed in every frame interval.

Referring to FIG. 9B, an example where a first master camera CM1 performs only one of the first auto exposure and the first auto white balance for every frame is illustrated. For example, among a plurality of frame intervals F21, F22, F23, F24, F25, F26, F27 and F28, only the first auto exposure may be performed in each of the frame intervals F21, F22, F24, F25, F27 and F28, and only the first auto white balance may be performed each of the frame intervals F23 and F26. For example, the first auto exposure and the first auto white balance may be alternately performed. In other words, only steps S110 and S310 may be performed in one frame interval (e.g., the frame interval F21), and only steps S210 and S320 may be performed in another frame interval (e.g., the frame interval F23).

Referring to FIG. 9C, an example where a first master camera CM1 performs only one the first auto exposure and the first auto white balance in a first frame and does not perform both the first auto exposure and the first auto white balance in a second frame subsequent to the first frame is illustrated, where the first frame and the second frame are two consecutive frames. For example, among a plurality of frame intervals F31, F32, F33, F34, F35, F36, F37 and F38, only the first auto exposure may be performed in each of the frame intervals F31 and F35, only the first auto white balance may be performed in each of the frame intervals F33 and F37, and neither the first auto exposure nor the first auto white balance may be performed in each of the frame intervals F32, F34, F36 and F38.

As described above, in the example of FIG. 9A, the first auto exposure and the first auto white balance may be performed every first period (or cycle) that is substantially the same as the frame interval of the first master camera CM1. In the example of FIG. 9B, the first auto exposure and the first auto white balance may be performed every second period that is longer than the first period. In the example of FIG. 9C, the first auto exposure and the first auto white balance may be performed every third period that is longer than the second period. The example of FIG. 9A, the example of FIG. 9B and the example of FIG. 9C may be referred to as a first operation mode, a second operation mode and a third operation mode, respectively.

In some exemplary embodiments, the multi-camera system 100 may operate in one of the first, second and third operation modes, and the operation mode of the multi-camera system 100 may be changed. For example, as will be described with reference to FIG. 10 and the like, the multi-camera system 100 may change the operation mode based on an illumination (or lighting) environment. For example, when a change in the illumination environment is relatively great (e.g., when the illumination environment is unstable, variable or fickle), the first auto exposure and the first auto white balance may be performed relatively frequently as in the first operation mode. For example, when the change in the illumination environment is relatively small (e.g., when the illumination environment is stable or stabilized), the first auto exposure and the first auto white balance may be performed relatively infrequently as in the second and third operation modes. For example, the first operation mode may be referred to as a fluctuation mode, and the second and third operation modes may be referred to as a stabilization mode. For example, the second operation mode may be referred to as a first stabilization mode, and the third operation mode may be referred to as a second stabilization mode.

Figure 10:
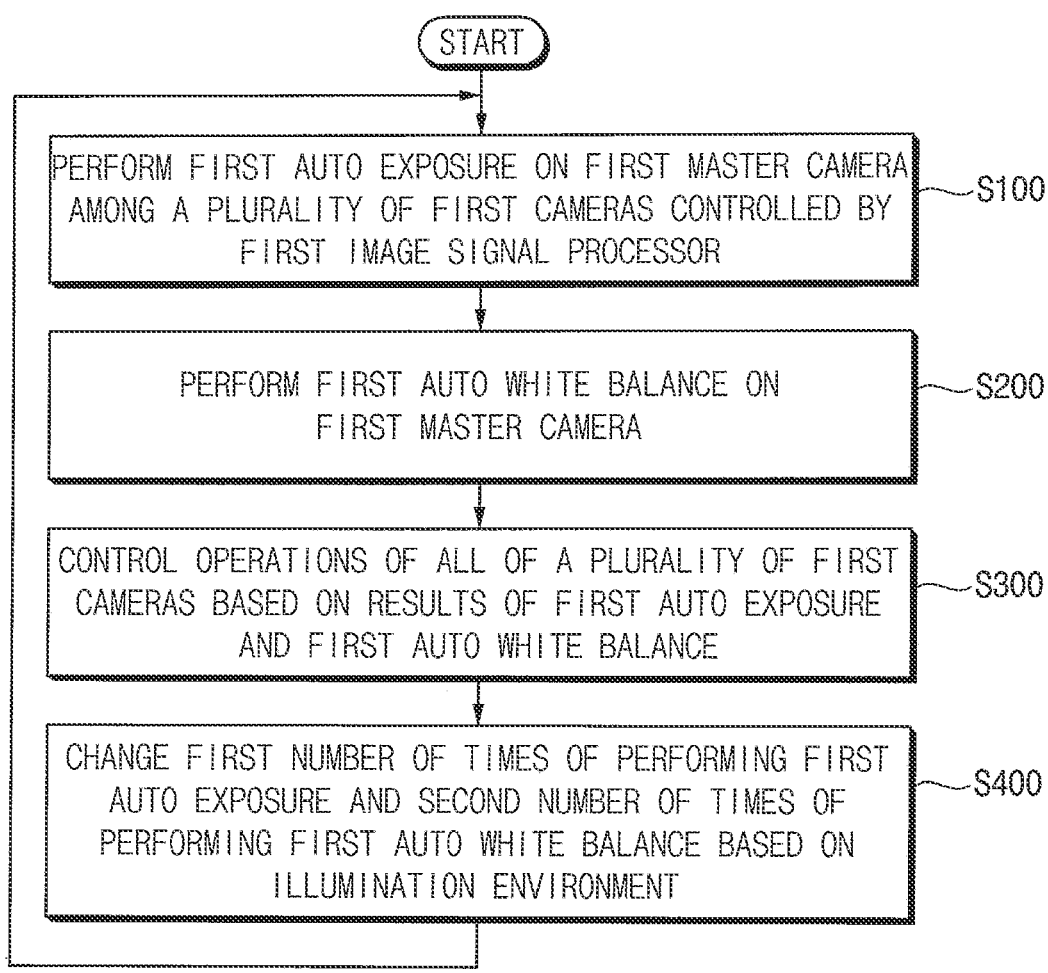
FIG. 10 is a flowchart illustrating a method of operating a multi-camera system according to exemplary embodiments.

FIG. 10 is a flowchart illustrating a method of operating a multi-camera system according to exemplary embodiments. The descriptions repeated with respect to FIG. 1 will be omitted as redundant.

Referring to FIG. 10, in a method of operating a multi-camera system according to exemplary embodiment, steps S100, S200 and S300 may be substantially the same as steps S100, S200 and S300 in FIG. 1, respectively.

A first number of times of performing the first auto exposure and a second number of times of performing the first auto white balance may be changed based on the illumination environment (step S400). For example, the first number of times may represent the number of times the first auto exposure is performed for a unit time interval, and the second number of times may represent the number of times the first auto white balance is performed for a unit time interval. The first number of times and the second number of times may be referred to as a first execution period and a second execution period, respectively.

Steps S100, S200, S300 and S400 may be repeatedly performed while the multi-camera system is operating or driving.

Figure 11:
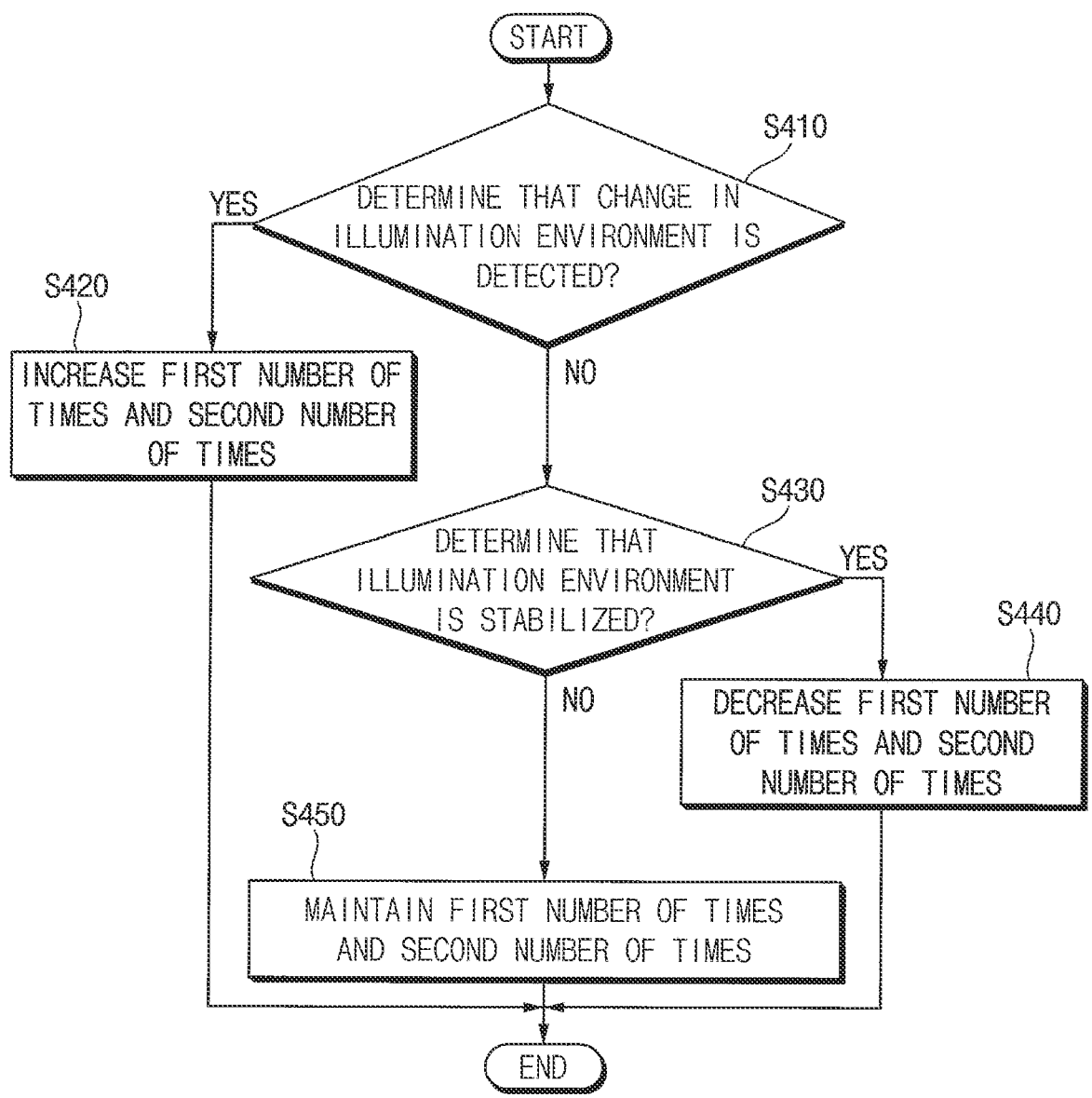
FIG. 11 is a flowchart illustrating an example of changing a first number of times and a second number of times based on an illumination environment in FIG. 10.

FIG. 11 is a flowchart illustrating an example of changing a first number of times and a second number of times based on an illumination environment in FIG. 10.

Referring to FIGS. 10 and 11, when changing the first number of times and the second number of times based on the illumination environment (step S400), when it is determined that the change in the illumination environment is detected (step S410: YES), the first number of times and the second number of times may increase (step S420).

When it is not determined that the change in the illumination environment is detected (step S410: NO), and when it is determined that the illumination environment is stabilized (step S430: YES), the first number of times and the second number of times may decrease (step S440).

When it is not determined that the change in the illumination environment is detected (step S410: NO), and when it is not determined that the illumination environment is stabilized (step S430: NO), the first number of times and the second number of times may be maintained without increasing or decreasing (step S450).

In some exemplary embodiments, as in the fluctuation mode (or the first operation mode) of FIG. 9A, the first number of times and the second number of times may be equal to each other. In some exemplary embodiments, as in the first stabilization mode (or the second operation mode) of FIG. 9B, the first number of times and the second number of times may be different from each other.

In some exemplary embodiments, the operation of determining that the change in the illumination environment is detected and the operation of determining that the illumination environment is stabilized may be performed using the first sensor gain obtained as the result of performing the first auto exposure, the first RGB gain obtained as the result of performing the first auto white balance, and/or an external control signal, which will be described with reference to FIGS. 12A, 12B, 12C, 12D, 13A, 13B, 13C, 13D, 14A and 14B.

FIGS. 12A, 12B, 12C, 12D, 13A, 13B, 13C, 13D, 14A and 14B are flowcharts illustrating examples of an operation of FIG. 11.

Figure 12A:
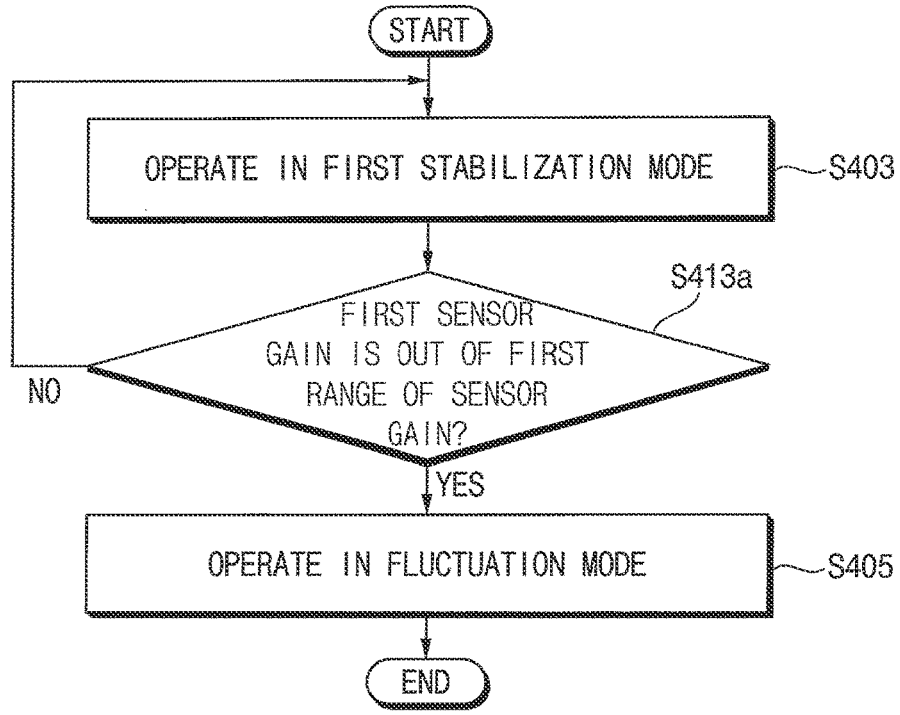
FIGS. 12A, 12B, 12C, 12D, 13A, 13B, 13C, 13D, 14A and 14B are flowcharts illustrating examples of an operation of FIG. 11.
Figure 12B:
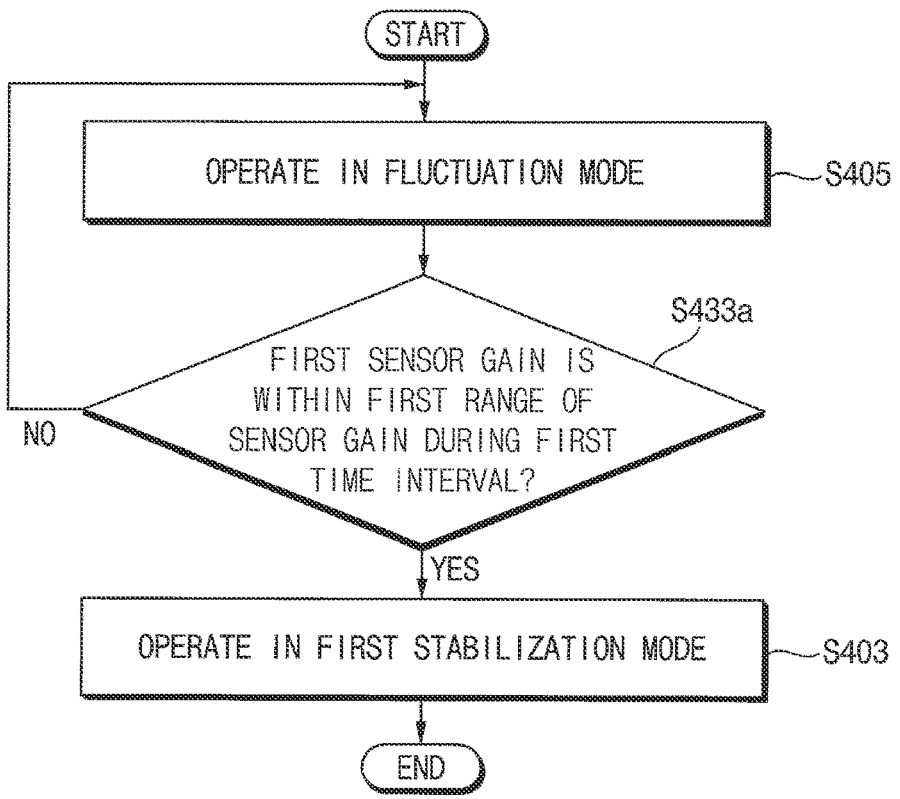

Referring to FIGS. 12A and 12B, examples where the multi-camera system 100 operates in one of the fluctuation mode and the first stabilization mode and operates using the first sensor gain obtained as the result of performing the first auto exposure are illustrated.

In some exemplary embodiments, as illustrated in FIG. 12A, the multi-camera system 100 may operate in the first stabilization mode at an initial operation time (step S403). When the first sensor gain is within a first range of sensor gain (step S413a: NO), the multi-camera system 100 may continue to operate in the first stabilization mode (step S403). When the first sensor gain is out of the first range of sensor gain (step S413a: YES), e.g., when the first sensor gain is changed beyond a predetermined threshold value, it may be determined that the change in the illumination environment is detected, and thus the multi-camera system 100 may operate in the fluctuation mode (step S405).

In other exemplary embodiments, as illustrated in FIG. 12B, the multi-camera system 100 may operate in the fluctuation mode at an initial operation time (step S405). When the first sensor gain is out of the first range of sensor gain (step S433*a*: NO), the multi-camera system 100 may continue to operate in the fluctuation mode (step S405). When the first sensor gain remains within the first range of sensor gain during a first time interval (step S433*a*: YES), e.g., when the first sensor gain is changed only within the predetermined threshold value for more than predetermined frame intervals, it may be determined that the illumination environment is stabilized, and thus the multi-camera system 100 may operate in the first stabilization mode (step S403).

Figure 12C:
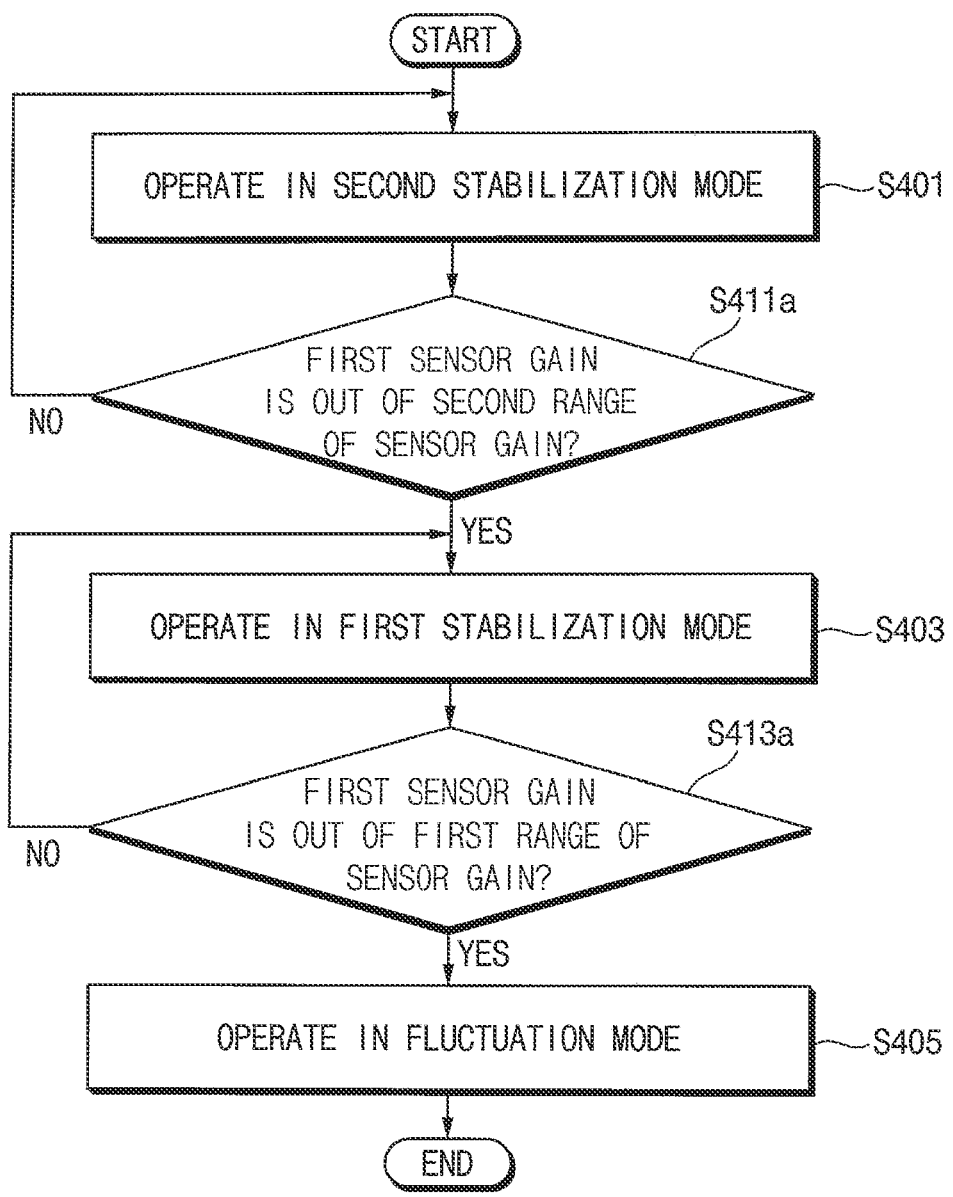
Figure 12D:
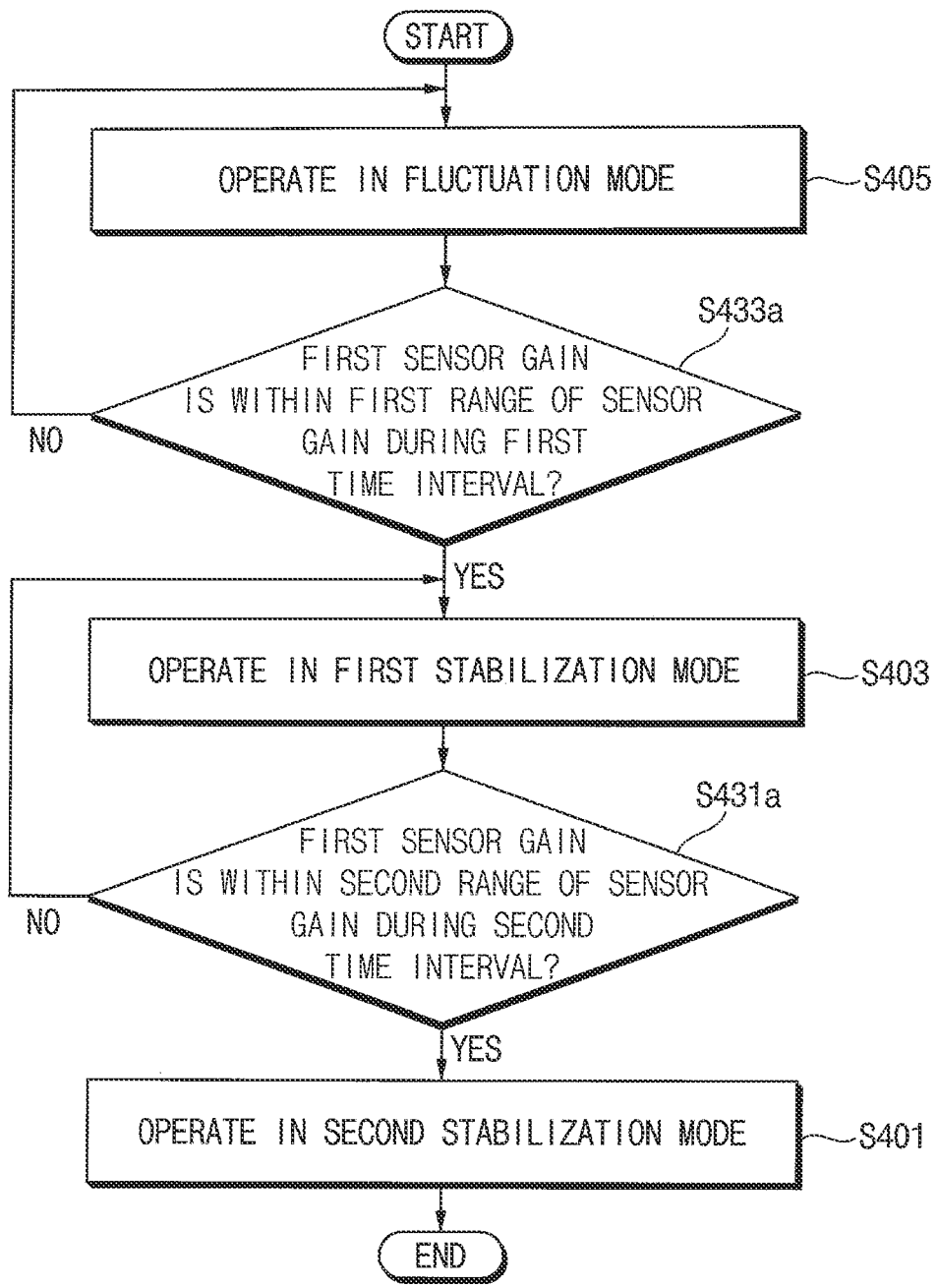

Referring to FIGS. 12C and 12D, examples where the multi-camera system 100 operates in one of the fluctuation mode, the first stabilization mode and the second stabilization mode and operates using the first sensor gain obtained as the result of performing the first auto exposure are illustrated. The descriptions repeated with respect to FIGS. 12A and 12B will be omitted as redundant.

In some exemplary embodiments, as illustrated in FIG. 12C, the multi-camera system 100 may operate in the second stabilization mode at an initial operation time (step S401). When the first sensor gain is within a second range of sensor gain (step S411*a*: NO), the multi-camera system 100 may continue to operate in the second stabilization mode (step S401). When the first sensor gain is out of the second range of sensor gain (step S411*a*: YES), the multi-camera system 100 may operate in the first stabilization mode (step S403). Steps S403, S413*a* and S405 may be substantially the same as steps S403, S413*a* and S405 in FIG. 12A, respectively.

In some exemplary embodiments, the second range of sensor gain may be less than the first range of sensor gain. For example, the second range of sensor gain may be included in the first range of sensor gain. When the first sensor gain is within the second range of sensor gain, the multi-camera system 100 may operate in the second stabilization mode. When the first sensor gain is out of the second range of sensor gain and is within the first range of sensor gain, the multi-camera system 100 may operate in the first stabilization mode. When the first sensor gain is out of the first range of sensor gain, the multi-camera system 100 may operate in the fluctuation mode.

In other exemplary embodiments, as illustrated in FIG. 12D, steps S405, S433*a* and S403 may be substantially the same as steps S405, S433*a* and S403 in FIG. 12B, respectively. When the first sensor gain is out of the second range of sensor gain (step S431*a*: NO), the multi-camera system 100 may continue to operate in the first stabilization mode (step S403). When the first sensor gain remains within the second range of sensor gain during a second time interval (step S431*a*: YES), the multi-camera system 100 may operate in the second stabilization mode (step S401). For example, the second time interval may be longer than the first time interval.

Figure 13A:
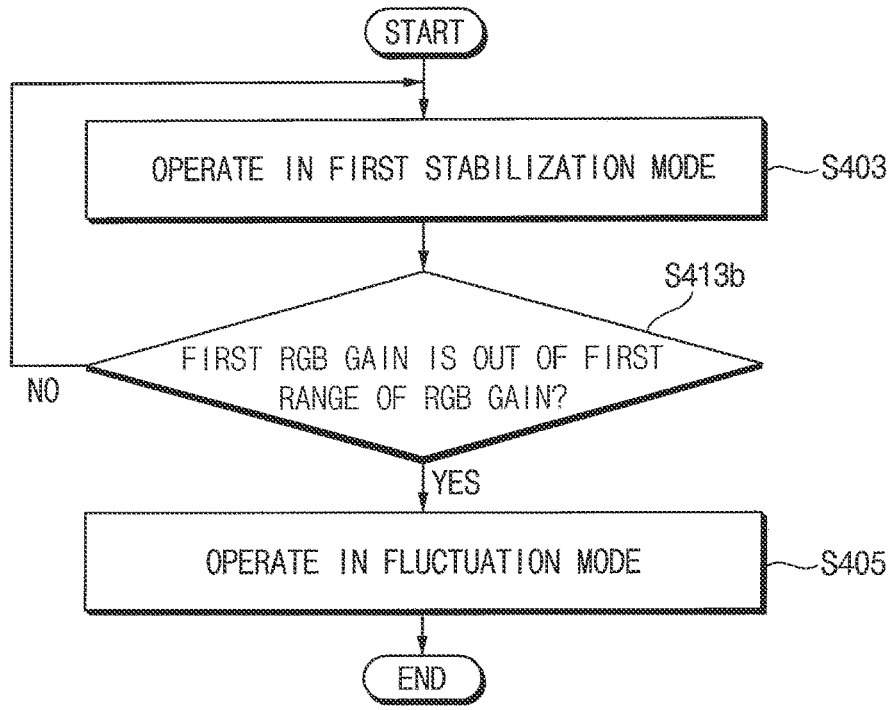
Figure 13B:
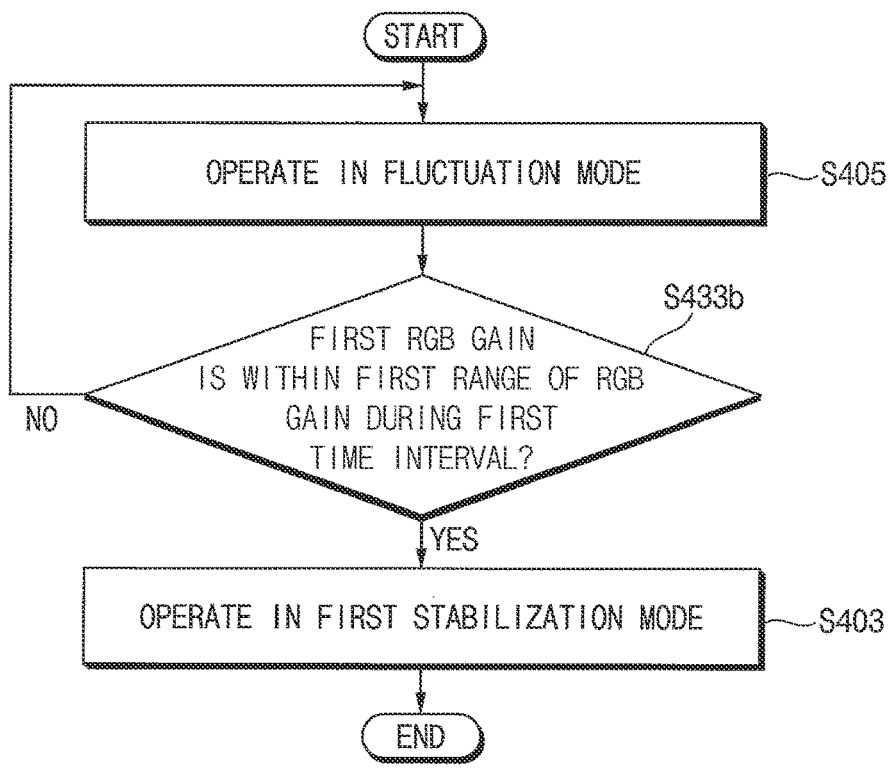

Referring to FIGS. 13A and 13B, examples where the multi-camera system 100 operates in one of the fluctuation mode and the first stabilization mode and operates using the first RGB gain obtained as the result of performing the first auto white balance are illustrated.

In some exemplary embodiments, as illustrated in FIG. 13A, the multi-camera system 100 may operate in the first stabilization mode at an initial operation time (step S403). When the first RGB gain is within a first range of RGB gain (step S413*b*: NO), the multi-camera system 100 may continue to operate in the first stabilization mode (step S403). When the first RGB gain is out of the first range of RGB gain (step S413*b*: YES), e.g., when a ratio of R gain and B gain included in the first RGB gain is changed beyond a predetermined threshold value, it may be determined that the change in the illumination environment is detected, and thus the multi-camera system 100 may operate in the fluctuation mode (step S405).

In other exemplary embodiments, as illustrated in FIG. 13B, the multi-camera system 100 may operate in the fluctuation mode at an initial operation time (step S405). When the first RGB gain is out of the first range of RGB gain (step S433*b*: NO), the multi-camera system 100 may continue to operate in the fluctuation mode (step S405). When the first RGB gain remains within the first range of RGB gain during a first time interval (step S433*a*: YES), e.g., when the ratio of R gain and B gain included in the first RGB gain is changed only within the predetermined threshold value for more than predetermined frame intervals, it may be determined that the illumination environment is stabilized, and thus the multi-camera system 100 may operate in the first stabilization mode (step S403).

Figure 13C:
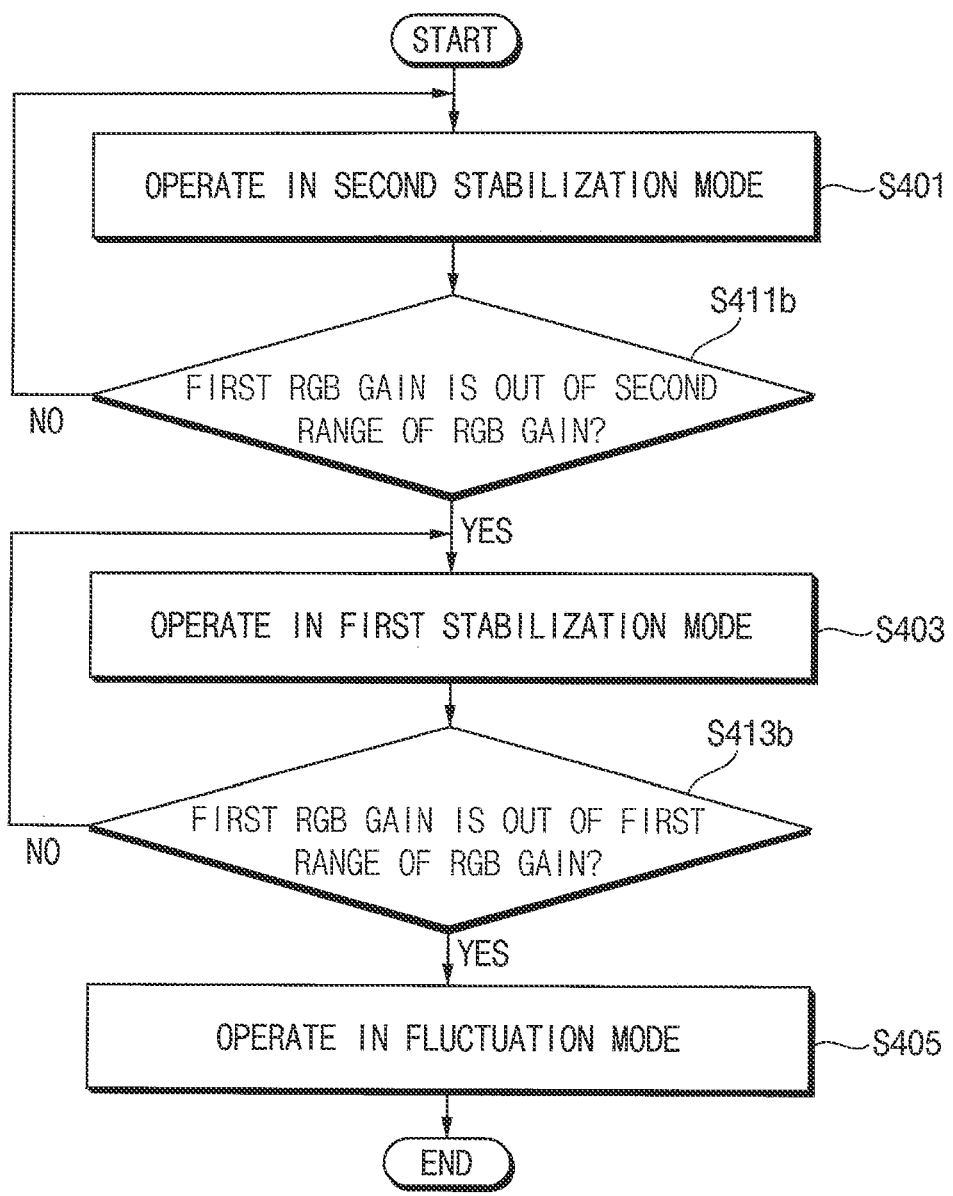
Figure 13D:
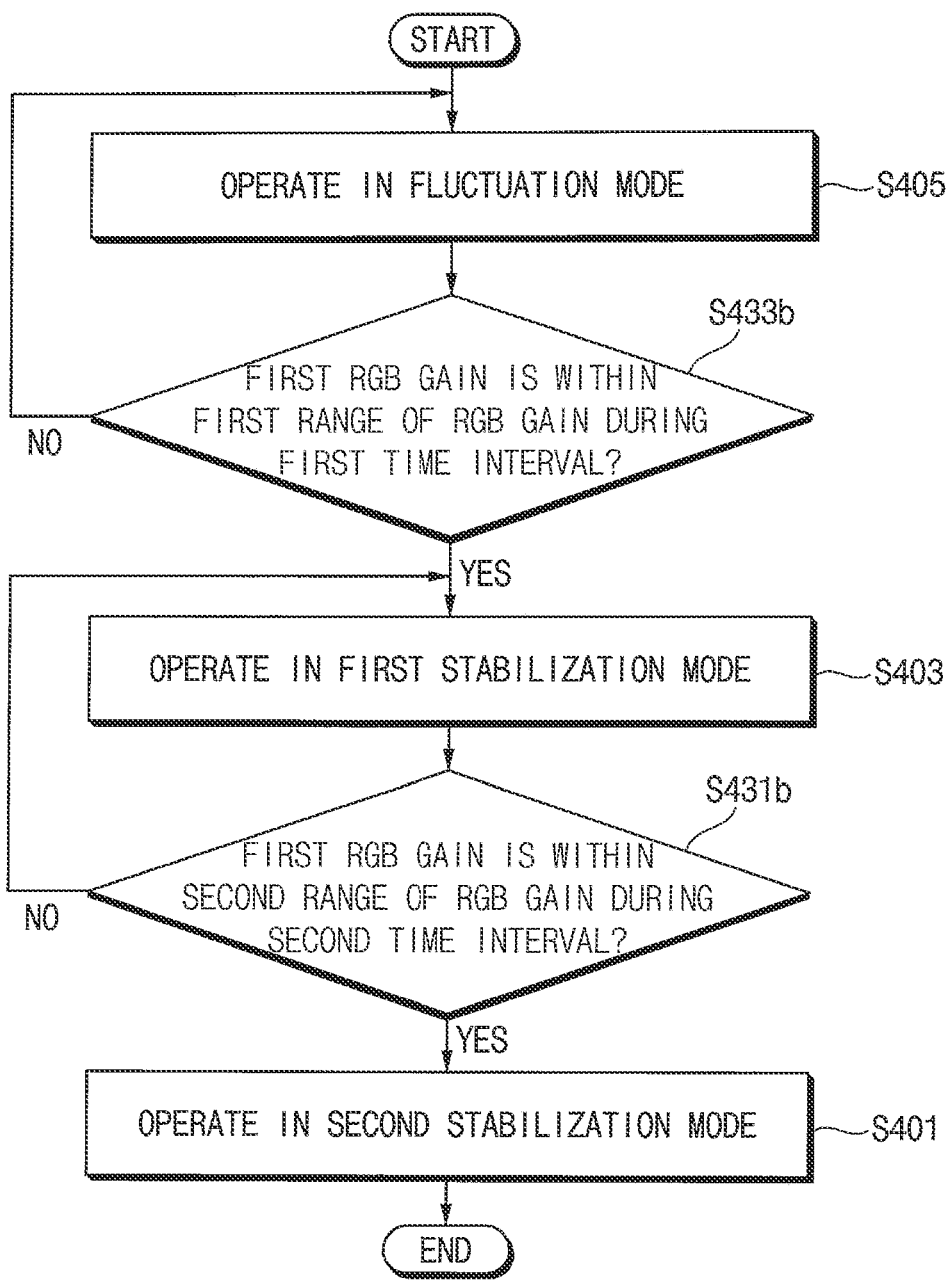

Referring to FIGS. 13C and 13D, examples where the multi-camera system 100 operates in one of the fluctuation mode, the first stabilization mode and the second stabilization mode and operates using the first RGB gain obtained as the result of performing the first auto white balance are illustrated. The descriptions repeated with respect to FIGS. 13A and 13B will be omitted as redundant.

In some exemplary embodiments, as illustrated in FIG. 13C, the multi-camera system 100 may operate in the second stabilization mode at an initial operation time (step S401). When the first RGB gain is within a second range of RGB gain (step S411*b*: NO), the multi-camera system 100 may continue to operate in the second stabilization mode (step S401). When the first RGB gain is out of the second range of RGB gain (step S411*b*: YES), the multi-camera system 100 may operate in the first stabilization mode (step S403). Steps S403, S413*b* and S405 may be substantially the same as steps S403, S413*b* and S405 in FIG. 13A, respectively.

In some exemplary embodiments, the second range of RGB gain may be less than the first range of RGB gain. For example, the second range of RGB gain may be included in the first range of RGB gain.

In other exemplary embodiments, as illustrated in FIG. 13D, steps S405, S433*b* and S403 may be substantially the same as steps S405, S433*b* and S403 in FIG. 13B, respectively. When the first RGB gain is out of the second range of RGB gain (step S431*b*: NO), the multi-camera system 100 may continue to operate in the first stabilization mode (step S403). When the first RGB gain remains within the second range of RGB gain during a second time interval (step S431*b*: YES), the multi-camera system 100 may operate in the second stabilization mode (step S401). For example, the second time interval may be longer than the first time interval.

Figure 14A:
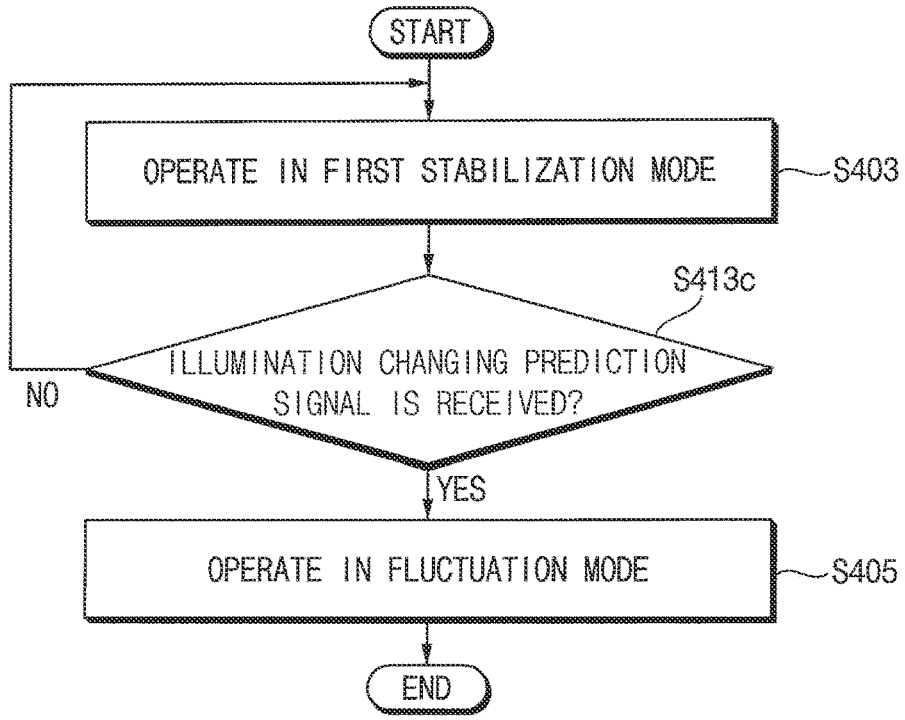
Figure 14B:
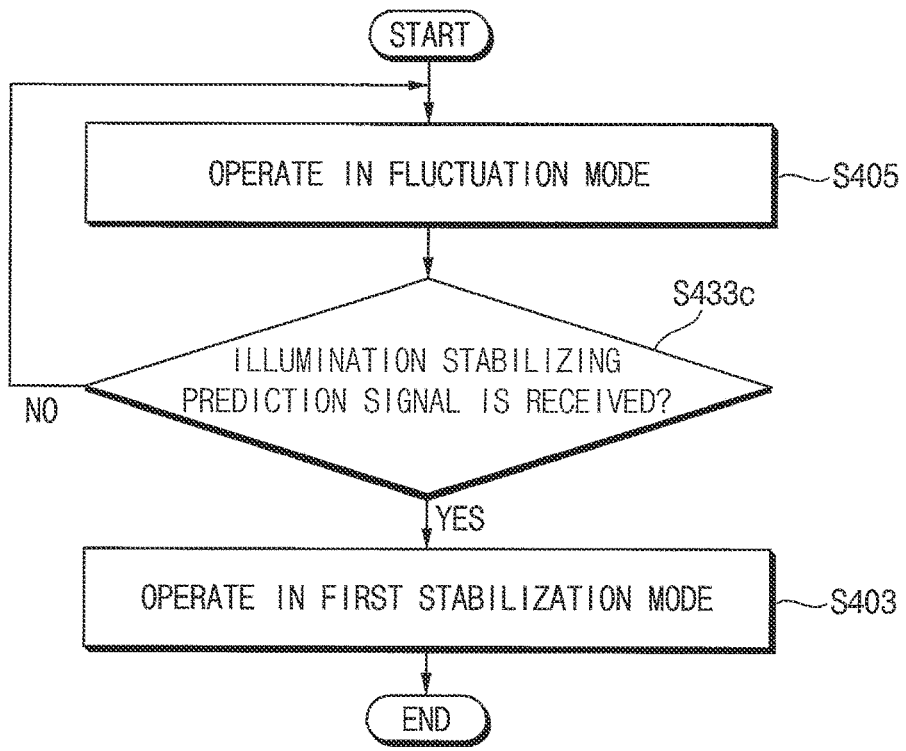

Referring to FIGS. 14A and 14B, examples where the multi-camera system 100 operates in one of the fluctuation mode and the first stabilization mode and operates using the external control signal received from the exterior (e.g., from an external device) are illustrated.

In some exemplary embodiments, as illustrated in FIG. 14A, the multi-camera system 100 may operate in the first stabilization mode at an initial operation time (step S403). When an illumination changing prediction signal is not received from the exterior (step S413*c*: NO), the multi-camera system 100 may continue to operate in the first stabilization mode (step S403). When the illumination changing prediction signal is received from the exterior (step S413*c*: YES), e.g., when a navigation device notifies of a situation in which the illumination environment is expected to change rapidly, such as entering a tunnel, the multi-camera system 100 may operate in the fluctuation mode (step S405).

In other exemplary embodiments, as illustrated in FIG. 14B, the multi-camera system 100 may operate in the fluctuation mode at an initial operation time (step S405). When an illumination stabilizing prediction signal is not received from the exterior (step S433c: NO), the multi-camera system 100 may continue to operate in the fluctuation mode (step S405). When the illumination stabilizing prediction signal is received from the exterior (step S433c: YES), e.g., when a navigation device notifies of a situation in which little change in the illumination environment is expected, such as entering a straight road without obstacles, the multi-camera system 100 may operate in the first stabilization mode (step S403).

Although not illustrated in detail, exemplary embodiments may be implemented by combining two or more of the operations of FIGS. 12A, 12B, 12C, 12D, 13A, 13B, 13C, 13D, 14A and 14B.

Figure 15:
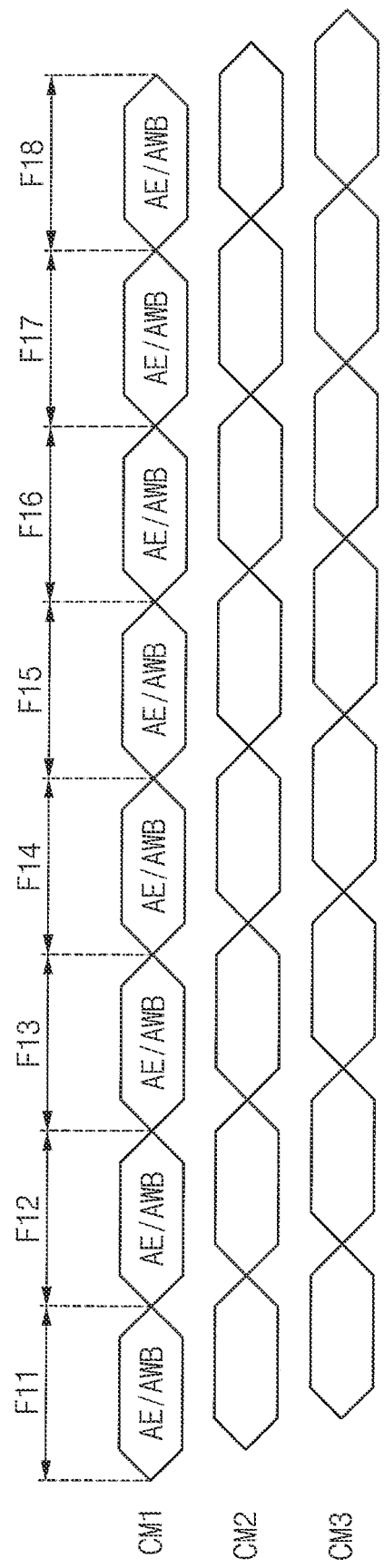
FIG. 15 is a diagram for describing an operation of a multi-camera system according to exemplary embodiments.

FIG. 15 is a diagram for describing an operation of a multi-camera system according to further exemplary embodiments. The descriptions repeated with respect to FIG. 9A will be omitted as redundant.

Referring to FIG. 15, as with that described with reference to FIG. 9A, the first master camera CM1 may perform both the first auto exposure and the first auto white balance for every frame. In addition, the remaining cameras CM2 and CM3 may operate using the results of the first auto exposure and the first auto white balance performed by the first master camera CM1 for every frame. In the example of FIG. 15, outputs of the cameras CM1, CM2 and CM3, e.g., frame images output from the cameras CM1, CM2 and CM3 may not be synchronized with each other.

Figure 16:
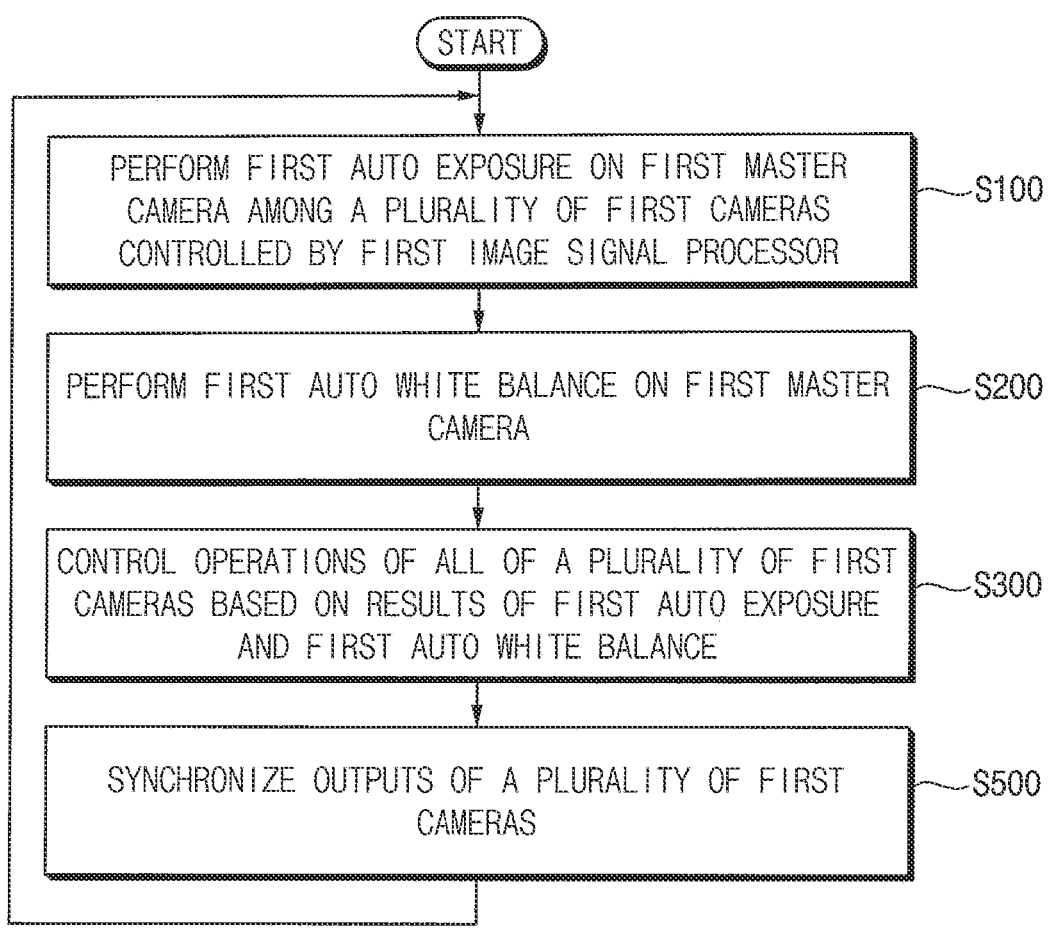
FIG. 16 is a flowchart illustrating a method of operating a multi-camera system according to exemplary embodiments.

FIG. 16 is a flowchart illustrating a method of operating a multi-camera system according to exemplary embodiments. The descriptions repeated with respect to FIG. 1 will be omitted as redundant.

Referring to FIG. 16, in a method of operating a multi-camera system according to exemplary embodiments, steps S100, S200 and S300 may be substantially the same as steps S100, S200 and S300 in FIG. 1, respectively.

Outputs of the plurality of first cameras may be synchronized (step S500). For example, unlike that described with reference to FIG. 15, frame images output from the plurality of first cameras may be synchronized with each other, which will be described with reference to FIGS. 19A, 19B and 19C.

Steps S100, S200, S300 and S500 may be repeatedly performed while the multi-camera system is operating or driving.

In some exemplary embodiments, both step S400 in FIG. 10 and step S500 in FIG. 16 may be performed.

Figure 17:
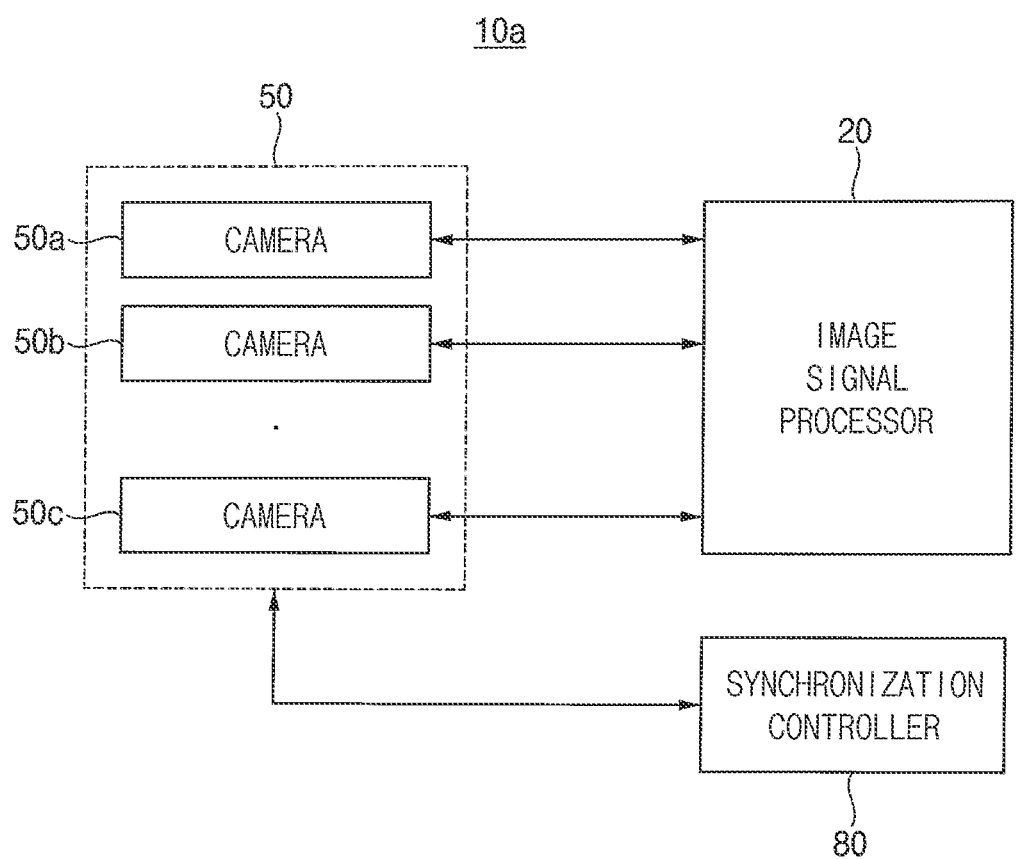
FIG. 17 is a block diagram illustrating a multi-camera system according to exemplary embodiments.

FIG. 17 is a block diagram illustrating a multi-camera system according to exemplary embodiments. The descriptions repeated with respect to FIG. 2 will be omitted as redundant.

Referring to FIG. 17, a multi-camera system 10a may include a first image signal processor 20 and a plurality of first cameras 50. The multi-camera system 10a may further include a synchronization controller 80 that synchronizes outputs of the plurality of first cameras 50.

The multi-camera system 10a may be substantially the same as the multi-camera system 10 of FIG. 2, except that the multi-camera system 10a further includes the synchronization controller 80.

Figure 18:
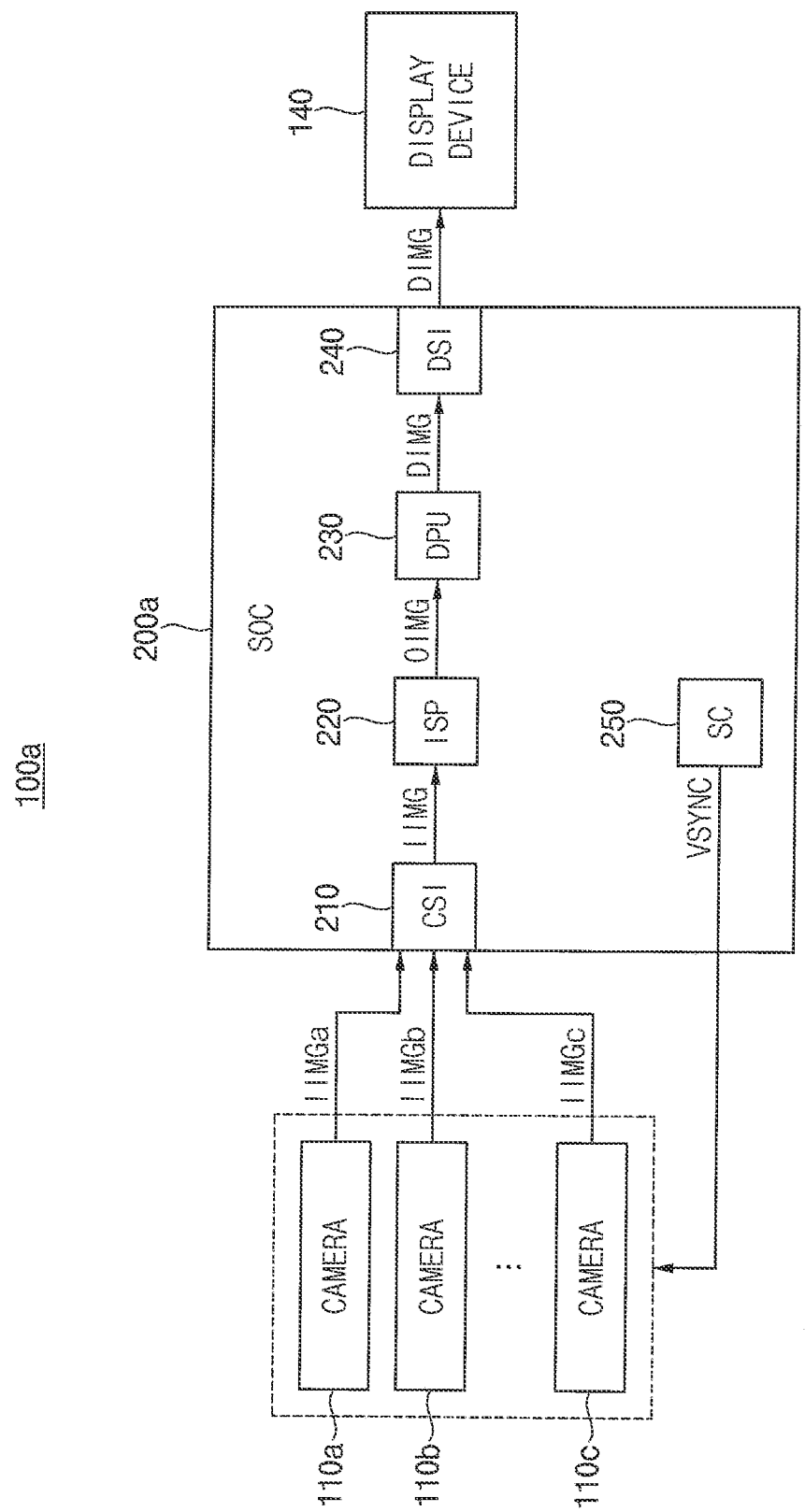
FIG. 18 is a block diagram illustrating an example of a multi-camera system of FIG. 17.

FIG. 18 is a block diagram illustrating an example of a multi-camera system of FIG. 17. The descriptions repeated with respect to FIG. 5 will be omitted as redundant.

Referring to FIG. 18, a multi-camera system 100a may include a system-on-chip 200a, a plurality of first cameras 110a, 110b and 110c, and a first display device 140.

The multi-camera system 100a may be substantially the same as the multi-camera system 100 of FIG. 5, except that the system-on-chip 200a further includes a synchronization controller (SC) 250.

The synchronization controller 250 may generate a first synchronization signal VSYNC, and may provide the first synchronization signal VSYNC to the plurality of first cameras 110a, 110b and 110c. The plurality of first input images IIMGa, IIMGb and IIMGc output from the plurality of first cameras 110a, 110b and 110c may be synchronized based on the first synchronization signal VSYNC.

Figure 19A:
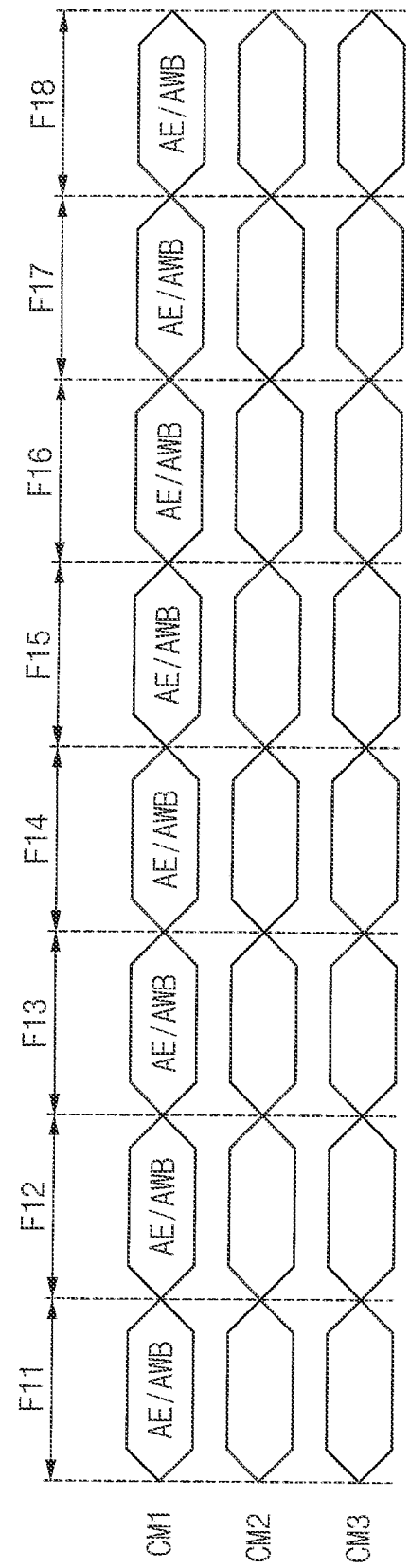
FIGS. 19A, 19B and 19C are diagrams for describing operations of a multi-camera system according to exemplary embodiments.
Figure 19B:
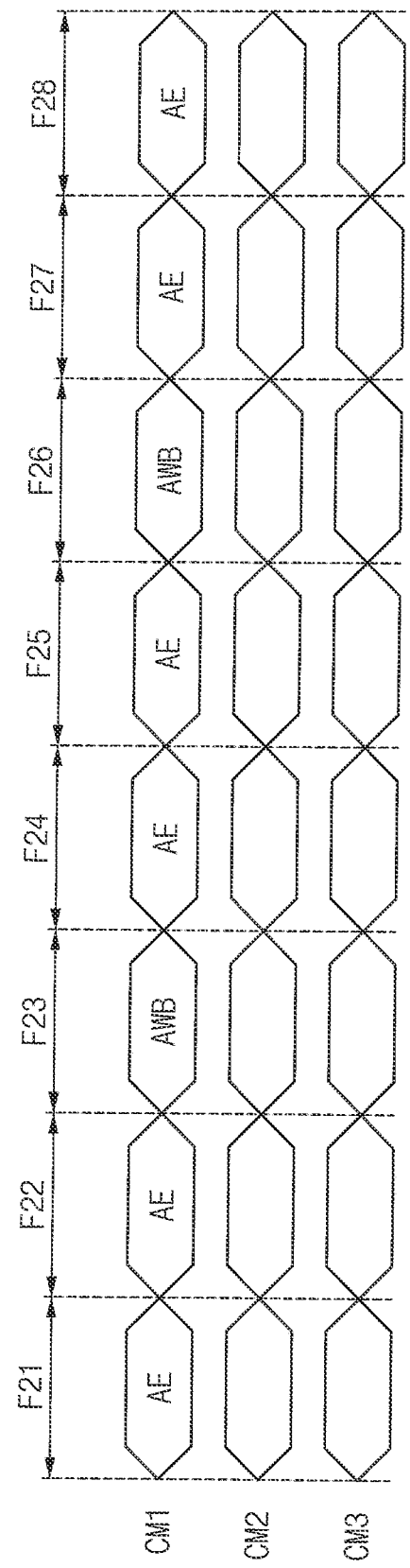
Figure 19C:
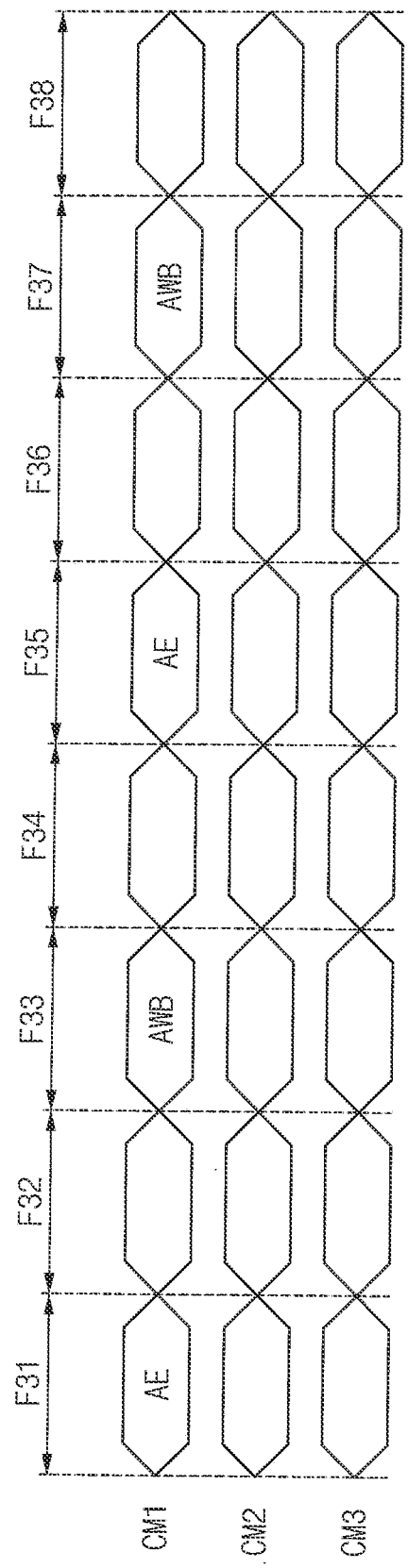

FIGS. 19A, 19B and 19C are diagrams for describing operations of a multi-camera system according to exemplary embodiments. The descriptions repeated with respect to FIGS. 9A, 9B and 9C will be omitted as redundant.

Referring to FIG. 19A, as with that described with reference to FIG. 9A, the first master camera CM1 may perform both the first auto exposure and the first auto white balance for every frame. Unlike that described with reference to FIG. 15, the outputs of the cameras CM1, CM2 and CM3, e.g., the frame images output from the cameras CM1, CM2 and CM3 may be synchronized with each other. For example, the outputs of the cameras CM1, CM2 and CM3 may be synchronized with each other based on the first synchronization signal VSYNC in FIG. 18.

Referring to FIG. 19B, as with that described with reference to FIG. 9B, the first master camera CM1 may perform only one of the first auto exposure and the first auto white balance for every frame. In addition, as with that described with reference to FIG. 19A, the outputs of the cameras CM1, CM2 and CM3 may be synchronized with each other.

Referring to FIG. 19C, as with that described with reference to FIG. 9C, the first master camera CM1 may perform only one the first auto exposure and the first auto white balance in the first frame and may not perform both the first auto exposure and the first auto white balance in the second frame subsequent to the first frame, where the first frame and the second frame are two consecutive frames. In addition, as with that described with reference to FIG. 19A, the outputs of the cameras CM1, CM2 and CM3 may be synchronized with each other.

Figure 20:
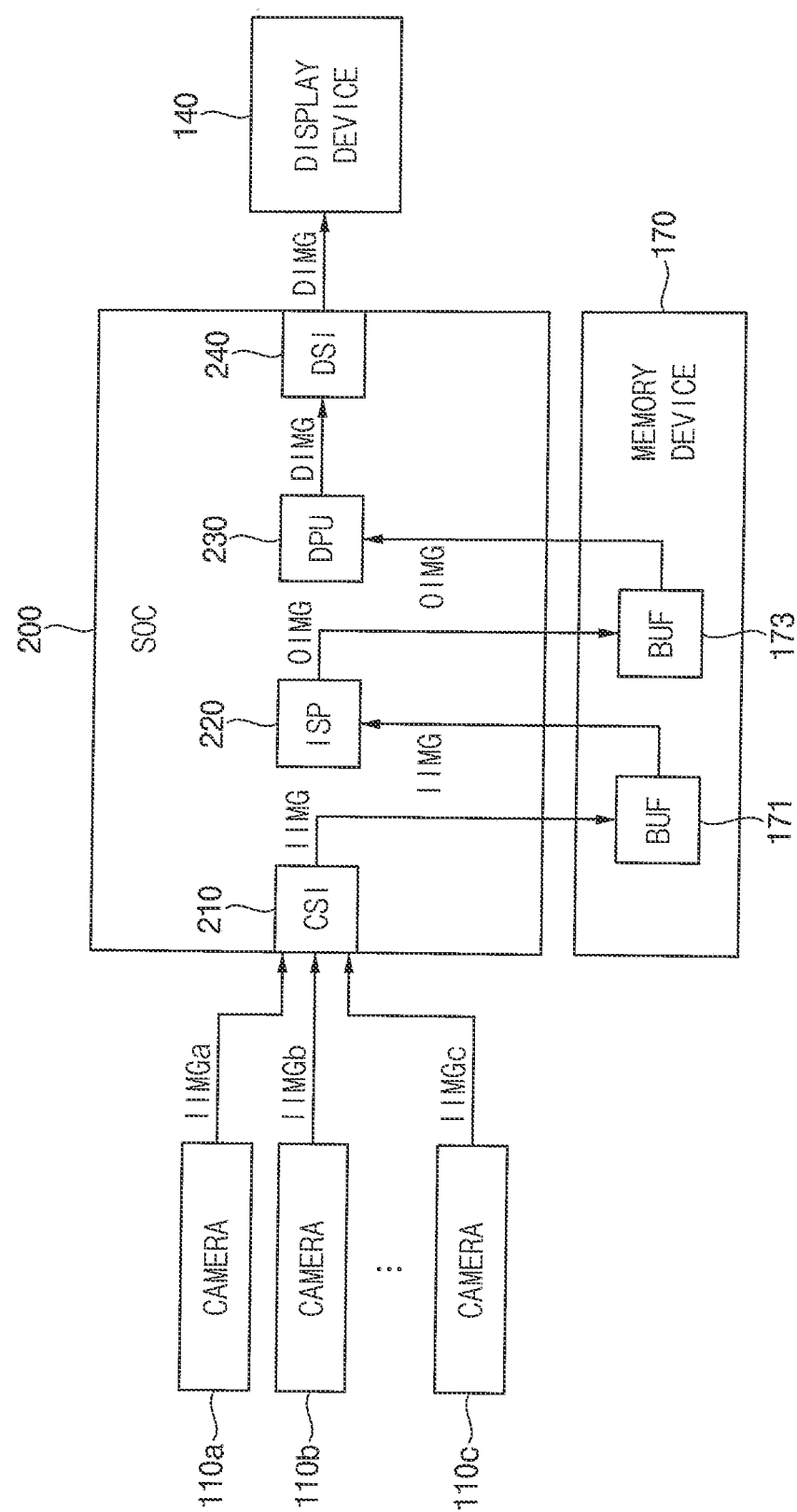
FIGS. 20 and 21 are block diagrams illustrating other examples of a multi-camera system of FIG. 2.
Figure 21:
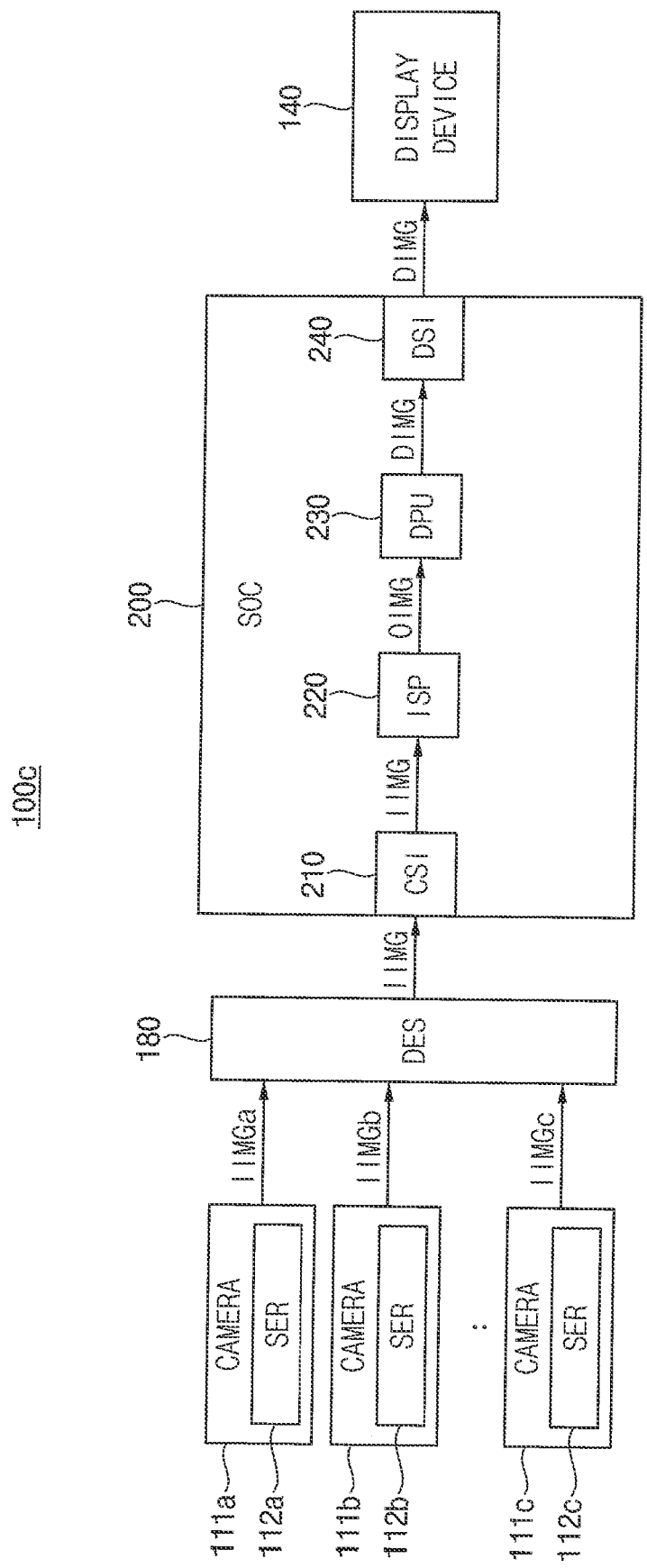

FIGS. 20 and 21 are block diagrams illustrating other examples of a multi-camera system of FIG. 2. The descriptions repeated with respect to FIG. 5 will be omitted as redundant.

Referring to FIG. 20, a multi-camera system 100b may include a system-on-chip 200, a plurality of first cameras 110a, 110b and 110c, and a first display device 140. The multi-camera system 100b may further include a memory device 170.

The multi-camera system 100b may be substantially the same as the multi-camera system 100 of FIG. 5, except that the multi-camera system 100b further includes the memory device 170.

The memory device 170 may include buffers (BUFs) 171 and 173. The buffer 171 may temporarily store the first input image IIMG, and thus, the first input image IIMG may not be directly provided from the first camera serial interface 210 to the first image signal processor 220 but may be provided to the first image signal processor 220 through the buffer 171. The buffer 173 may temporarily store the first output image OIMG, and thus, the first output image OIMG may not be directly provided from the first image signal processor 220 to the first display processing unit 230 but may be provided to the first display processing unit 230 through the buffer 173. For example, the memory device 170 may include a volatile memory such as a dynamic random access memory (DRAM).

Referring to FIG. 21, a multi-camera system 100c may include a system-on-chip 200, a plurality of first cameras 111a, 111b and 111c, and a first display device 140. The multi-camera system 100c may further include a deserializer (DES) 180. The plurality of first cameras 111a, 111b and 111c may include serializers (SERs) 112a, 112b and 112c, respectively.

The multi-camera system 100c may be substantially the same as the multi-camera system 100 of FIG. 5, except that the plurality of first cameras 111a, 111b and 111c include the serializers 112a, 112b and 112c and the multi-camera system 100c further includes the deserializer 180.

The serializers 112a, 112b and 112c and the deserializer 180 may be configurations for effective signal transmission between the plurality of first cameras 111a, 111b and 111c and the system-on-chip 200. For example, each of the serializers 112a, 112b and 112c may be an optical serializer, and the deserializer 180 may be an optical deserializer.

In some exemplary embodiments, the multi-camera system 100 of FIG. 5 may further include all the memory devices 170 in FIG. 20 and the serializers 112a, 112b and 112c and the deserializer 180 in FIG. 21. In some exemplary embodiments, the multi-camera system 10a of FIG. 18 may further include at least one of the memory devices 170 in FIG. 20 and the serializers 112a, 112b and 112c and the deserializer 180 in FIG. 21. For example, if the multi-camera system 10a of FIG. 18 further includes the serializers 112a, 112b and 112c and the deserializer 180 in FIG. 21, the first synchronization signal VSYNC may be provided to the plurality of first cameras through the deserializer 180.

Figure 22:
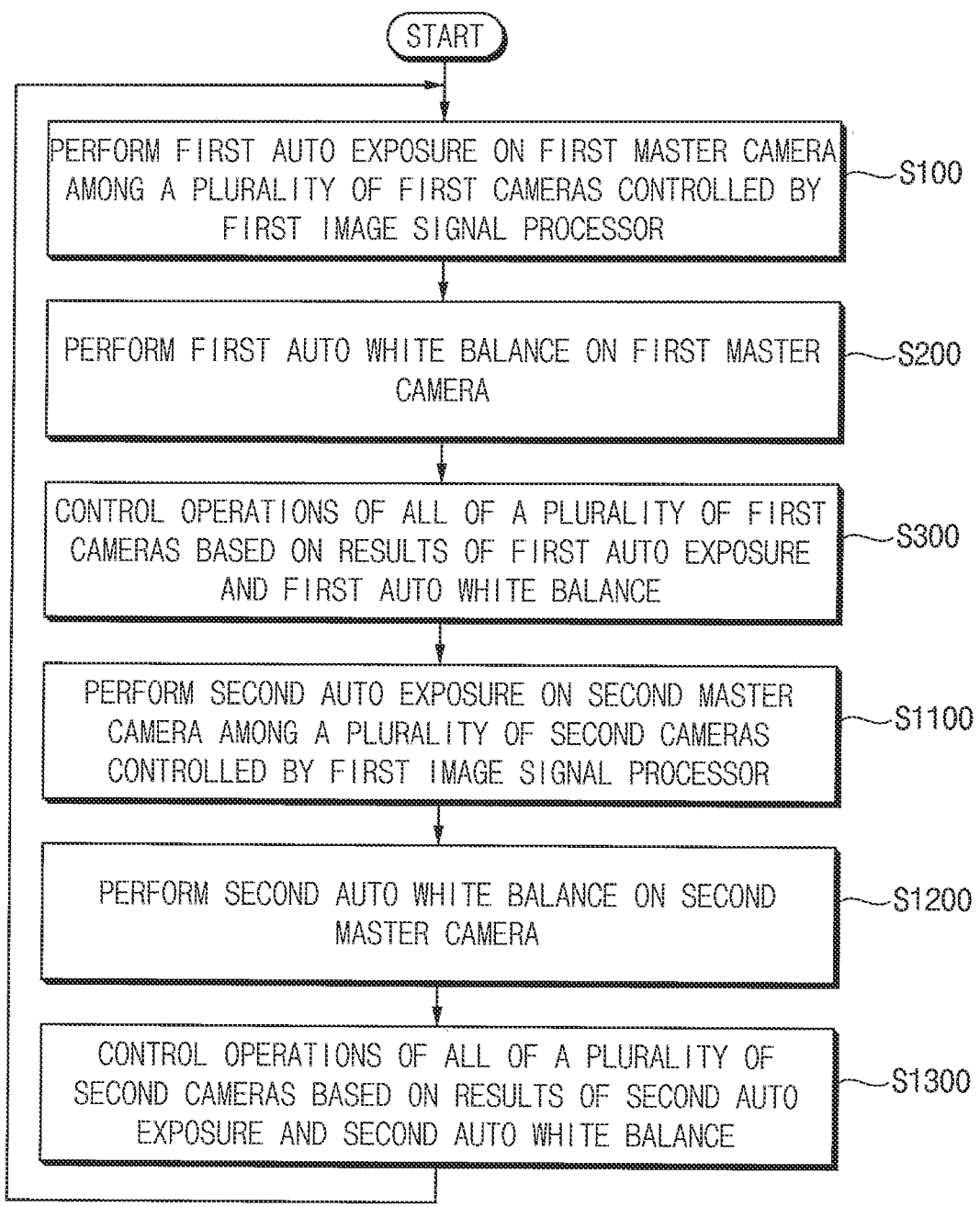
FIG. 22 is a flowchart illustrating a method of operating a multi-camera system according to exemplary embodiments.

FIG. 22 is a flowchart illustrating a method of operating a multi-camera system according to exemplary embodiments. The descriptions repeated with respect to FIG. 1 will be omitted as redundant.

Referring to FIG. 22, in a method of operating a multi-camera system according to an exemplary embodiment, steps S100, S200 and S300 may be substantially the same as steps S100, S200 and S300 in FIG. 1, respectively.

A second auto exposure is performed on a second master camera among a plurality of second cameras controlled by the first image signal processor (step S1100). The plurality of second cameras are different from the plurality of first cameras. A second auto white balance is performed on the second master camera (step S1200). Operations of all of the plurality of second cameras are controlled by the first image signal processor based on results of the second auto exposure and the second auto white balance (step S1300). Steps S1100, S1200 and S1300 may be similar to steps S100, S200 and S300, respectively.

Figure 23:
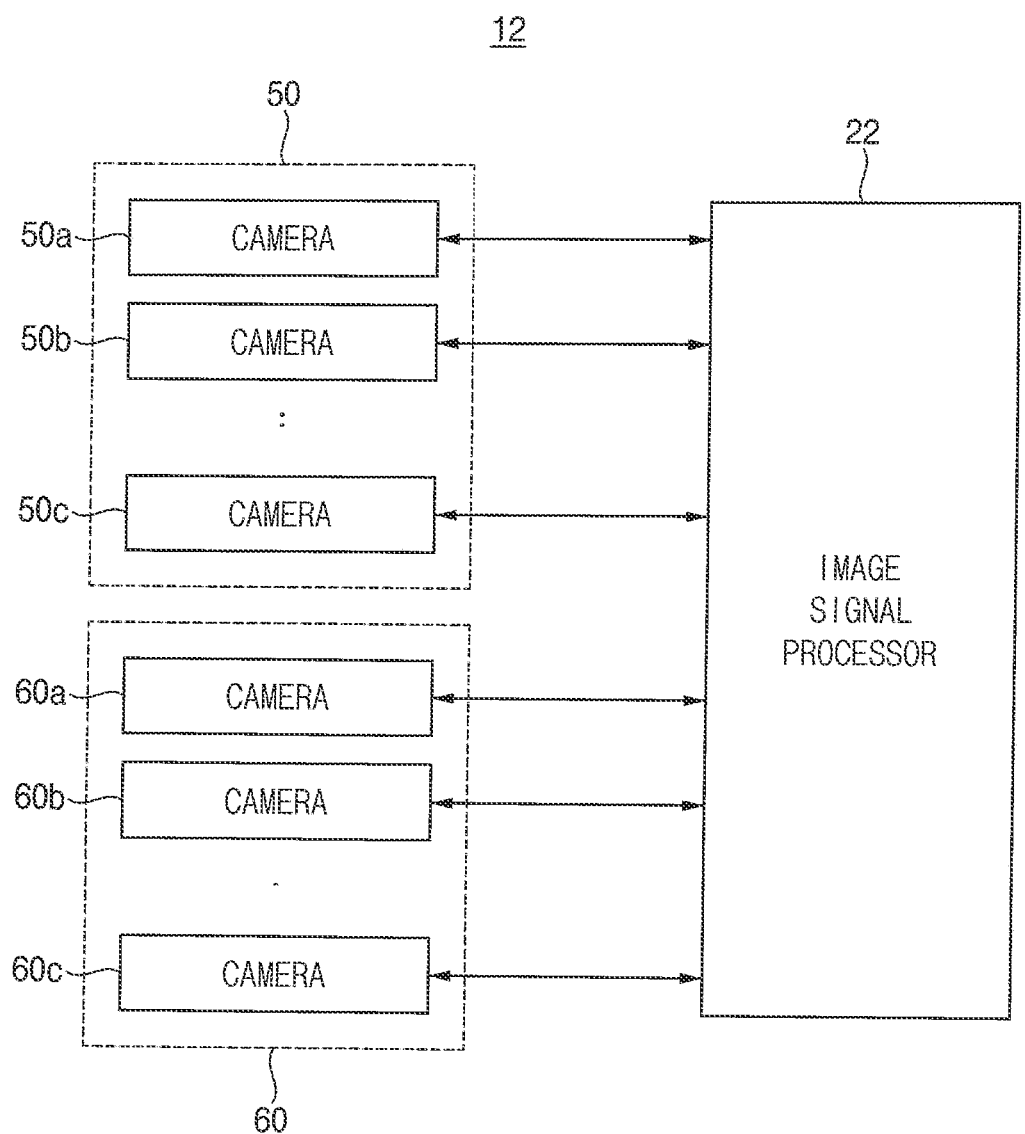
FIG. 23 is a block diagram illustrating a multi-camera system according to exemplary embodiments.

FIG. 23 is a block diagram illustrating a multi-camera system according to exemplary embodiments. The descriptions repeated with respect to FIG. 2 will be omitted as redundant.

Referring to FIG. 23, a multi-camera system 12 may include a first image signal processor 22, a plurality of first cameras 50 controlled by the first image signal processor 22, and a plurality of second cameras 60 controlled by the first image signal processor 22.

The multi-camera system 12 may be substantially the same as the multi-camera system 10 of FIG. 2, except that the multi-camera system 12 further includes the plurality of second cameras 60 and the first image signal processor 22 further controls the plurality of second cameras 60.

The plurality of second cameras 60 may include Y cameras 60a, 60b and 60c, where X is a natural number greater than or equal to two. For example, the camera 60a may be set or determined as a second master camera. In some exemplary embodiments, X representing the number of the plurality of first cameras 50 and Y representing the number of the plurality of second cameras 60 may be the same or different from each other.

In some exemplary embodiments, all of the plurality of second cameras 60 may be disposed, arranged and/or installed to face a second direction different from the first direction of the plurality of first cameras 50. In other words, the cameras disposed to face in the same direction may be grouped into the same camera group, and the cameras disposed to face in different directions may be grouped into different camera groups. In some exemplary embodiments, all of the plurality of second cameras 60 may have a second frame rate different from the first frame rate of the plurality of first cameras 50. In other words, the cameras having the same frame rate may be grouped into the same camera group, and the cameras having different frame rates may be grouped into different camera groups.

Figure 24:
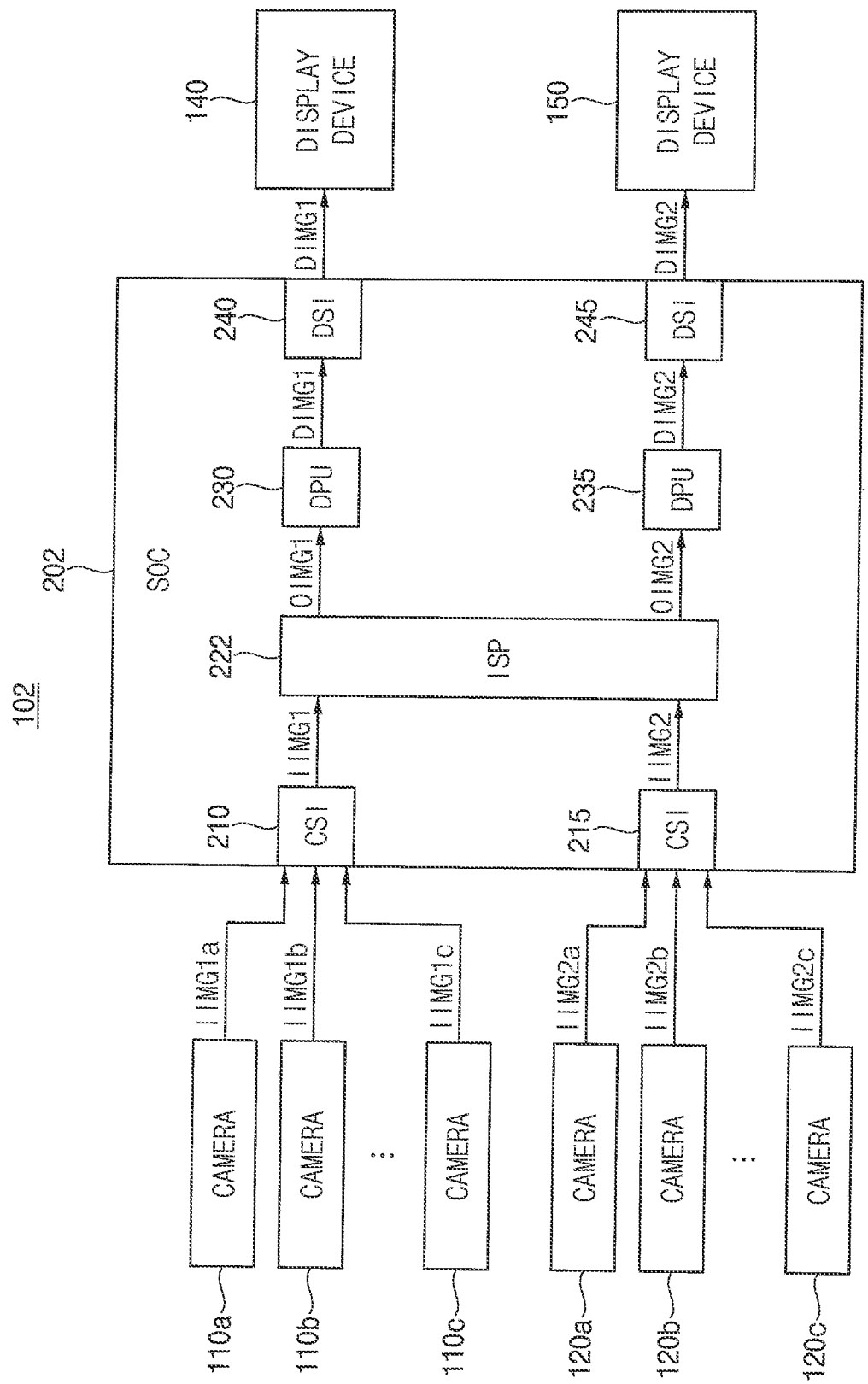
FIG. 24 is a block diagram illustrating an example of a multi-camera system of FIG. 23.

FIG. 24 is a block diagram illustrating an example of a multi-camera system of FIG. 23. The descriptions repeated with respect to FIG. 5 will be omitted as redundant.

Referring to FIG. 24, a multi-camera system 102 may include a system-on-chip 202, a plurality of first cameras 110a, 110b and 110c, a plurality of second cameras 120a, 120b and 120c, a first display device 140 and a second display device 150. The system-on-chip 202 may include a first camera serial interface 210, a second camera serial interface 215, a first image signal processor 222, a first display processing unit 230, a second display processing unit 235, a first display serial interface 240 and a second display serial interface 245.

The multi-camera system 102 may be substantially the same as the multi-camera system 100 of FIG. 5, except that the multi-camera system 102 further includes the plurality of second cameras 120a, 120b and 120c, the second display device 150, the second camera serial interface 215, the second display processing unit 235 and the second display serial interface 245. Images IIMG1a, IIMG1b, IIMG1c, IIMG1, OIMG1 and DIMG1 that are provided through the plurality of first cameras 110a, 110b and 110c, the first camera serial interface 210, the first image signal processor 222, the first display processing unit 230, the first display serial interface 240 and the first display device 140 may be substantially the same as the images IIMGa, IIMGb, IIMGc, IIMG, OIMG and DIMG of FIG. 5, respectively.

The plurality of second cameras 120a, 120b and 120c may generate a plurality of second input images IIMG2a, IIMG2b and IIMG2c. The second camera serial interface 215 may provide a second input image IIMG2 corresponding to the plurality of second input images IIMG2a, IIMG2b and IIMG2c to the first image signal processor 222. The first image signal processor 222 may generate a second output image OIMG2 by performing an image processing on the second input image IIMG2. The second display processing unit 235 may generate a second display image DIMG2 by performing an image processing on the second output image OIMG2. The second display serial interface 245 may provide the second display image DIMG2 to the second display device 150. The second display device 150 may display an image based on the second display image DIMG2.

The first image signal processor 222 may perform a method of operating the multi-camera system according to exemplary embodiments described with reference to FIG. 22. For example, the first image signal processor 222 may perform steps S100, S200 and S300 for the plurality of first cameras 110a, 110b and 110c and the first master camera 110a, and may perform steps S1100, S1200 and S1300 for the plurality of second cameras 120a, 120b and 120c and the second master camera 120a.

Figure 25:
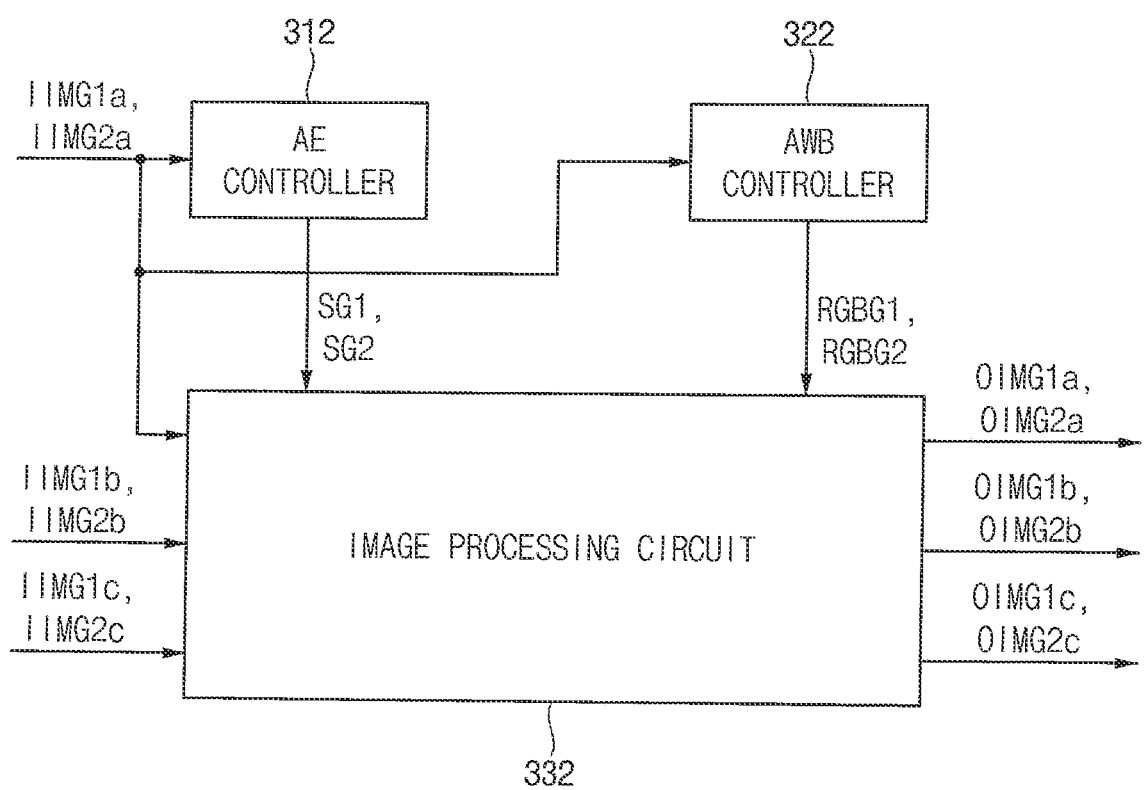
FIG. 25 is a block diagram illustrating an example of a first image signal processor included in a multi-camera system of FIG. 24.

FIG. 25 is a block diagram illustrating an example of a first image signal processor included in a multi-camera system of FIG. 24. The descriptions repeated with respect to FIG. 6 will be omitted as redundant.

Referring to FIG. 25, a first image signal processor 302 may include a first auto exposure controller 312, a first auto white balance controller 322 and a first image processing circuit 332.

The first auto exposure controller 312 may perform the first auto exposure on the first master camera 110a based on the first input image IIMG1a, may perform the second auto exposure on the second master camera 120a based on the second input image IIMG2a, and may generate a first sensor gain SG1 and a second sensor gain SG2 as results of performing the first auto exposure and the second auto exposure, respectively.

The first auto white balance controller 322 may perform the first auto white balance on the first master camera 110a based on the first input image IIMGa, may perform the second auto white balance on the second master camera 120a based on the second input image IIMG2a, and may generate a first RGB gain RGBG1 and a second RGB gain RGBG2 as results of performing the first auto white balance and the second auto white balance, respectively.

The first image processing circuit 332 may apply the first sensor gain SG1 and the first RGB gain RGBG1 to all of the plurality of first cameras 110a, 110b and 110c based on the plurality of first input images IIMG1a, IIMG1b and IIMG1c, may apply the second sensor gain SG2 and the second RGB gain RGBG2 to all of the plurality of second cameras 120a, 120b and 120c based on the plurality of second input images IIMG2a, IIMG2b and IIMG2c, and may generate a plurality of first output images OIMG1a, OIMG1b and OIMG1c and a plurality of second output images OIMG2a, OIMG2b and OIMG2c.

Figure 26:
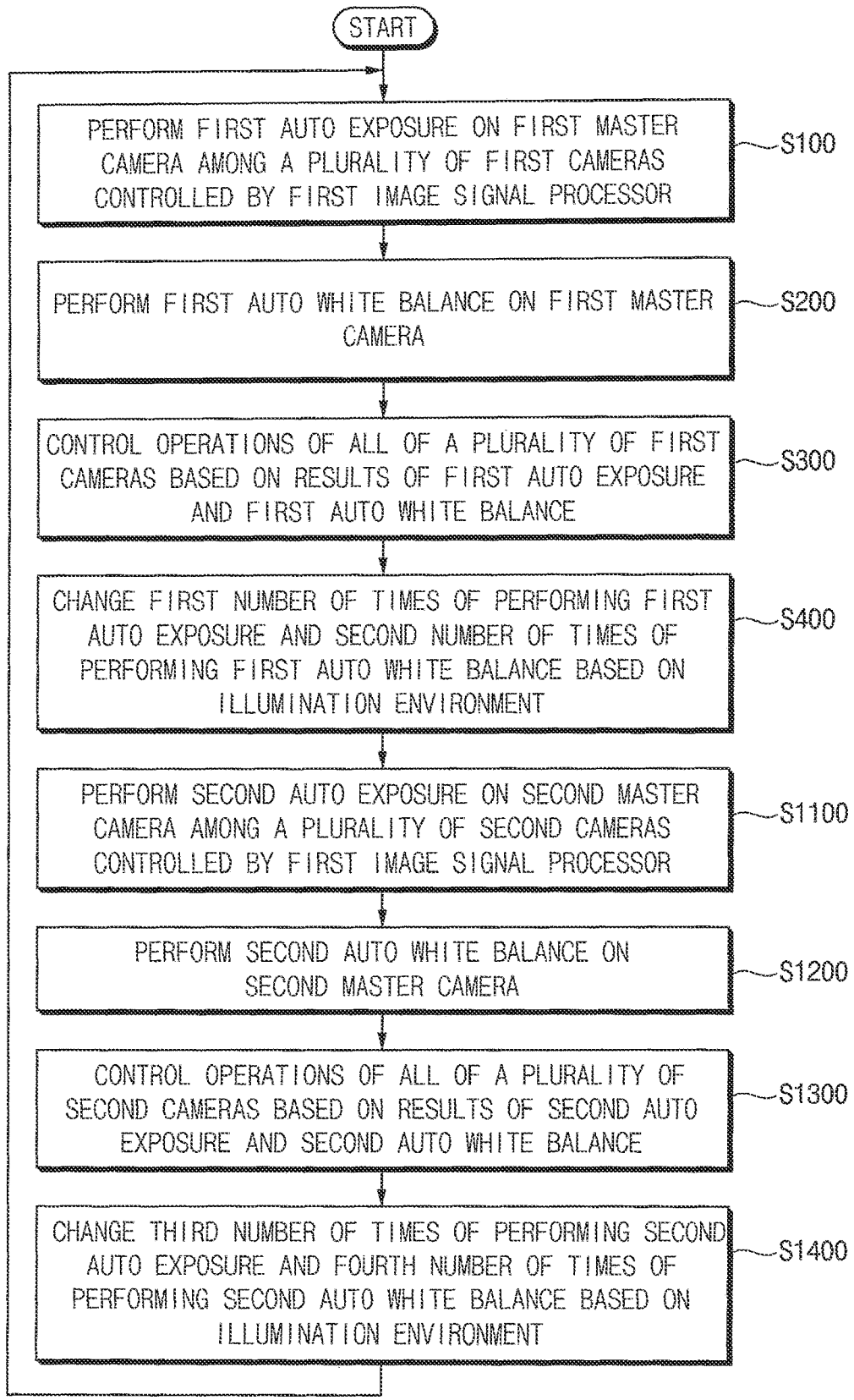
FIGS. 26 and 27 are flowcharts illustrating a method of operating a multi-camera system according to exemplary embodiments.
Figure 27:
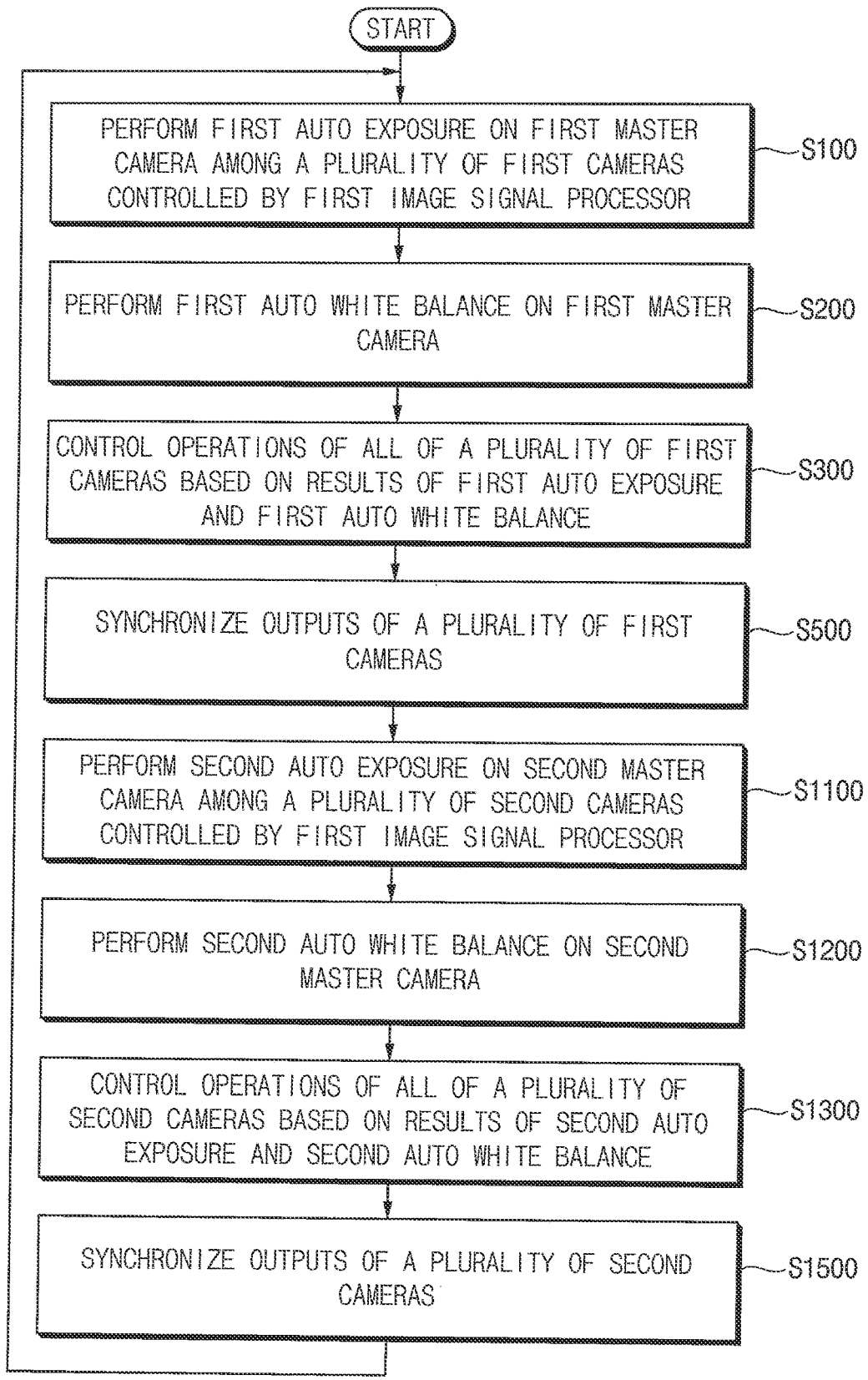

FIGS. 26 and 27 are flowcharts illustrating a method of operating a multi-camera system according to exemplary embodiments. The descriptions repeated with respect to FIGS. 10, 16 and 22 will be omitted as redundant.

Referring to FIG. 26, in a method of operating a multi-camera system according to an exemplary embodiment, steps S100, S200, S300 and S400 may be substantially the same as steps S100, S200, S300 and S400 in FIG. 10, respectively, and steps S1100, S1200 and S1300 may be substantially the same as steps S1100, S1200 and S1300 in FIG. 22, respectively.

A third number of times of performing the second auto exposure and a fourth number of times of performing the second auto white balance may be changed based on the illumination environment (step S1400). Step S1400 may be similar to step S400.

Referring to FIG. 27, in a method of operating a multi-camera system according to an exemplary embodiment, steps S100, S200, S300 and S500 may be substantially the same as steps S100, S200, S300 and S500 in FIG. 16, respectively, and steps S1100, S1200 and S1300 may be substantially the same as steps S1100, S1200 and S1300 in FIG. 22, respectively.

Outputs of the plurality of second cameras may be synchronized (step S1500). Step S1500 may be similar to step S500.

In some exemplary embodiments, all of steps S400 and S1400 in FIG. 26 and steps S500 and S1500 in FIG. 27 may be performed.

Figure 28:
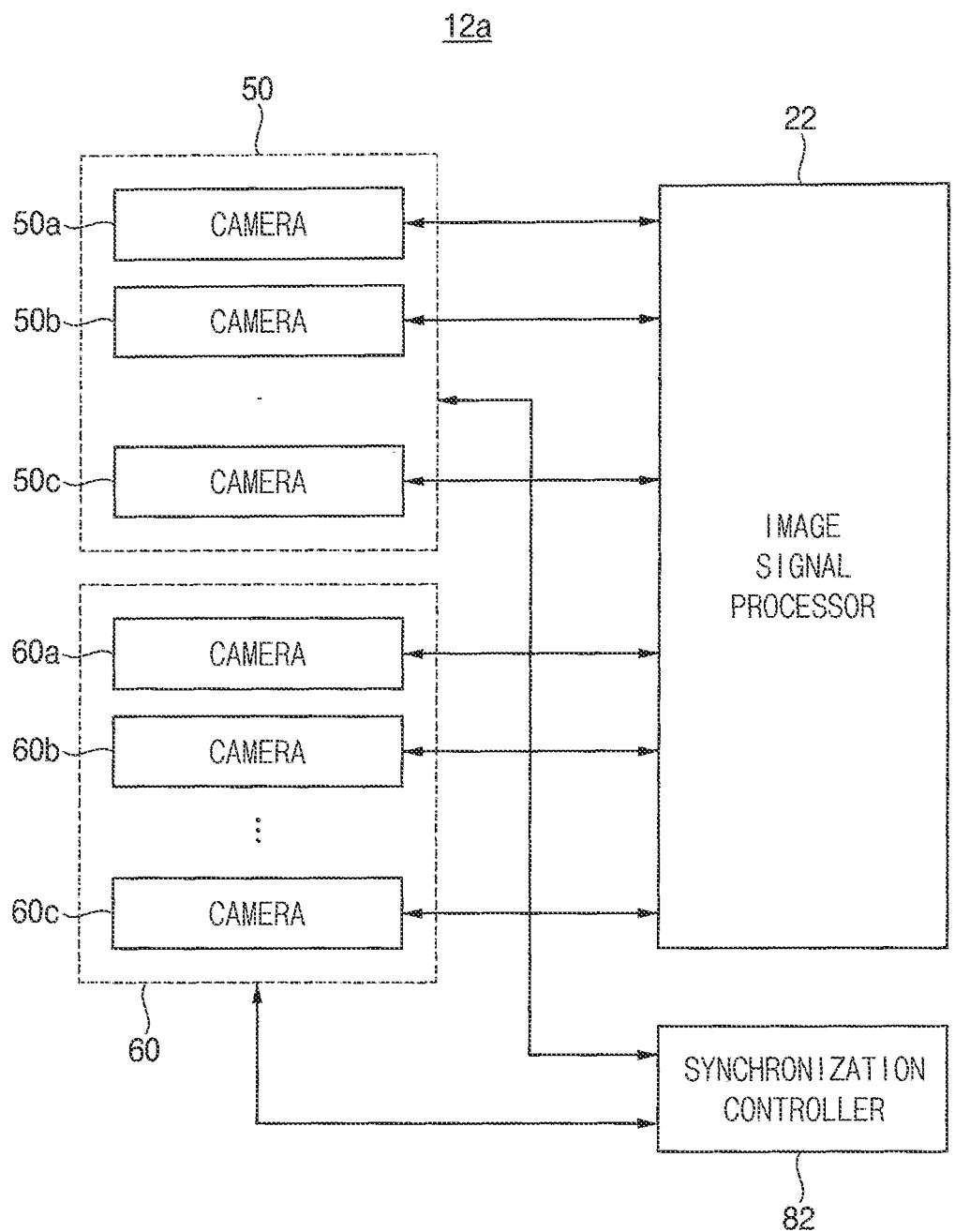
FIG. 28 is a block diagram illustrating a multi-camera system according to exemplary embodiments.

FIG. 28 is a block diagram illustrating a multi-camera system according to exemplary embodiments. The descriptions repeated with respect to FIGS. 17 and 23 will be omitted as redundant.

Referring to FIG. 28, a multi-camera system 12a may include a first image signal processor 22, a plurality of first cameras 50 and a plurality of second cameras 60. The multi-camera system 12a may further include a synchronization controller 82 that synchronizes outputs of the plurality of first cameras 50 and outputs of the plurality of second cameras 60.

The multi-camera system 12a may be substantially the same as the multi-camera system 12 of FIG. 23, except that the multi-camera system 12a further includes the synchronization controller 82. The synchronization controller 82 may be similar to the synchronization controller 80 of FIG. 17.

Figure 29:
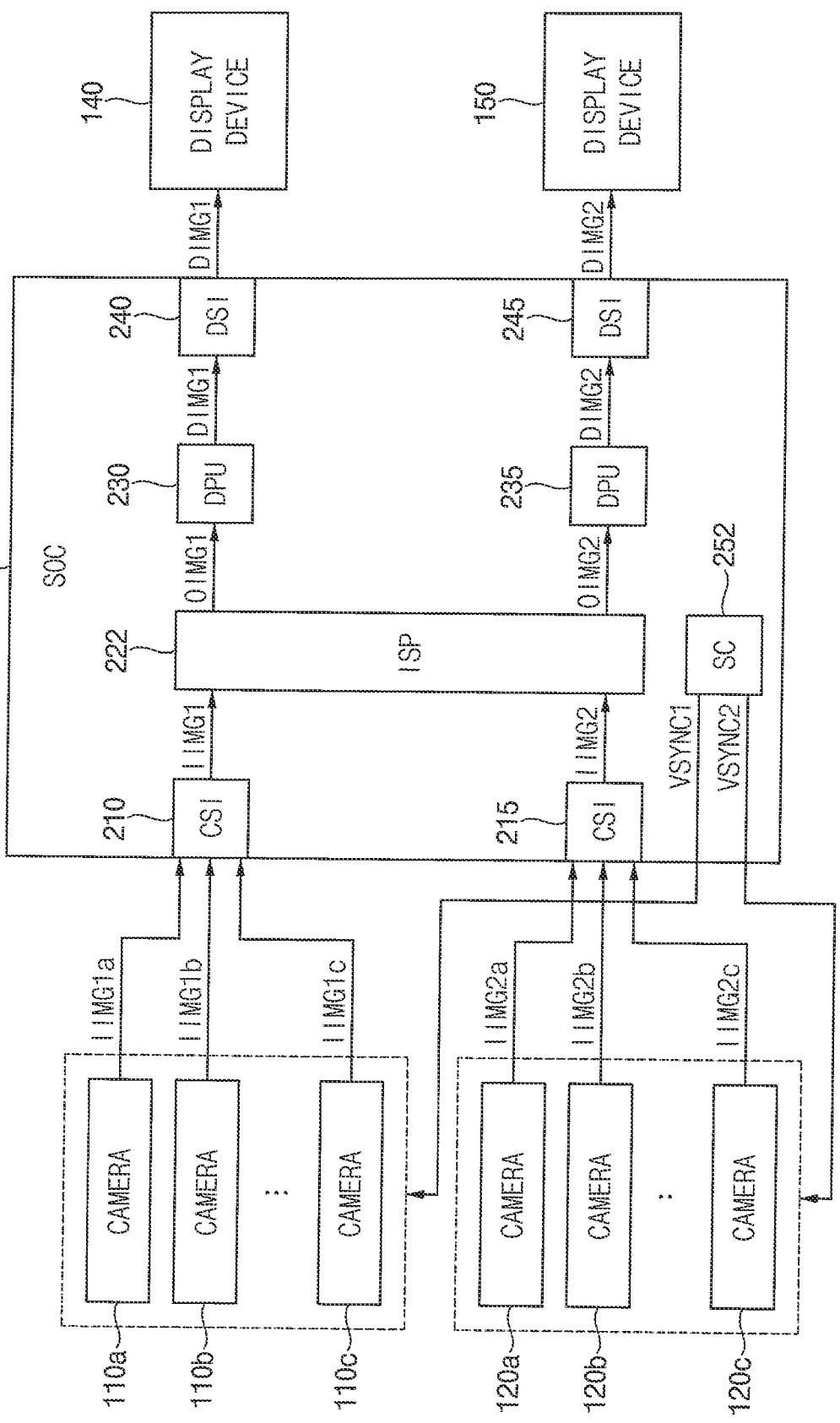
FIG. 29 is a block diagram illustrating an example of a multi-camera system of FIG. 28.

FIG. 29 is a block diagram illustrating an example of a multi-camera system of FIG. 28. The descriptions repeated with respect to FIGS. 18 and 24 will be omitted as redundant.

Referring to FIG. 29, a multi-camera system 102a may include a system-on-chip 202a, a plurality of first cameras 110a, 110b and 110c, a plurality of second cameras 120a, 120b and 120c, a first display device 140 and a second display device 150.

The multi-camera system 102a may be substantially the same as the multi-camera system 102 of FIG. 24, except that the system-on-chip 202a further includes a synchronization controller 252. The synchronization controller 252 may be similar to the synchronization controller 250 in FIG. 18.

The synchronization controller 252 may generate a first synchronization signal VSYNC1 and a second synchronization signal VSYNC2. The plurality of first input images IIMG1a, IIMG1b and IIMG1c output from the plurality of first cameras 110a, 110b and 110c may be synchronized based on the first synchronization signal VSYNC1. The plurality of second input images IIMG2a, IIMG2b and IIMG2c output from the plurality of second cameras 120a, 120b and 120c may be synchronized based on the second synchronization signal VSYNC2.

In some exemplary embodiments, the multi-camera systems 102 and 102a of FIGS. 24 and 29 may further include at least one of the memory devices 170 in FIG. 20 and the serializers 112a, 112b and 112c and the deserializer 180 in FIG. 21.

Figure 30:
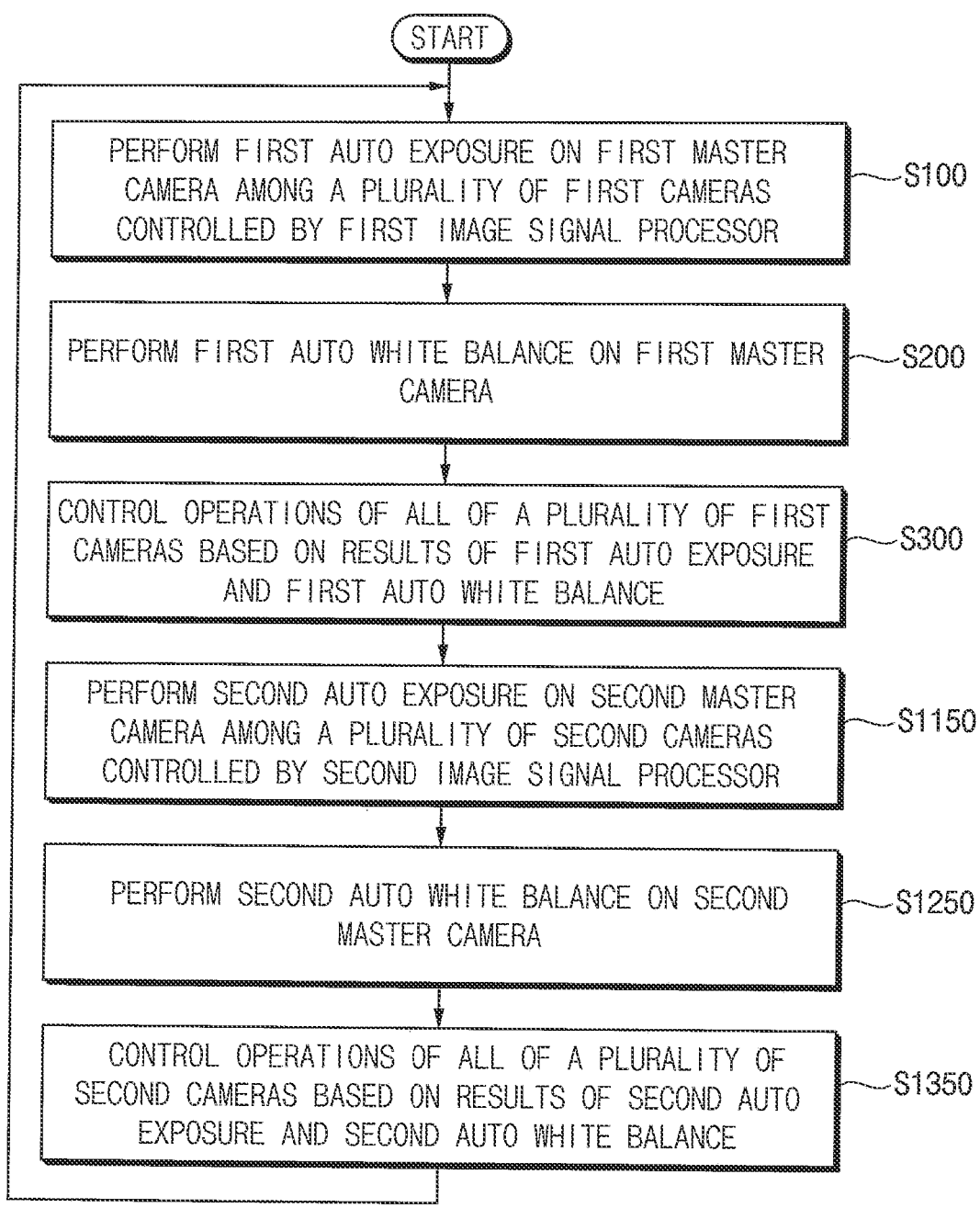
FIG. 30 is a flowchart illustrating a method of operating a multi-camera system according to exemplary embodiments.

FIG. 30 is a flowchart illustrating a method of operating a multi-camera system according to exemplary embodiments. The descriptions repeated with respect to FIGS. 1 and 22 will be omitted as redundant.

Referring to FIG. 30, in a method of operating a multi-camera system according to an exemplary embodiment, steps S100, S200 and S300 may be substantially the same as steps S100, S200 and S300 in FIG. 1, respectively.

A second auto exposure is performed on a second master camera among a plurality of second cameras controlled by a second image signal processor (step S1150). The second image signal processor is different from the first image signal processor, and the plurality of second cameras are different from the plurality of first cameras. A second auto white balance is performed on the second master camera (step S1250). Operations of all of the plurality of second cameras are controlled by the second image signal processor based on results of the second auto exposure and the second auto white balance (step S1350). Steps S1150, S1250 and S1350 may be substantially the same as steps S1100, S1200 and S1300 in FIG. 22, respectively, except that the plurality of second cameras are controlled by the second image signal processor.

Figure 31:
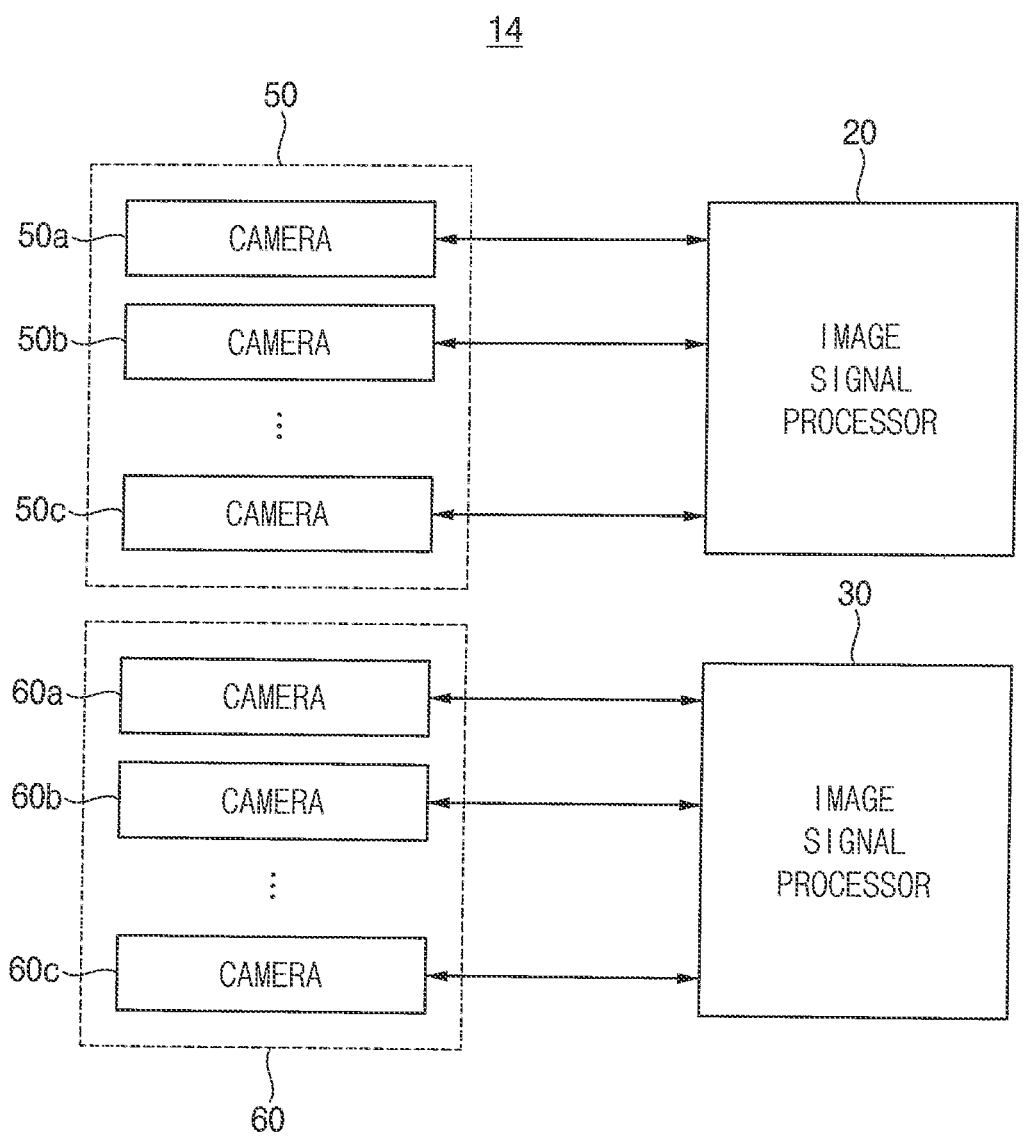
FIG. 31 is a block diagram illustrating a multi-camera system according to exemplary embodiments.

FIG. 31 is a block diagram illustrating a multi-camera system according to exemplary embodiments. The descriptions repeated with respect to FIGS. 2 and 23 will be omitted as redundant.

Referring to FIG. 31, a multi-camera system 14 may include a first image signal processor 20, a second image signal processor 30, a plurality of first cameras 50 controlled by the first image signal processor 20, and a plurality of second cameras 60 controlled by the second image signal processor 30.

The multi-camera system 14 may be substantially the same as the multi-camera system 10 of FIG. 2, except that the multi-camera system 14 further includes the second image signal processor 30 and the plurality of second cameras 60. The plurality of second cameras 60 may be substantially the same as the plurality of second cameras 60 in FIG. 23. The second image signal processor 30 may be substantially the same as the first image signal processor 20, except that the second image signal processor 30 controls the plurality of second cameras 60.

Figure 32:
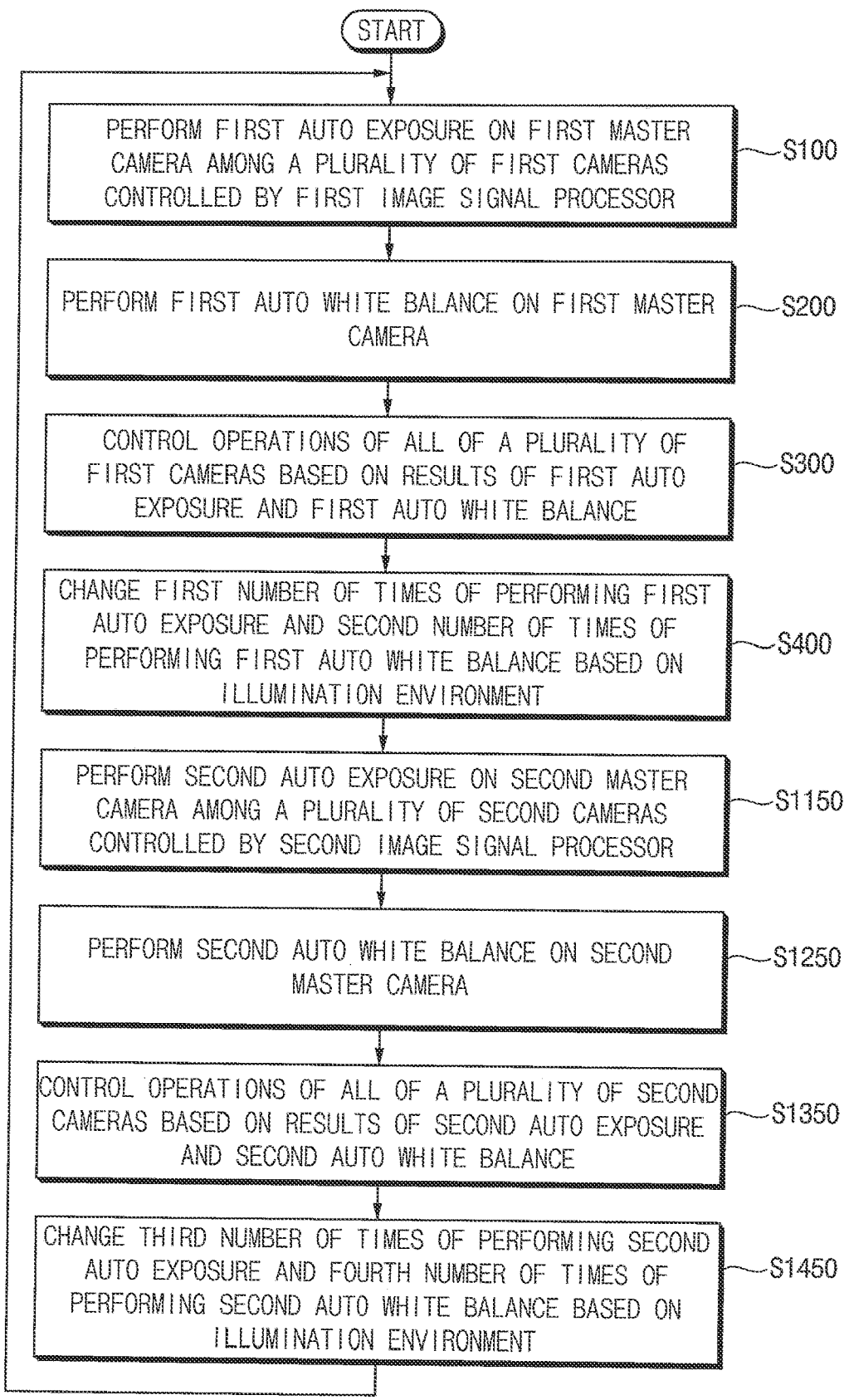
FIGS. 32 and 33 are flowcharts illustrating a method of operating a multi-camera system according to exemplary embodiments.
Figure 33:
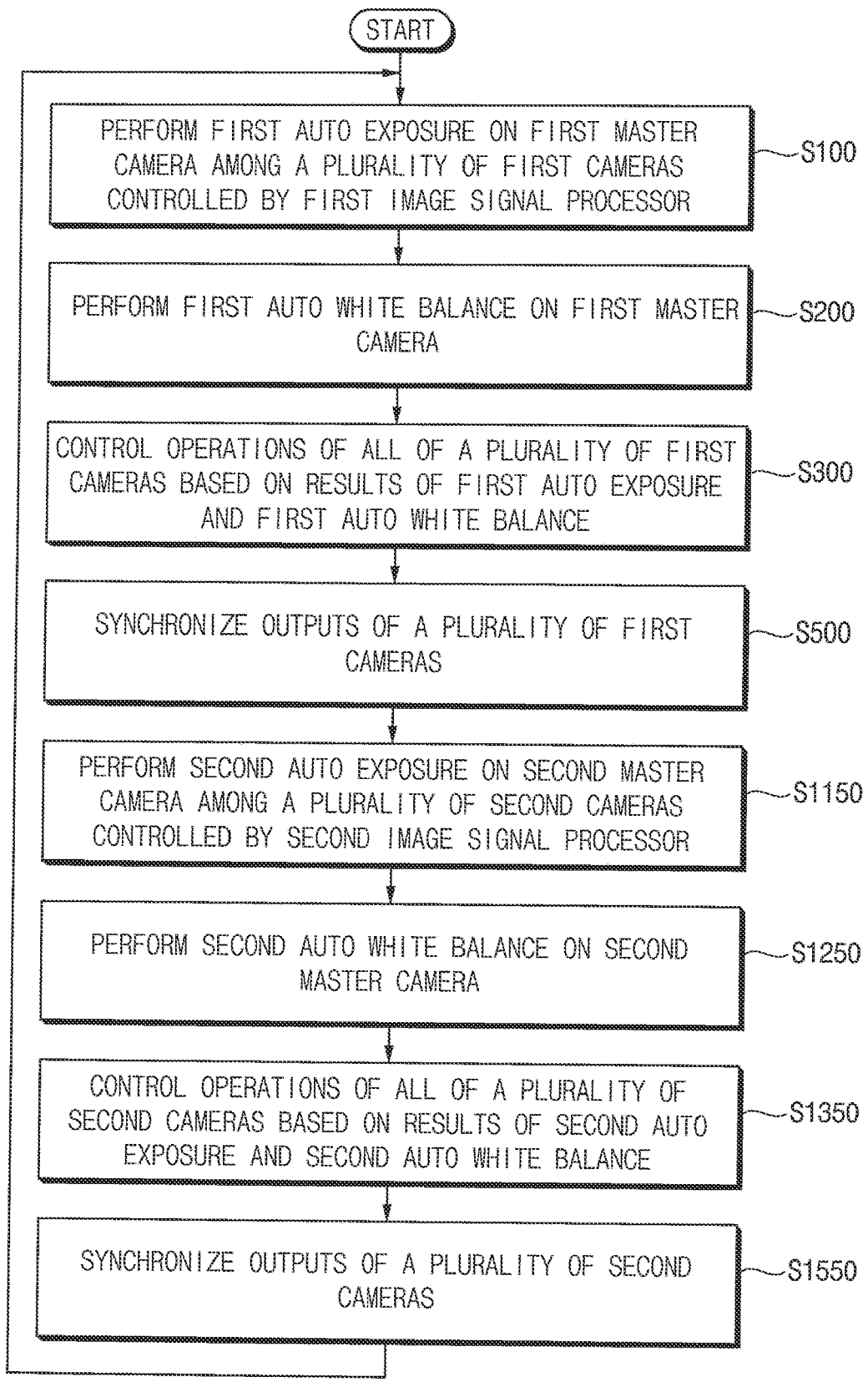

FIGS. 32 and 33 are flowcharts illustrating a method of operating a multi-camera system according to exemplary embodiments. The descriptions repeated with respect to FIGS. 26, 27 and 30 will be omitted as redundant.

Referring to FIG. 32, in a method of operating a multi-camera system according to exemplary embodiments, steps S100, S200, S300 and S400 may be substantially the same as steps S100, S200, S300 and S400 in FIG. 26, respectively, and steps S1150, S1250 and S1350 may be substantially the same as steps S1150, S1250 and S1350 in FIG. 30, respectively.

A third number of times of performing the second auto exposure and a fourth number of times of performing the second auto white balance may be changed based on the illumination environment (step S1450). Step S1450 may be similar to step S1400 in FIG. 26.

Referring to FIG. 33, in a method of operating a multi-camera system according to an exemplary embodiment, steps S100, S200, S300 and S500 may be substantially the same as steps S100, S200, S300 and S500 in FIG. 27, respectively, and steps S1150, S1250 and S1350 may be substantially the same as steps S1150, S1250 and S1350 in FIG. 30, respectively.

Outputs of the plurality of second cameras may be synchronized (step S1550). Step S1550 may be similar to step S1500 in FIG. 27.

Figure 34:
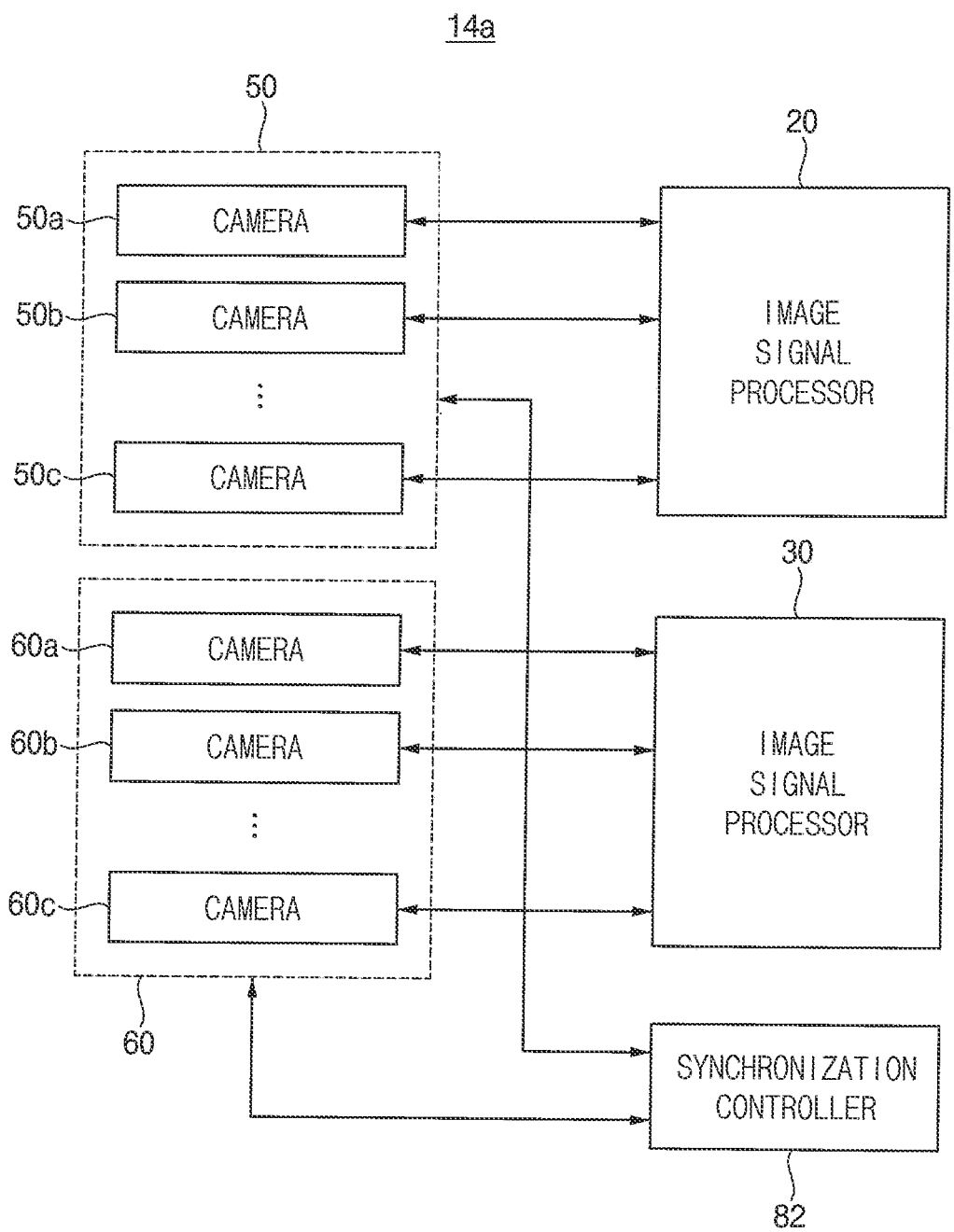
FIG. 34 is a block diagram illustrating a multi-camera system according to exemplary embodiments.

FIG. 34 is a block diagram illustrating a multi-camera system according to exemplary embodiments. The descriptions repeated with respect to FIGS. 28 and 31 will be omitted as redundant.

Referring to FIG. 34, a multi-camera system 14a may include a first image signal processor 20, a second image signal processor 30, a plurality of first cameras 50 and a plurality of second cameras 60. The multi-camera system 14a may further include a synchronization controller 82 that synchronizes outputs of the plurality of first cameras 50 and outputs of the plurality of second cameras 60.

The multi-camera system 14a may be substantially the same as the multi-camera system 14 of FIG. 31, except that the multi-camera system 14a further includes the synchronization controller 82. The synchronization controller 82 may be similar to the synchronization controller 82 in FIG. 28.

Figure 35:
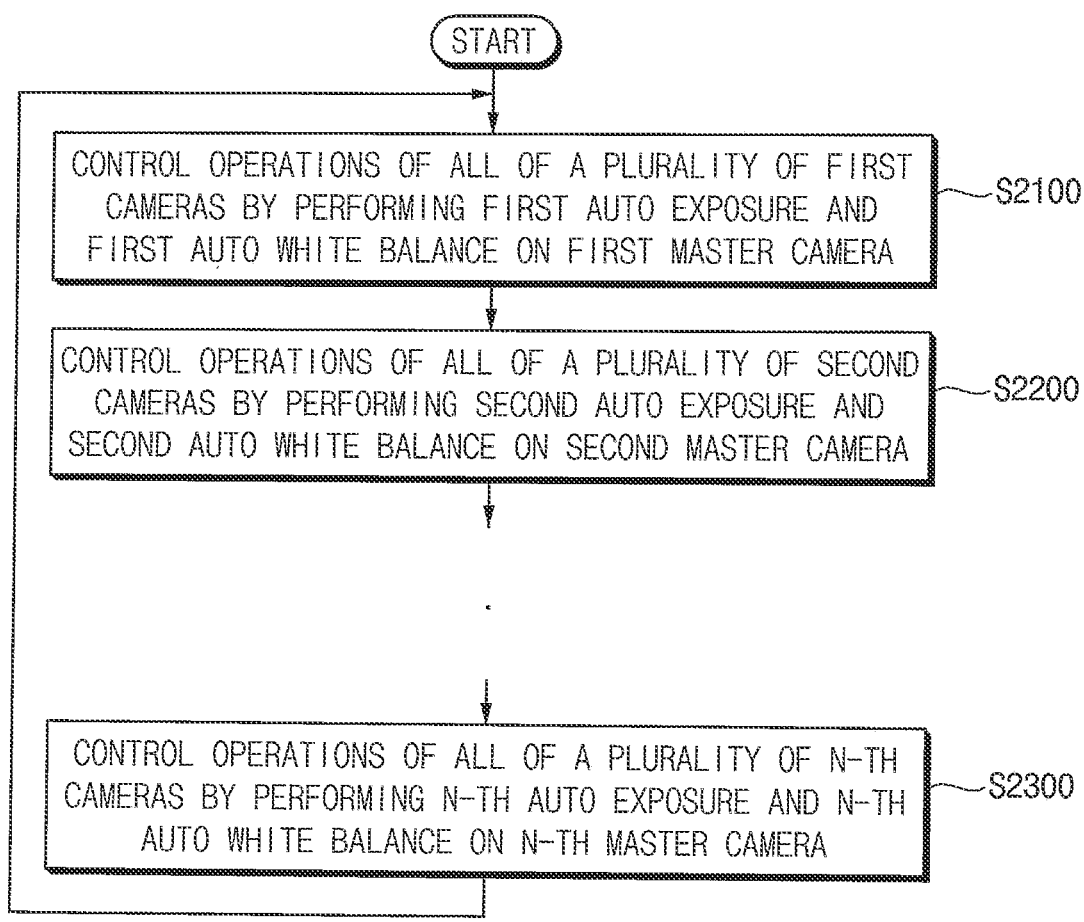
FIG. 35 is a flowchart illustrating a method of operating a multi-camera system according to exemplary embodiments.

FIG. 35 is a flowchart illustrating a method of operating a multi-camera system according to exemplary embodiments.

Referring to FIG. 35, in a method of operating a multi-camera system according to an exemplary embodiment, operations of all of a plurality of first cameras are controlled by performing a first auto exposure and a first auto white balance on a first master camera among the plurality of first cameras (step S2100). For example, step S2100 may be implemented as described with reference to FIGS. 1 through 21.

Operations of all of a plurality of second cameras are controlled by performing a second auto exposure and a second auto white balance on a second master camera among the plurality of second cameras (step S2200). For example, step S2200 may be similar to step S2100, and may be implemented as described with reference to FIGS. 22 through 34.

Operations of all of a plurality of N-th cameras are controlled by performing an N-th auto exposure and an N-th auto white balance on an N-th master camera among the plurality of N-th cameras (step S2300), where N is a natural number greater than or equal to three. For example, step S2300 may be similar to steps S2100 and S2200.

Figure 36:
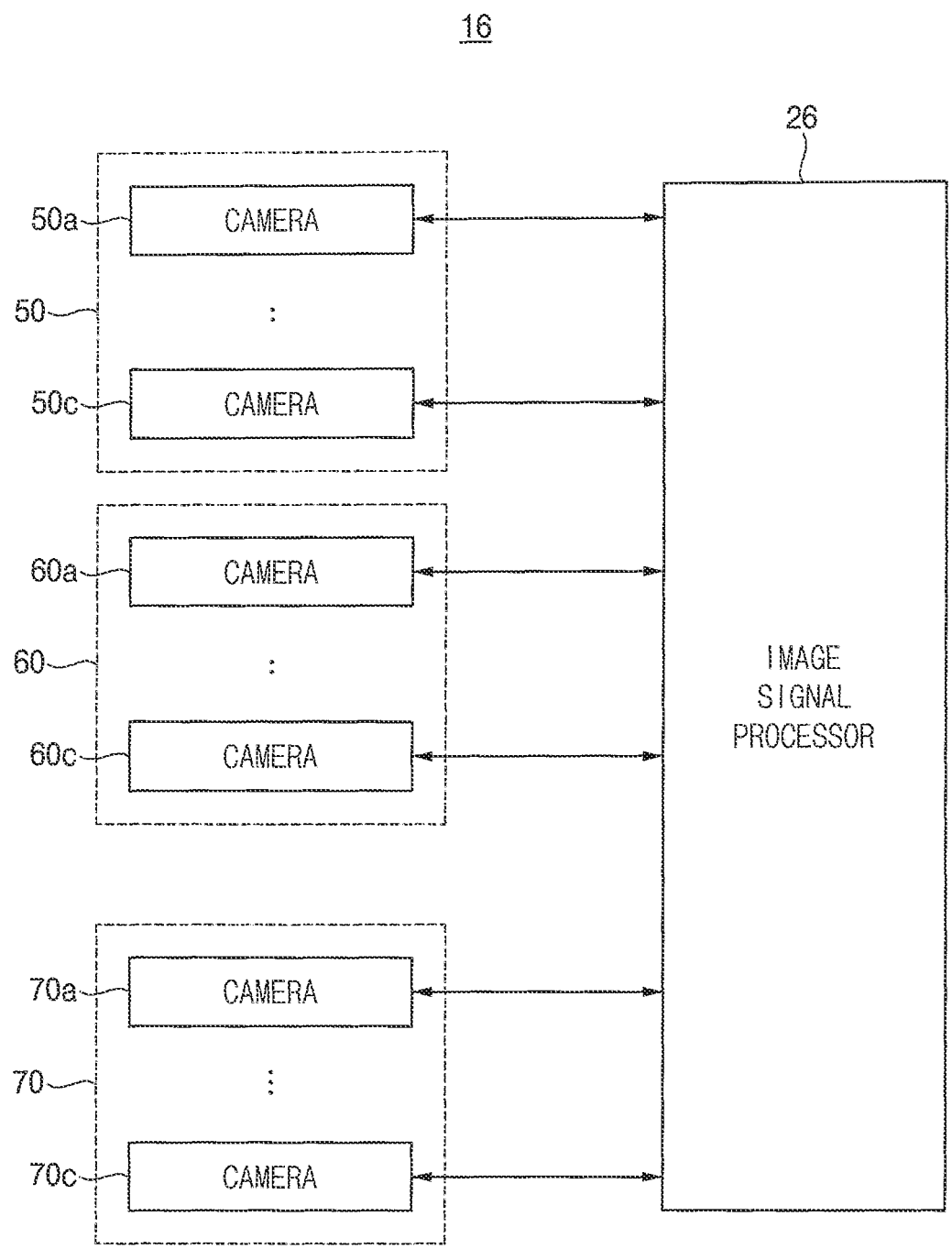
FIGS. 36 and 37 are block diagrams illustrating a multi-camera system according to exemplary embodiments.
Figure 37:
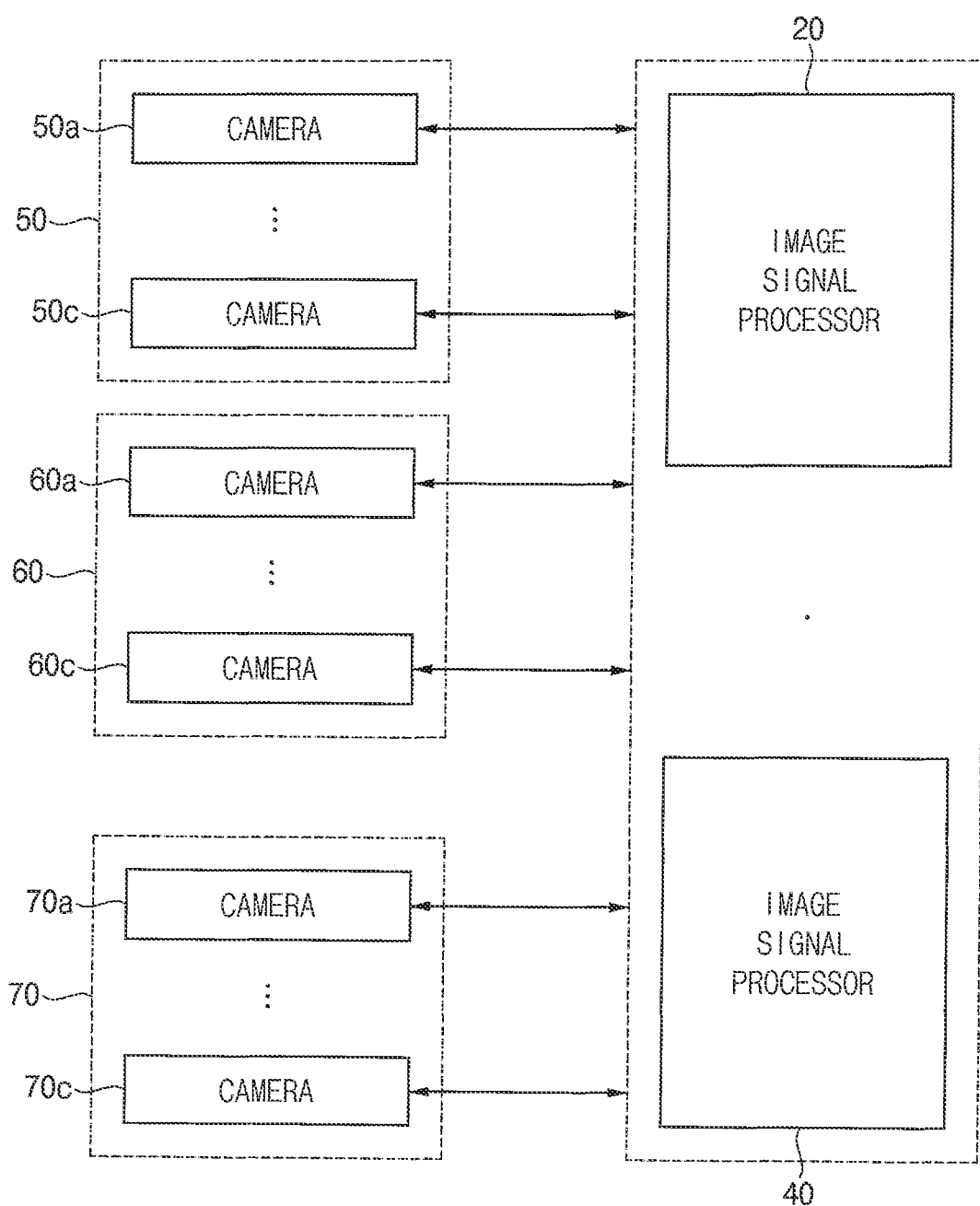

FIGS. 36 and 37 are block diagrams illustrating a multi-camera system according to exemplary embodiments.

Referring to FIG. 36, a multi-camera system 16 may include a first image signal processor 26, and may include a plurality of first cameras 50 to a plurality of N-th cameras 70. In the example of FIG. 36, one image signal processor 26 may control all of the cameras 50a, 50c, 60a, 60c, 70a and 70c.

Referring to FIG. 37, a multi-camera system 18 may include a first image signal processor 20 to an M-th image signal processor 40, where M is a natural number greater than or equal to two, and may include a plurality of first cameras 50 to a plurality of N-th cameras 70. In the example of FIG. 37, one image signal processor may control one or more camera groups. In other words, M may be less than or equal to N.

FIGS. 38, 39, 40 and 41 are diagrams illustrating an autonomous driving device including a multi-camera system according to exemplary embodiments.

Figure 38:
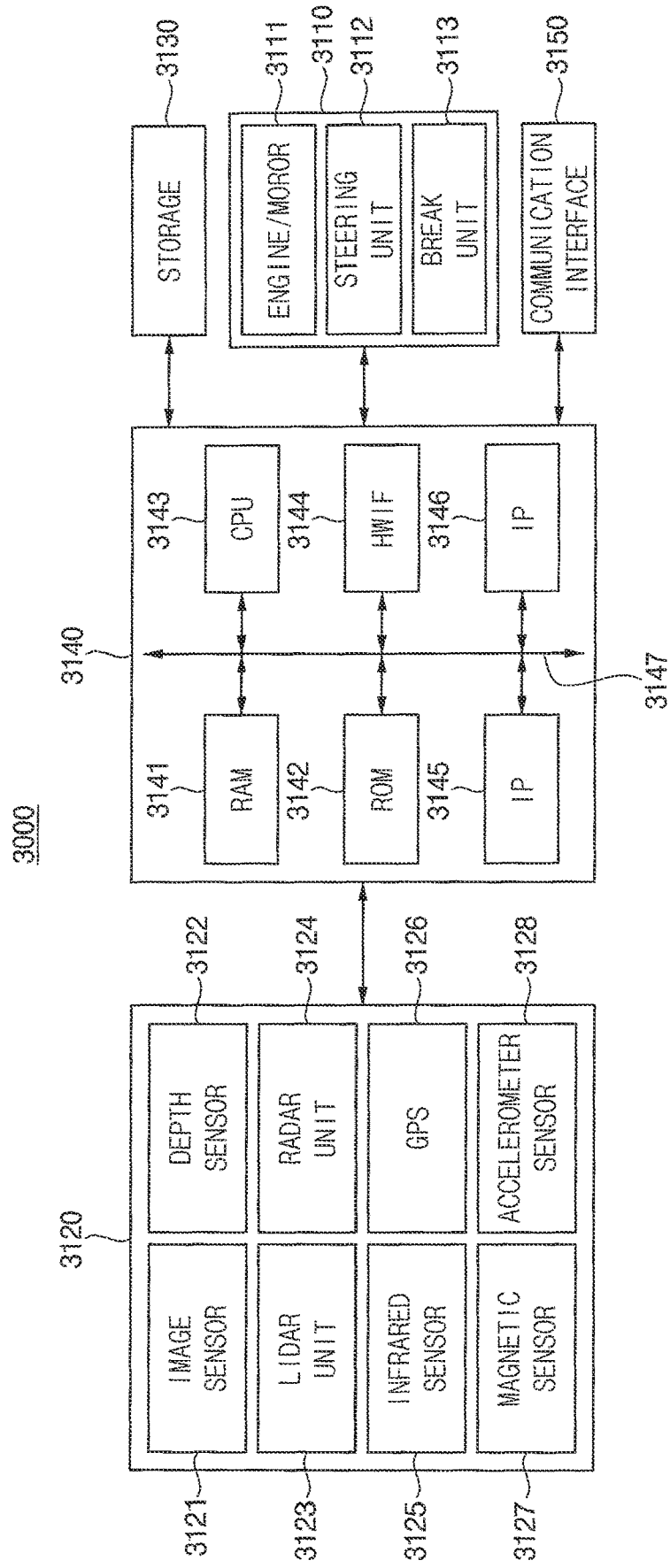
FIGS. 38, 39, 40 and 41 are diagrams illustrating an autonomous driving device including a multi-camera system according to exemplary embodiments.

Referring to FIG. 38, an autonomous driving device 3000 may include a driver (e.g., including circuitry) 3110, a sensor 3120, a storage 3130, a controller (e.g., including processing circuitry) 3140 and a communication interface 3150.

The driver 3110 may, for example, be a configuration for driving the autonomous driving device 3000 and may include various circuitry. In a case that the autonomous driving device 3000 is implemented as a vehicle, the driver 3110 may include various circuitry and/or components, such as, for example, an engine/motor 3111, a steering unit 3112, a brake unit 3113, and/or the like.

The sensor 3120 may include a number of sensors configured to sense information relating to a surrounding environment of the autonomous driving device 3000. For example, the sensor 3120 may include at least one of an image sensor 3121, a depth sensor 3122, a light detection and ranging (LIDAR) unit 3123, a radio detection and ranging (RADAR) unit 3124, an infrared sensor 3125, a global positioning system (GPS) 3126, a magnetic sensor 3127, and/or an accelerometer sensor 3128.

The controller 3140 may include a random access memory (RAM) 3141, a read-only memory (ROM) 3142, a central processing unit (CPU) 3143, a hardware interface device (HWIF) 3144, a plurality of intellectual property protected devices (IPs) 3145 and 3146, and a bus 3147. The storage 3130 may store data necessary for the controller 3140 to execute various processes. The communication interface 3150 may include various communication circuits and may be configured to facilitate communication between the autonomous driving device 3000 and an external device.

The image signal processor and the plurality of cameras that are included in the multi-camera system according to exemplary embodiments may be included in the controller 3140 and the image sensor 3121, respectively.

Figure 39:
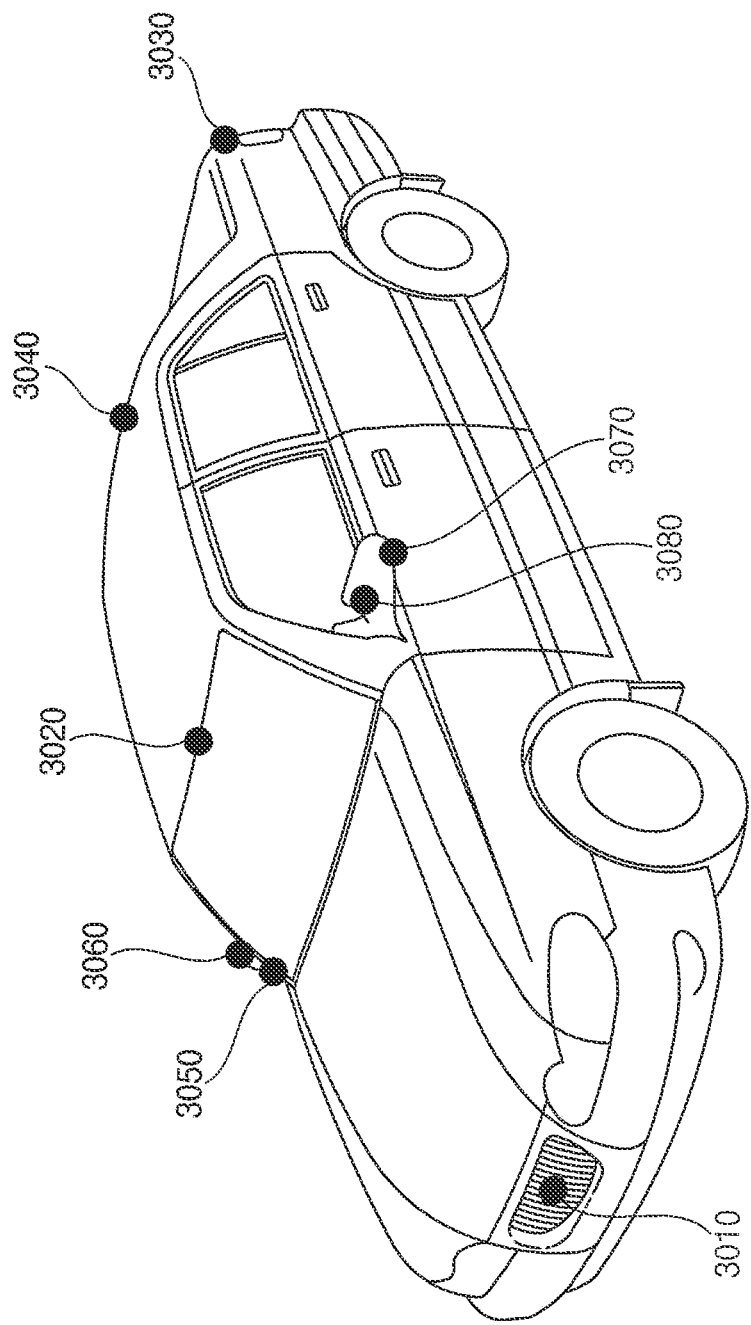
Figure 40:
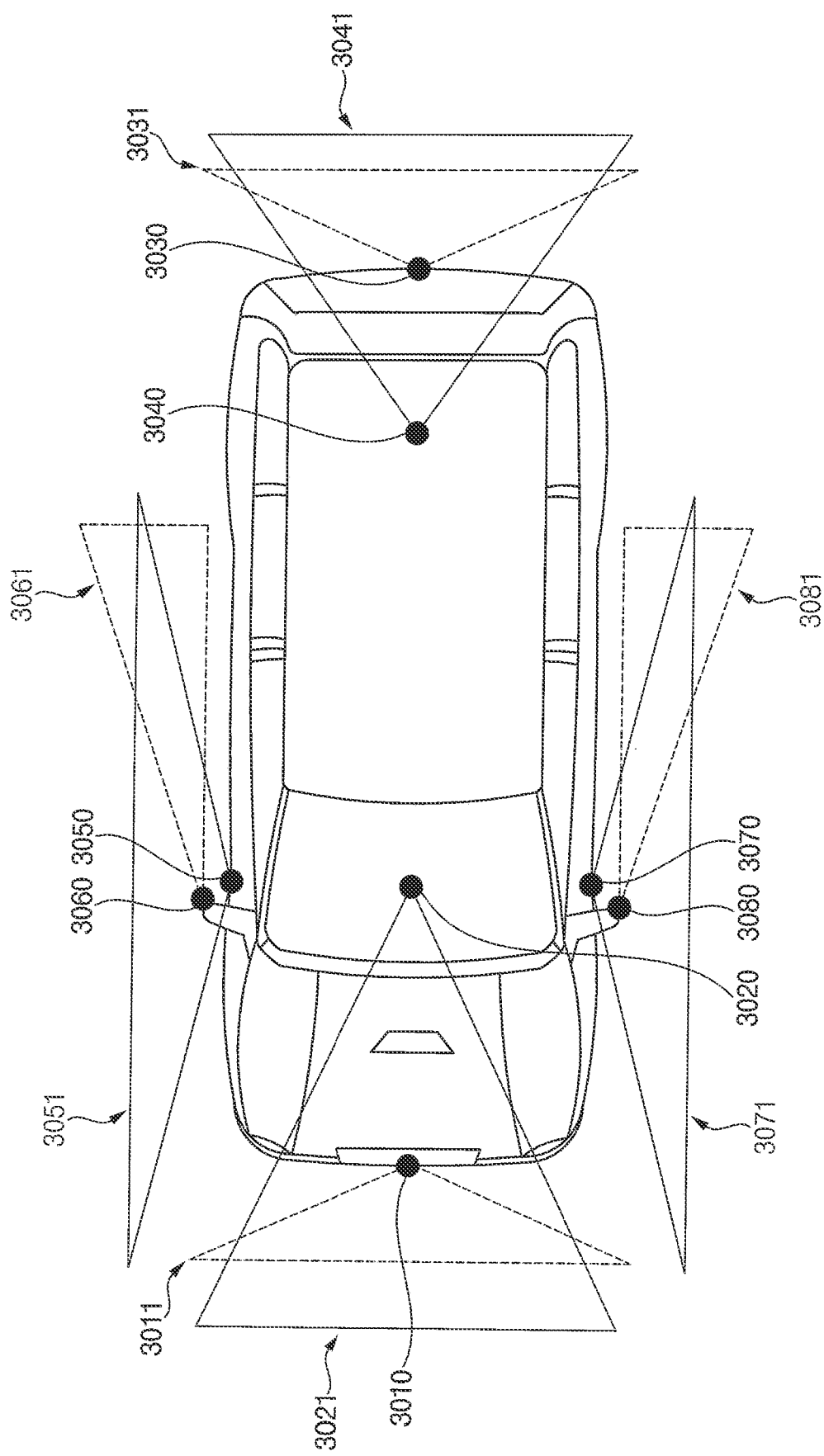

Referring to FIGS. 39 and 40, an example of an arrangement of a plurality of cameras 3010, 3020, 3030, 3040, 3050, 3060, 3070 and 3080, which have different angles of view 3011, 3021, 3031, 3041, 3051, 3061, 3071 and 3081, in an autonomous driving device is illustrated.

For example, the cameras 3010 and 3020 that are disposed to face in forward direction may be set as a first camera group, and the camera 3010 having the widest angle of view 3011 (or disposed at the frontmost side) among the cameras 3010 and 3020 may be set as a first master camera. The cameras 3030 and 3040 that are disposed to face in rearward direction may be set as a second camera group, and the camera 3030 having the widest angle of view 3031 (or disposed at the rearmost side) among the cameras 3030 and 3040 may be set as a second master camera. Similarly, the cameras 3050 and 3060 that are disposed to face in right-side direction may be set as a third camera group, and the camera 3050 among the cameras 3050 and 3060 may be set as a third master camera. The cameras 3070 and 3080 that are disposed to face in left-side direction may be set as a fourth camera group, and the camera 3070 among the cameras 3070 and 3080 may be set as a fourth master camera.

Figure 41:
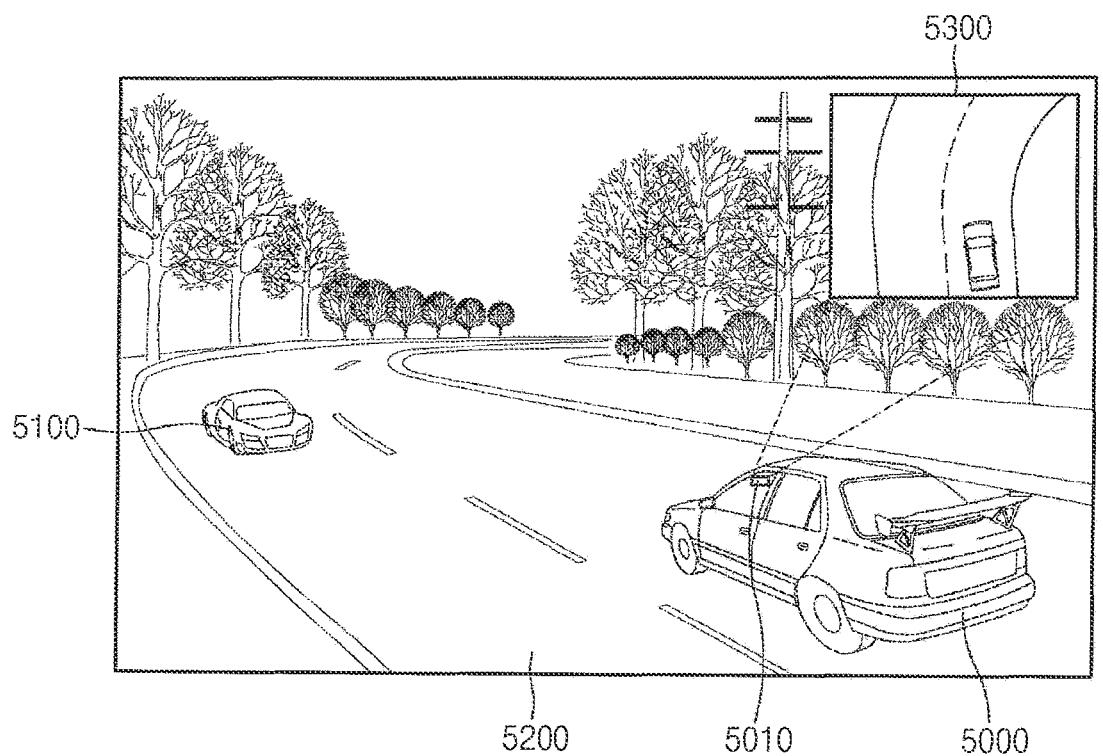

Referring to FIG. 41, a multi-camera system S010 may be included in an advanced driver assistance system (ADAS), an autonomous driving system, or the like, that is included in (e.g., mounted on) a vehicle S000. For example, the multi-camera system S010 may detect a road S200 including a fixed pattern and another vehicle S100 moving in time, by analyzing the at least one image sequence S300 received from cameras.

The inventive concept may be applied to various electronic devices and systems that include the plurality of cameras. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive vehicle, etc.

The foregoing is illustrative of exemplary embodiments and is not to be construed as limiting thereof. Although some exemplary embodiments have been described, those skilled in the art will readily appreciate that many variations and modifications are possible in such exemplary embodiments without materially departing from the novel teachings and advantages of the present disclosure. Accordingly, all such variations and modifications are intended to be included within the spirit and scope of the exemplary embodiments as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of operating a multi-camera system, the method comprising:
   performing a first auto exposure (AE) on a first master camera among a plurality of first cameras controlled by a first image signal processor;
   performing a first auto white balance (AWB) on the first master camera;
   controlling, by the first image signal processor, operations of all of the plurality of first cameras based on results of the first auto exposure and the first auto white balance; and
   changing a first number of times of performing the first auto exposure and a second number of times of performing the first auto white balance based on an illumination environment.

2. The method of claim 1, wherein: performing the first auto exposure includes:
   obtaining a first sensor gain of the first master camera, and controlling the operations of all of the plurality of first cameras includes:
   applying the first sensor gain to all of the plurality of first cameras.

3. The method of claim 1, wherein: performing the first auto white balance includes:
   obtaining a first RGB gain of the first master camera, and controlling the operations of all of the plurality of first cameras includes:
   applying the first RGB gain to all of the plurality of first cameras.

4. The method of claim 1, wherein the plurality of first cameras are disposed to face in a first direction.

5. The method of claim 1, wherein the plurality of first cameras are configured to have a first frame rate.

6. The method of claim 1, wherein both the first auto exposure and the first auto white balance are performed every frame.

7. The method of claim 1, wherein only one the first auto exposure and the first auto white balance is performed every frame.

8. The method of claim 1, wherein:
   only one the first auto exposure and the first auto white balance is performed in a first frame,
   both the first auto exposure and the first auto white balance are not performed in a second frame subsequent to the first frame, and
   the first frame and the second frame are two consecutive frames.

9. The method of claim 1, wherein changing the first number of times and the second number of times includes:
   in response to determining that a change in the illumination environment is detected, increasing the first number of times and the second number of times; and
   in response to determining that the illumination environment is stabilized, decreasing the first number of times and the second number of times.

10. The method of claim 9, wherein, based on a first sensor gain obtained as a result of performing the first auto exposure, it is determined that the change in the illumination environment is detected or the illumination environment is stabilized.

11. The method of claim 9, wherein, based on a first RGB gain obtained as a result of performing the first auto white balance, it is determined that the change in the illumination environment is detected or the illumination environment is stabilized.

12. The method of claim 1, further comprising: synchronizing outputs of the plurality of first cameras.

13. The method of claim 1, further comprising:
performing a second auto exposure on a second master camera among a plurality of second cameras controlled by the first image signal processor, the plurality of second cameras being different from the plurality of first cameras;
performing a second auto white balance on the second master camera; and
controlling, by the first image signal processor, operations of all of the plurality of second cameras based on results of the second auto exposure and the second auto white balance.

14. The method of claim 13, wherein:
the plurality of first cameras are disposed to face in a first direction, and
the plurality of second cameras are disposed to face in a second direction different from the first direction.

15. The method of claim 13, wherein:
the plurality of first cameras are configured to have a first frame rate, and
the plurality of second cameras are configured to have a second frame rate different from the first frame rate.

16. The method of claim 1, further comprising:
performing a second auto exposure on a second master camera among a plurality of second cameras controlled by a second image signal processor different from the first image signal processor, the plurality of second cameras being different from the plurality of first cameras;
performing a second auto white balance on the second master camera; and
controlling, by the second image signal processor, operations of all of the plurality of second cameras based on results of the second auto exposure and the second auto white balance.

17. A multi-camera system comprising:
a first image signal processor; and
a plurality of first cameras controlled by the first image signal processor,
wherein the first image signal processor is configured to
perform a first auto exposure (AE) on a first master camera among the plurality of first cameras,
perform a first auto white balance (AWB) on the first master camera, and
control operations of all of the plurality of first cameras based on results of the first auto exposure and the first auto white balance,
wherein the first image signal processor is further configured to change, based on an illumination environment, a first number of times that the first auto exposure is performed on the first master camera and a second number of times that the first auto white balance is performed on the first master camera.

18. The multi-camera system of claim 17, further comprising: a synchronization controller configured to synchronize outputs of the plurality of first cameras.

19. A method of operating a multi-camera system, the method comprising:
obtaining a first sensor gain of a first master camera by performing a first auto exposure (AE) on the first master camera among a plurality of first cameras controlled by a first image signal processor;
obtaining a first RGB gain of the first master camera by performing a first auto white balance (AWB) on the first master camera;
controlling, by the first image signal processor, operations of all of the plurality of first cameras by applying the first sensor gain and the first RGB gain obtained as a result of performing the first auto exposure and the first auto white balance to all of the plurality of first cameras; and
synchronizing outputs of the plurality of first cameras, wherein:
the multi-camera system is configured to operate in a first operation mode, a second operation mode and a third operation mode,
in the first operation mode, both the first auto exposure and the first auto white balance are performed every frame,
in second first operation mode, only one the first auto exposure and the first auto white balance is performed every frame,
in third first operation mode, only one the first auto exposure and the first auto white balance is performed in a first frame, both the first auto exposure and the first auto white balance are not performed in a second frame subsequent to the first frame, and the first frame and the second frame are two consecutive frames,
an operation mode of the multi-camera system is changed by increasing a first number of times of performing the first auto exposure and a second number of times of performing the first auto white balance in response to determining that a change in an illumination environment is detected, and by decreasing the first number of times and the second number of times in response to determining that the illumination environment is stabilized,
based on at least one of the first sensor gain, the first RGB gain and an external control signal, it is determined that the change in the illumination environment is detected or the illumination environment is stabilized.

* * * * *